(12) United States Patent
Marinier et al.

(10) Patent No.: US 11,979,869 B2
(45) Date of Patent: *May 7, 2024

(54) DISTRIBUTED SCHEDULING FOR DEVICE-TO-DEVICE COMMUNICATION

(71) Applicant: InterDigital Patent Holdings, Inc., Wilmington, DE (US)

(72) Inventors: Paul Marinier, Brossard (CA); Benoit Pelletier, Roxboro (CA); Marian Rudolf, Montreal (CA); Diana Pani, Montreal (CA); Gwenael Poitau, Montreal (CA); Ghyslain Pelletier, Montreal (CA); Chao-Cheng Tu, Brossard (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,067

(22) Filed: Mar. 14, 2022

(65) Prior Publication Data
US 2022/0217730 A1 Jul. 7, 2022

Related U.S. Application Data

(63) Continuation of application No. 16/574,342, filed on Sep. 18, 2019, now Pat. No. 11,277,849, which is a
(Continued)

(51) Int. Cl.
*H04W 72/12* (2023.01)
*H04W 72/02* (2009.01)
(Continued)

(52) U.S. Cl.
CPC ........... *H04W 72/12* (2013.01); *H04W 72/02* (2013.01); *H04W 72/04* (2013.01); *H04W 76/14* (2018.02); *H04W 92/18* (2013.01)

(58) Field of Classification Search
CPC ..... H04W 72/12; H04W 72/02; H04W 72/04; H04W 76/14; H04W 92/18; H04W 72/1263
See application file for complete search history.

(56) References Cited

U.S. PATENT DOCUMENTS 9,241,361 B2  1/2016  Wu et al.
9,532,395 B2  12/2016  Wang et al.
(Continued)

FOREIGN PATENT DOCUMENTS

CN  101385381 A  3/2009
CN  101388694 A  3/2009
(Continued)

OTHER PUBLICATIONS

Ericsson, "Frame Structure for D2D-Enabled LTE Carriers", 3GPP Tdoc R1-140775; 3GPP TSG RAN WG1 Meeting #76; Prague, Czech Republic, Feb. 10-14, 2014, 3 pages.
(Continued)

*Primary Examiner* — John D Blanton
(74) *Attorney, Agent, or Firm* — Volpe Koenig

(57) ABSTRACT

Systems, methods, and instrumentalities are provided to implement scheduling for device-to-device (D2D). A WTRU (e.g., a D2D WTRU) may determine whether the WTRU has D2D data to transmit. The WTRU may determine a set of allowed SA resources and/or allowed D2D data resources for transmission of the SA. The WTRU may select an SA resource and/or D2D data resources (e.g., from the set of allowed SA resources and/or D2D data resources) for transmission. The WTRU may select one or more transmission parameters. The WTRU may select one or more transmission patterns. The WTRU may transmit D2D data over
(Continued)

the set of allowed D2D resources using the selected transmission patterns and according to the selected transmission parameters.

20 Claims, 16 Drawing Sheets

Related U.S. Application Data continuation of application No. 14/910,285, filed as application No. PCT/US2014/049985 on Aug. 6, 2014, now Pat. No. 10,462,802.

(60) Provisional application No. 61/989,892, filed on May 7, 2014, provisional application No. 61/955,567, filed on Mar. 19, 2014, provisional application No. 61/955,733, filed on Mar. 19, 2014, provisional application No. 61/933,236, filed on Jan. 29, 2014, provisional application No. 61/882,489, filed on Sep. 25, 2013, provisional application No. 61/882,402, filed on Sep. 25, 2013, provisional application No. 61/881,843, filed on Sep. 24, 2013, provisional application No. 61/863,319, filed on Aug. 7, 2013.

(51) Int. Cl.
*H04W 72/04* (2023.01)
*H04W 76/14* (2018.01)
*H04W 92/18* (2009.01)

(56) References Cited

U.S. PATENT DOCUMENTS

| | | | |
|---|---|---|---|
| 9,578,671 B2 | 2/2017 | Blankenship et al. | |
| 9,807,811 B2 | 10/2017 | Jung et al. | |
| 9,913,123 B2 | 3/2018 | Lee et al. | |
| 10,462,802 B2 * | 10/2019 | Marinier | H04W 72/12 |
| 2007/0155390 A1 | 7/2007 | Kodikara et al. | |
| 2009/0011770 A1 | 1/2009 | Jung et al. | |
| 2009/0016225 A1 | 1/2009 | Laroia et al. | |
| 2010/0110929 A1 | 5/2010 | Li et al. | |
| 2010/0110999 A1 | 5/2010 | Li et al. | |
| 2010/0240312 A1 | 9/2010 | Peng et al. | |
| 2011/0106952 A1 | 5/2011 | Doppler et al. | |
| 2011/0223953 A1 | 9/2011 | Lee et al. | |
| 2011/0265158 A1 | 10/2011 | Cha et al. | |
| 2011/0282989 A1 | 11/2011 | Geirhofer et al. | |
| 2012/0028672 A1 | 2/2012 | Chen et al. | |
| 2012/0077510 A1 | 3/2012 | Chen et al. | |
| 2012/0122463 A1 | 5/2012 | Chen et al. | |
| 2013/0083779 A1 | 4/2013 | Ahn et al. | |
| 2013/0089020 A1 | 4/2013 | Hakola et al. | |
| 2013/0094480 A1 | 4/2013 | Lim et al. | |
| 2013/0148637 A1 | 6/2013 | Yang et al. | |
| 2013/0176950 A1 | 7/2013 | Hakola et al. | |
| 2013/0195026 A1 | 8/2013 | Johnsson et al. | |
| 2013/0223398 A1 | 8/2013 | Li et al. | |
| 2013/0252654 A1 | 9/2013 | Dimou et al. | |
| 2014/0086153 A1 | 3/2014 | Bontu et al. | |
| 2014/0094213 A1 | 4/2014 | Khoshnevis et al. | |
| 2014/0153390 A1 | 6/2014 | Ishii et al. | |
| 2014/0187165 A1 | 7/2014 | Wu et al. | |
| 2014/0198655 A1 | 7/2014 | Ishii et al. | |
| 2014/0211696 A1 | 7/2014 | Chai et al. | |
| 2014/0241260 A1 | 8/2014 | Schmidt et al. | |
| 2014/0307642 A1 | 10/2014 | Wänstedt et al. | |
| 2014/0334354 A1 | 11/2014 | Sartori et al. | |
| 2014/0334388 A1 | 11/2014 | Novak et al. | |
| 2014/0369292 A1 | 12/2014 | Wu et al. | |
| 2015/0092689 A1 * | 4/2015 | Ko | H04W 72/04 370/329 |
| 2015/0139197 A1 | 5/2015 | He et al. | |
| 2015/0156757 A1 | 6/2015 | Kalhan et al. | |
| 2015/0173029 A1 | 6/2015 | Fujishiro | |
| 2015/0201452 A1 | 7/2015 | Wang et al. | |
| 2015/0215875 A1 | 7/2015 | Nakashima et al. | |
| 2015/0257184 A1 | 9/2015 | Yamazaki et al. | |
| 2015/0264595 A1 | 9/2015 | Morita | |
| 2015/0334693 A1 | 11/2015 | Lu et al. | |
| 2015/0373616 A1 | 12/2015 | Fujishiro | |
| 2016/0007383 A1 | 1/2016 | Chae et al. | |
| 2016/0029331 A1 | 1/2016 | Seo et al. | |
| 2016/0037569 A1 | 2/2016 | Kim et al. | |
| 2016/0044720 A1 | 2/2016 | Boucher | |
| 2016/0044724 A1 | 2/2016 | Seo et al. | |
| 2016/0112172 A1 | 4/2016 | Seo et al. | |
| 2016/0143052 A1 * | 5/2016 | Yilmaz | H04W 72/1268 370/329 |
| 2016/0150391 A1 | 5/2016 | Lee et al. | |
| 2016/0157185 A1 | 6/2016 | Chae et al. | |
| 2017/0019942 A1 | 1/2017 | Ko et al. | |
| 2018/0234830 A1 | 8/2018 | Wang et al. | |

FOREIGN PATENT DOCUMENTS

| | | |
|---|---|---|
| CN | 102090132 A | 6/2011 |
| CN | 103209487 A | 7/2013 |
| CN | 103222326 A | 7/2013 |
| EP | 2012443 A2 | 1/2009 |
| GB | 2497604 A | 6/2013 |
| JP | 2009017560 A | 1/2009 |
| JP | 2010219994 A | 9/2010 |
| JP | 2010232741 A | 10/2010 |
| JP | 2010533444 A | 10/2010 |
| JP | 2011530942 A | 12/2011 |
| KR | 20130065002 A | 6/2013 |
| KR | 20130079302 A | 7/2013 |
| KR | 102058563 B1 | 12/2019 |
| WO | WO 2005013554 A2 | 2/2005 |
| WO | WO 2010028690 A1 | 3/2010 |
| WO | WO 2012159270 A1 | 11/2012 |
| WO | WO 2012166969 A1 | 12/2012 |
| WO | WO 2012166975 A1 | 12/2012 |
| WO | WO 2013067685 A1 | 5/2013 |
| WO | WO 2013067686 A1 | 5/2013 |
| WO | WO 2013074462 A1 | 5/2013 |
| WO | WO 2013181515 A2 | 12/2013 |

OTHER PUBLICATIONS

"Device discovery in network coverage", 3GPP Tdoc R1-132248, 3GPP TSG RAN WG1 Meeting #73, Fukuoka, Japan, May 20-24, 2013, 4 pages.

Ericsson, "D2D Physical Channels Design", 3GPP Tdoc R1-140776; 3GPP TSG RAN WG1 Meeting #76; Prague, Czech Republic, Feb. 10-14, 2014, 9 pages.

"3rd Generation Partnership Project, Technical Specification Group Radio Access Network, Evolved Universal Terrestrial Radio Access (E-UTRA), Multiplexing and channel coding (Release 11)", 3GPP TS 36.212 V11.3.0, Jun. 2013, 84 pages.

Brd Generation Partnership Project; Technical Specification Group Radio Access Network; Evolved Universal Terrestrial Radio Access (E-UTRA); Medium Access Control (MAC) protocol specification (Release 11), 3GPP TS 36.321 V11.3.0, Jun. 2013, 57 pages.

Qualcomm Incorporated, "Techniques for D2D Communication", 3GPP Tdoc R1-132504; 3GPP TSG-RAN WG1 #73; Fukuoka, Japan, May 20-24, 2013, 13 pages.

Ericsson, "Overview of D2D functions needing standardization", 3GPP Tdoc R2-140797; 3GPP TSG-RAN WG2 #85; Prague, Czech Republic, Feb. 10-14, 2014, 7 pages.

"On scheduling procedure for D2D", 3GPP Tdoc R1-140778; 3GPP TSG-RAN WG1 Meeting #76; Prague, Czech Republic, Feb. 10-14, 2014, 5 pages.

Interdigital, "Recommendations for D2D evaluation methodology and assumptions", 3GPP Tdoc R1-130236, 3GPP TSG-RAN WG1 Meeting #72, St Julian's, Malta, Jan. 28-Feb. 1, 2013, 5 pages.

Ericsson, "Resource allocation for D2D transmitters in coverage", 3GPP Tdoc R2-140625; 3GPP TSG-RAN WG2 #85; Prague, Czech Republic, Feb. 10-14, 2014, 5 pages.

(56) References Cited

OTHER PUBLICATIONS

Ericsson, "On Procedures for In/Out of NW coverage detection for D2D", Tdoc R1-140780, 3GPP TSG RAN WG1 Meeting #76, Prague, CZ Rep, Feb. 10-14, 2013, 5 pages.
3rd Generation Partnership Project; Technical Specification Group Radio Access Network; Evolved Universal Terrestrial Radio Access (E-UTRA); Physical Channels and Modulation (Release 11), 3GPP TS 36.211 V11.3.0, Jun. 2013, 29 pages.
Ericsson, "On D2D communication modes", 3GPP Tdoc R1-132459; 3GPP TSG-RAN WG1 Meeting #73; Fukuoka, Japan, May 20-24, 2013, 2 pages.
Intel Corporation, "Discussion on design options for D2D communication", 3GPP Tdoc R1-131925, 3GPP TSG RAN WG1 Meeting #73, Fukuoka, Japan, May 20-24, 2013, 5 pages.
Ericsson, "On physical channel design for D2D broadcast communication and discovery", 3GPP Tdoc R1-141557; 3GPP TSG-RAN WG1 Meeting #76bis; Shenzhen, China, Mar. 31-Apr. 4, 2014, 6 pages.
3rd Generation Partnership Project, Technical Specification Group Radio Access Network, Evolved Universal Terrestrial Radio Access (E-UTRA), Radio Resource Control (RRC), Protocol specification (Release 11), 3GPP TS 36.331 V11.5.0, Sep. 2013, 347 pages.

* cited by examiner

DISTRIBUTED SCHEDULING FOR DEVICE-TO-DEVICE COMMUNICATION

CROSS REFERENCE TO RELATED APPLICATIONS

This application is a Continuation of U.S. patent application Ser. No. 16/574,342 filed Sep. 18, 2019, which is a Continuation of U.S. patent application Ser. No. 14/910,285 filed Feb. 5, 2016, which is the National Stage of International Application No. PCT/US2014/049985 filed Aug. 6, 2014, which claims the benefit of U.S. Provisional Patent Application Nos. (i) 61/863,319 filed Aug. 7, 2013, (ii) 61/881,843 filed Sep. 24, 2013, (iii) 61/882,402 filed Sep. 25, 2013, (iv) 61/882,489 filed Sep. 25, 2013, (v) 61/933,236 filed Jan. 29, 2014, (vi) 61/955,567 filed Mar. 19, 2014, (vii) 61/955,733 filed on Mar. 19, 2014, and (viii) 61/989,892 filed on May 7, 2014, the contents of each of which are hereby incorporated by reference herein.

BACKGROUND

Cellular communication networks may be configured to enable direct Device-to-Device (D2D) communications, for example, between wireless transmit/receive units (WTRUs) located within radio range of each other. Enabling D2D communications may enhance the spectrum efficiency of a cellular communications network, for example by allowing devices (e.g., WTRUs) to communicate with each other directly rather than sending communications to each other via a corresponding core network. D2D communications may allow devices (e.g., WTRUs) to communicate with each other autonomously even in absence of coverage by a cellular communications network or networks are unavailable due to outage or failure.

However, enabling D2D communications may present resource allocation challenges in a cellular communications network. For example, enabling D2D communications may cause increased interference, such as interference caused by overlapping use (e.g., simultaneous use) of a portion of spectrum for both D2D communications and core network communications. The resource allocation used in a mobile system (e.g., including a base station and one or more WTRUs) may not be suitable for use in D2D communications. D2D communications operating in the absence of cellular communications networks may require management of communications radio resources and operating conditions by devices (e.g., WTRUs) themselves. D2D communications may refer to transmission and/or reception of D2D data.

SUMMARY

Systems, methods, and instrumentalities are provided to implement scheduling for device-to-device (D2D). A wireless transmit receive unit (WTRU) (e.g., a D2D WTRU) may determine whether the WTRU has D2D data to transmit. The WTRU may determine a set of allowed scheduling assignment (SA) resources, e.g., on a condition that the WTRU has D2D data to transmit. The WTRU may detect an indication that the WTRU has data ready for transmission. For example, the indication may be determined by monitoring a buffer status indication.

The WTRU may determine a set of allowed SA resources for transmission of the SA. The allowed resources may be a subset of a set of configured SA resources or may be same as the set of configured SA resources. The allowed SA resources may be configured (e.g., pre-configured in USIM or in the application). The set of allowed SA resources may be based on a received signal from an evolved node B (eNB), e.g., via a dedicated RRC configuration signal or a signal broadcasted on a System Interface Block (SIB). The set of allowed SA resources may be explicitly indicated by the eNB, e.g., via a grant.

The WTRU may be configured to determine the set of allowed SA resources based on the received signal from a second D2D WTRU. For example, the WTRU may determine the set of allowed SA resources based on a received signal from a Physical D2D Synchronization Channel (PD2DSCH) or a D2D-related control message.

The WTRU may select an SA resource (e.g., from the set of allowed SA resources) for transmission from the set of allowed SA resources. The WTRU may transmit an SA, e.g., after determining that D2D data is ready for transmission. The WTRU may select the SA resource, from the set of allowed SA resources, randomly or based on received signals and/or measurements. The WTRU may be configured to measure power on previous SA resources and determine the set of available SA resources from the set of allowed SA resources by determining the resources that may not be used.

The WTRU may determine and/or select the SA resource based on the characteristics of the data to be transmitted. For example, the WTRU may determine and/or select the SA resource based on one or more of the quality of service (QoS) (and/or QoS class identifier (QCI)), traffic type (e.g., delay-sensitive vs non-delay-sensitive), application or other characteristic associated to the data, logical channel priorities, etc. The association between the SA or set of SAs within the set of allowed SA and the data characteristics may be configured (e.g., pre-configured) in the application, the Universal Subscriber Identity Module (USIM), or via Radio Resource Control (RRC) signaling.

The WTRU may determine a set of allowed D2D data resources. For example, the WTRU may be configured (e.g., pre-configured) with a set of allowed D2D data resources to use, e.g., when not under network coverage. The set of allowed D2D data resources may be configured in the USIM or at the application layer. The WTRU may determine the set of allowed D2D data resources based on the received signal from an eNB. The received signal may be a dedicated RRC configuration signal or a signal broadcasted on the SIBs.

The WTRU may determine the set of allowed D2D data resources based on the received signal from a second D2D WTRU. The WTRU may receive the allowed D2D data resources via a Physical D2D Synchronization Channel (PD2DSCH) or a D2D-related control message. For example, the set of allowed D2D data resources may be the same as the set of D2D data configured resources.

The WTRU may determine the set of allowed D2D data resources based on the set of allowed SA resources. For example, the WTRU may select the set of allowed D2D data resources based on the selected SA resources. The association between the set of allowed D2D data resources and the set of allowed SA resources may be implicit or based on a configuration.

The WTRU may determine the set of allowed D2D data resources based on the characteristics of the data be transmitted. For example, the WTRU may be configured to select the set of allowed D2D data resources based on one or more of the Quality of Service (QoS) (and/or QoS Class Identifier (QCI)), traffic type (e.g., delay-sensitive vs non-delay-sensitive), time budget to transmit the data in the buffer, amount of data in the buffer, application or other characteristic associated to the data, or logical channel priority. The association between the set of allowed D2D data resources and the data characteristics may be configured (e.g., pre-configured). For example, the data characteristics may be configured in the application or the USIM, or received via RRC signaling.

The WTRU may determine the set of available D2D data resources, e.g., using power-based approach. The WTRU may measure the amount of interference or the total received signal power for one or more D2D data resources. The WTRU may determine that a D2D data resource is available, e.g., by applying a threshold on the measurement (choosing resources for which low received signal power is measured).

The WTRU may determine the set of available D2D data resources, e.g., using SA monitoring based approach. The WTRU may monitor the SAs from other WTRUs and determine which D2D data resources are not in use by other D2D communications. The determination may be performed, e.g., by determining the D2D data resources associated with each SA successfully received and marking those resources as not available. The WTRU may use the information from power measurements and/or SA reception. The WTRU may determine the set of available D2D data resources by considering the intersection of the set of resource available from the power-based approach and the inverse of the set of non-available resources as determined by the SA monitoring based approach. The WTRU may make such measurements and determination based on measurements on one or more previous scheduling periods. The measurements may be valid for a time period. The WTRU may perform measurements periodically to maintain a valid list of available D2D data resources.

The WTRU may select a D2D data resource from the set of allowed D2D data resources for transmission of the D2D data. The D2D data may include data mapped to a D2D service. For example, the WTRU may select a D2D data resource for transmission from the set of allowed D2D data resources randomly or based on one or more measurements. The WTRU may be configured to determine the set of available D2D data resources.

The WTRU may be configured to select one or more of the following transmission parameters: TBS, MCS, bandwidth (or number of PRBs), number of HARQ processes, inter-PDU interval time, number of HARQ transmissions. For example, the WTRU may select the transmission parameters for the duration of a scheduling period associated with a SA. The transmission parameters may be associated with the D2D data. The transmission parameters may include one or more of a time unit (e.g., a subframe), or one or more Physical Resource Blocks (PRBs).

The WTRU may determine the number of bits to transmit during a scheduling period or interval based on one or more of the amount of data in the D2D buffer, the data priority, and the type of data (e.g., delay sensitive or not) associated to the configured applications (e.g., voice, video streaming, etc.), a transmission rate for the data to be transmitted For example, the WTRU may determine the Transport Block Size (TBS), Modulation-and-Coding Scheme (MC S) and bandwidth (BW) of each of the transmissions in a scheduling period. The WTRU may determine the number of bits to transmit during a scheduling period or interval by estimating the amount of data that may be transmitted during the interval and the number of new Medium Access Control (MAC) Packet Data Units (PDU) that may be transmitted according to the Hybrid Automatic Repeat reQuest (HARM) profile and the D2D transmission pattern.

The WTRU may be configured to select a transmission pattern (e.g., a hopping pattern). The WTRU may set the transmission pattern based on one or more parameters, such as UE ID, transmission pattern index, SA resource. The information on which the hopping pattern may be based may be indicated in an SA. For example, the WTRU may determine a transmission pattern based on one or more identifiers carried in the SA (e.g., the source ID, target ID, etc.). The WTRU may set a transmission pattern based on the target ID associated with a D2D data transmission and a D2D transmission pattern index. For example, the WTRU may set the transmission pattern based on a target ID and/or an SA resource.

The WTRU may encode the control information and transmit the control information, e.g., using a Physical Uplink Shared Channel (PUSCH) like structure. The structure may have a fixed format and/or may be known to the receiver. The WTRU may include control information from one or more of the following elements: MCS, D2D transmission pattern, number of PRB (or BW), destination ID, etc.

The WTRU may be configured to transmit data, e.g., according to the information in an associated SA. The WTRU may determine the start of the scheduling period associated with the selected SA resource. The WTRU may transmit the data on the first transmit occasion. The WTRU may transmit data according to the selected transmission parameters, e.g., as indicated in the SA. The WTRU may transmit data within the scheduling period determined according to the selected transmission pattern.

BRIEF DESCRIPTION OF THE DRAWINGS

A more detailed understanding may be had from the following description, given by way of example in conjunction with the accompanying drawings.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Figure 1A:
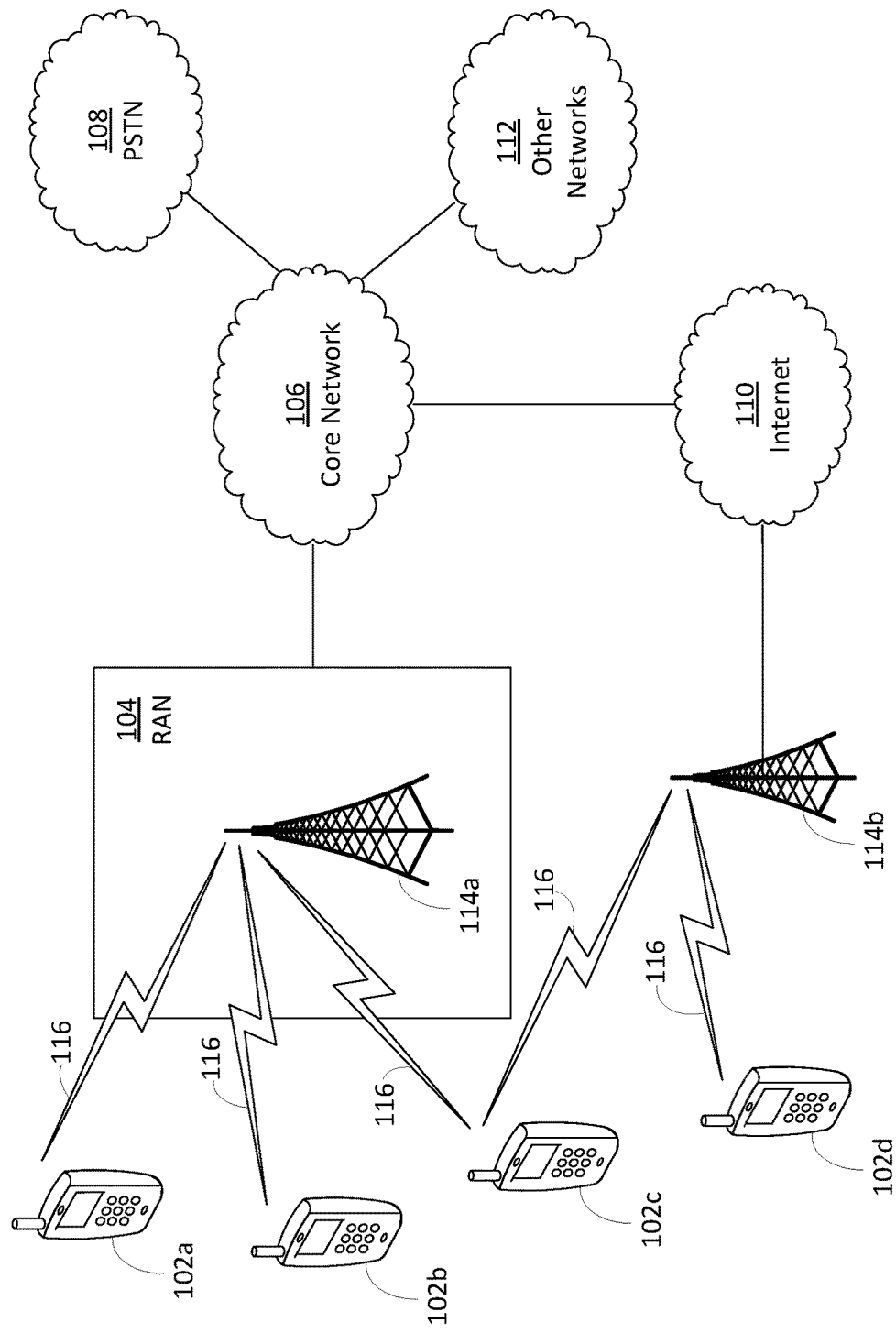
FIG. 1A illustrates a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
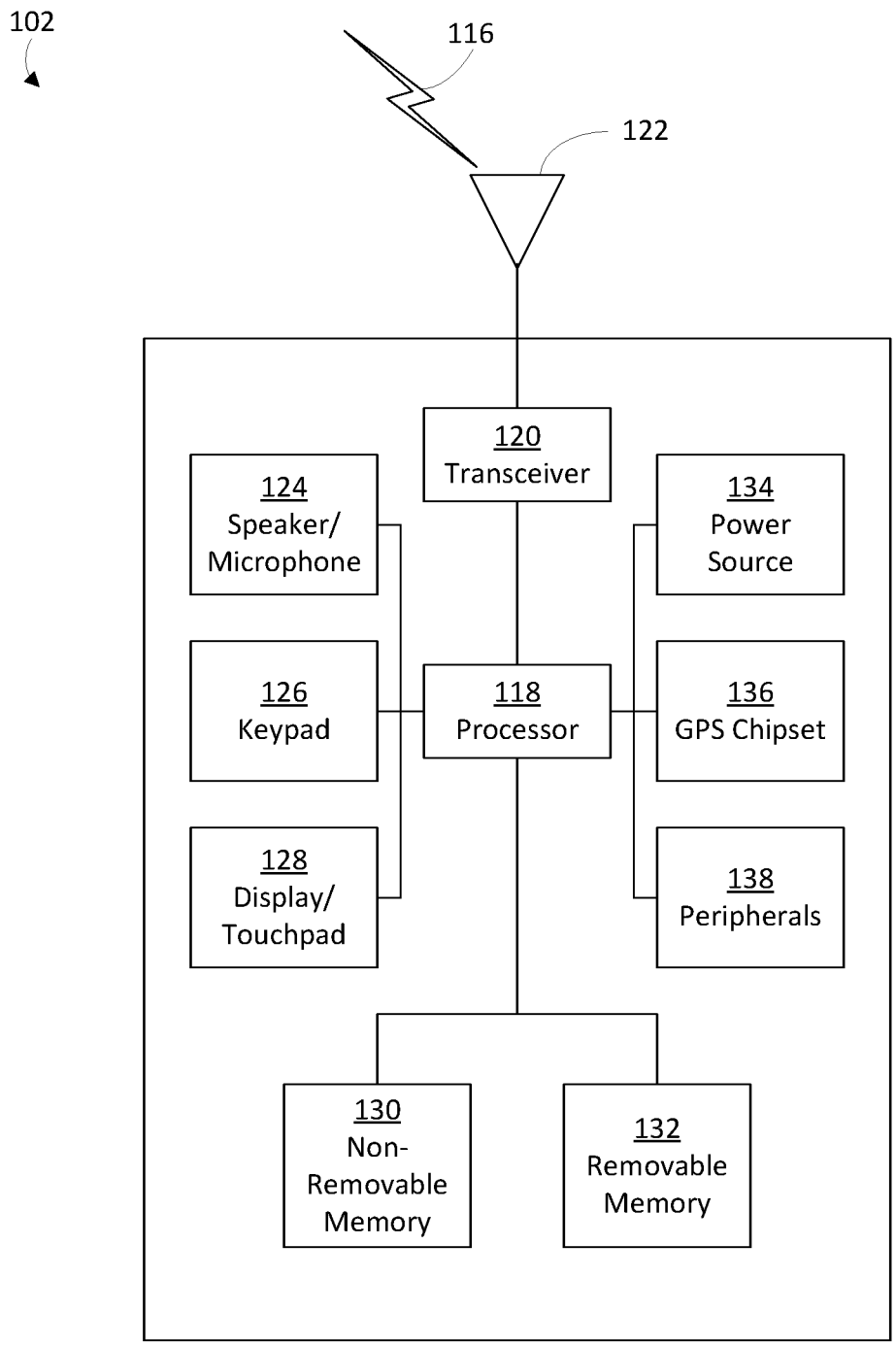
FIG. 1B illustrates a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, an satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
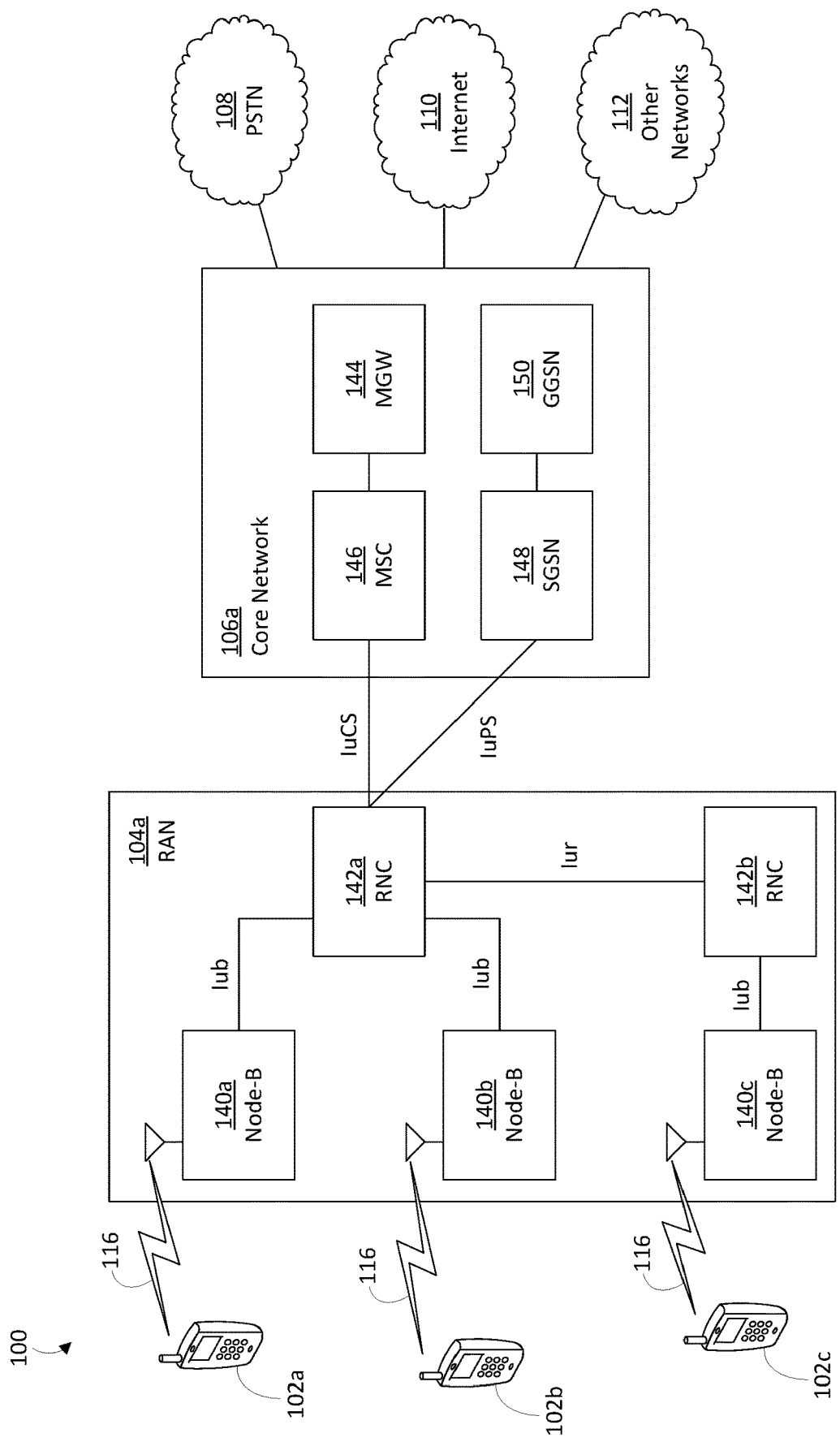
FIG. 1C illustrates a system diagram of an example radio access network and an example core network that may be used within the communications system illustrated in FIG. 1A.

FIG. 1C is a system diagram of an embodiment of the communications system 100 that includes a RAN 104a and a core network 106a that comprise example implementations of the RAN 104 and the core network 106, respectively. As noted above, the RAN 104, for instance the RAN 104a, may employ a UTRA radio technology to communicate with the WTRUs 102a, 102b, 102c over the air interface 116. The RAN 104a may also be in communication with the core network 106a. As shown in FIG. 1C, the RAN 104a may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104a. The RAN 104a may also include RNCs 142a, 142b. It should be appreciated that the RAN 104a may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106a shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements is depicted as part of the core network 106a, it should be appreciated that any one of these elements may be owned and/or operated by an entity other than the core network operator.

The RNC 142a in the RAN 104a may be connected to the MSC 146 in the core network 106a via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104a may also be connected to the SGSN 148 in the core network 106a via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106a may also be connected to the networks 112, which may include other wired or wireless networks that are owned and/or operated by other service providers.

Figure 1D:
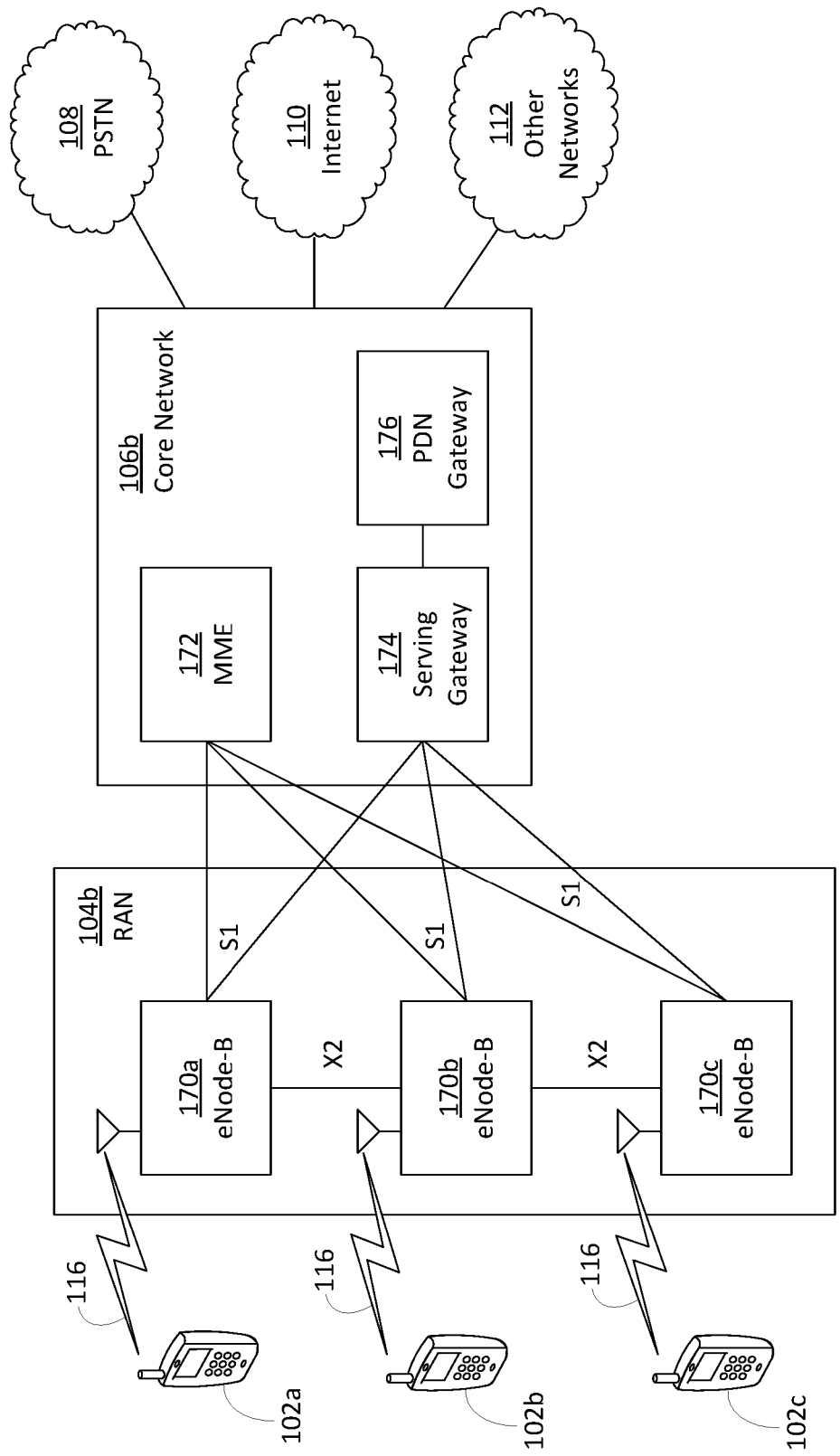
FIG. 1D illustrates a system diagram of an example radio access network and an example core network that may be used within the communications system illustrated in FIG. 1A.

FIG. 1D is a system diagram of an embodiment of the communications system 100 that includes a RAN 104b and a core network 106b that comprise example implementations of the RAN 104 and the core network 106, respectively. As noted above, the RAN 104, for instance the RAN 104b, may employ an E-UTRA radio technology to communicate with the WTRUs 102a, 102b, and 102c over the air interface 116. The RAN 104b may also be in communication with the core network 106b.

The RAN 104b may include eNode-Bs 170a, 170b, 170c, though it should be appreciated that the RAN 104b may include any number of eNode-Bs while remaining consistent with an embodiment. The eNode-Bs 170a, 170b, 170c may each include one or more transceivers for communicating with the WTRUs 102a, 102b, 102c over the air interface 116. In one embodiment, the eNode-Bs 170a, 170b, 170c may implement MIMO technology. Thus, the eNode-B 170a, for example, may use multiple antennas to transmit wireless signals to, and receive wireless signals from, the WTRU 102a.

Each of the eNode-Bs 170a, 170b, 170c may be associated with a particular cell (not shown) and may be configured to handle radio resource management decisions, handover decisions, scheduling of users in the uplink and/or downlink, and the like. As shown in FIG. 1D, the eNode-Bs 170a, 170b, 170c may communicate with one another over an X2 interface.

The core network 106b shown in FIG. 1D may include a mobility management gateway (MME) 172, a serving gateway 174, and a packet data network (PDN) gateway 176. While each of the foregoing elements is depicted as part of the core network 106b, it should be appreciated that any one of these elements may be owned and/or operated by an entity other than the core network operator.

The MME 172 may be connected to each of the eNode-Bs 170a, 170b, 170c in the RAN 104b via an S1 interface and may serve as a control node. For example, the MME 172 may be responsible for authenticating users of the WTRUs 102a, 102b, 102c, bearer activation/deactivation, selecting a particular serving gateway during an initial attach of the WTRUs 102a, 102b, 102c, and the like. The MME 172 may also provide a control plane function for switching between the RAN 104b and other RANs (not shown) that employ other radio technologies, such as GSM or WCDMA.

The serving gateway 174 may be connected to each of the eNode Bs 170a, 170b, 170c in the RAN 104b via the S1 interface. The serving gateway 174 may generally route and forward user data packets to/from the WTRUs 102a, 102b, 102c. The serving gateway 174 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 174 may also be connected to the PDN gateway 176, which may provide the WTRUs 102a, 102b, 102c with access to packet-switched networks, such as the Internet 110, to facilitate communications between the WTRUs 102a, 102b, 102c and IP-enabled devices.

The core network 106b may facilitate communications with other networks. For example, the core network 106b may provide the WTRUs 102a, 102b, 102c with access to circuit-switched networks, such as the PSTN 108, to facilitate communications between the WTRUs 102a, 102b, 102c and traditional land-line communications devices. For example, the core network 106b may include, or may communicate with, an IP gateway (e.g., an IP multimedia subsystem (IMS) server) that serves as an interface between the core network 106b and the PSTN 108. In addition, the core network 106b may provide the WTRUs 102a, 102b, 102c with access to the networks 112, which may include other wired or wireless networks that are owned and/or operated by other service providers.

Figure 1E:
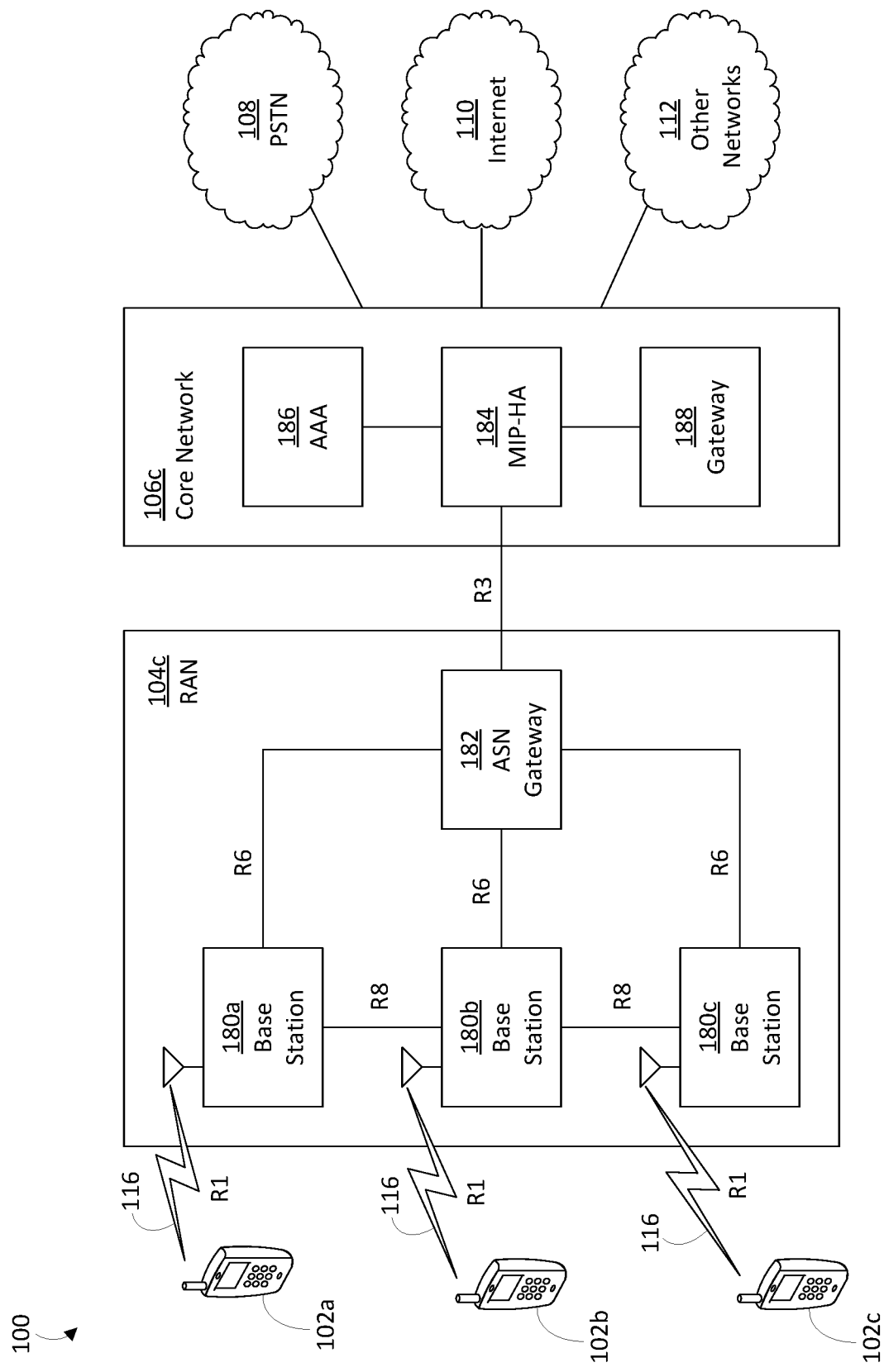
FIG. 1E illustrates a system diagram of an example radio access network and an example core network that may be used within the communications system illustrated in FIG. 1A.

FIG. 1E is a system diagram of an embodiment of the communications system 100 that includes a RAN 104c and a core network 106c that comprise example implementations of the RAN 104 and the core network 106, respectively. The RAN 104, for instance the RAN 104c, may be an access service network (ASN) that employs IEEE 802.16 radio technology to communicate with the WTRUs 102a, 102b, 102c over the air interface 116. As described herein, the communication links between the different functional entities of the WTRUs 102a, 102b, 102c, the RAN 104c, and the core network 106c may be defined as reference points.

As shown in FIG. 1E, the RAN 104c may include base stations 180a, 180b, 180c, and an ASN gateway 182, though it should be appreciated that the RAN 104c may include any number of base stations and ASN gateways while remaining consistent with an embodiment. The base stations 180a, 180b, 180c may each be associated with a particular cell (not shown) in the RAN 104c and may each include one or more transceivers for communicating with the WTRUs 102a, 102b, 102c over the air interface 116. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN Gateway 182 may serve as a traffic aggregation point and may be responsible for paging, caching of subscriber profiles, routing to the core network 106c, and the like.

The air interface 116 between the WTRUs 102a, 102b, 102c and the RAN 104c may be defined as an R1 reference point that implements the IEEE 802.16 specification. In addition, each of the WTRUs 102a, 102b, 102c may establish a logical interface (not shown) with the core network 106c. The logical interface between the WTRUs 102a, 102b, 102c and the core network 106c may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 104c may be connected to the core network 106c. The communication link between the RAN 104c and the core network 106c may defined as an R3 reference point that includes protocols for facilitating data transfer and mobility management capabilities, for example. The core network 106c may include a mobile IP home agent (MIP-HA) 184, an authentication, authorization, accounting (AAA) server 186, and a gateway 188. While each of the foregoing elements is depicted as part of the core network 106c, it should be appreciated that any one of these elements may be owned and/or operated by an entity other than the core network operator.

The MIP-HA 184 may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. In addition, the gateway 188 may provide the WTRUs 102a, 102b, 102c with access to the networks 112, which may include other wired or wireless networks that are owned and/or operated by other service providers.

Although not shown in FIG. 1E, it should be appreciated that the RAN 104c may be connected to other ASNs and the core network 106c may be connected to other core networks. The communication link between the RAN 104c the other ASNs may be defined as an R4 reference point, which may include protocols for coordinating the mobility of the WTRUs 102a, 102b, 102c between the RAN 104c and the other ASNs. The communication link between the core network 106c and the other core networks may be defined as an R5 reference point, which may include protocols for facilitating interworking between home core networks and visited core networks.

Systems, methods, and instrumentalities are provided to describe distributed approaches to scheduling of D2D communications resources. A wireless transmit/receive unit (WTRU) configured for D2D communications (a D2D WTRU) may be configured in a system with or without a centralized controller. The D2D WTRU may be configured (e.g., pre-configured) with a set of D2D communications related parameters, including, e.g., a set of resources for transmission and/or reception of scheduling assignment (SA) and/or data communications. The SAs may be referred to as Resource Request (RREQ) messages or as scheduling announcement messages. A set of resources configured for SAs may be referred to as the set of configured SA resources. A set of resources configured for data communications may be referred to as the set of configured D2D data communications resources. The set of D2D data communications resources may include one or more of a set of PRBs, a set of subframes, a set of transmission patterns (e.g., in time, frequency or time and frequency), or a scheduling period duration. A transmission pattern may be referred to as time resource pattern of transmission (T-RPT). A scheduling period may alternatively also be referred to as transmission period or allocation interval or grant duration. A D2D WTRU may select resources (e.g., SA resources and/or data communication resources) under a constraint of limiting interference with a resource selected by another transmitter. A D2D WTRU may be configured to determine one or more conditions for transmitting data, for example whether to transmit data on a selected channel, whether data transmission is conditioned on not causing a collision, and/or whether data transmission is conditioned on not exceeding an interference threshold. A D2D WTRU may be configured to determine the interference that may be incurred by one or more other concurrently transmitting D2D WTRUs, for example, for the purposes of link adaptation or resource selection.

A resource may be defined in time, frequency, code and/or sequence, and/or space domains. A resource may be indicated by a sequence or a set with each entry defined in a combination of the domains. A WTRU (e.g., a D2D WTRU) that sends data to one or more other WTRUs (e.g., one or more other D2D WTRUs) may be referred to as a source WTRU. A WTRU (e.g., a D2D WTRU) that receives a D2D communication (e.g., data) from a source WTRU may be referred to as a destination WTRU. A WTRU (e.g., a D2D WTRU) that is in range (e.g., radio communication range) of a source WTRU but that is not selected as and/or intended as a receiver of a D2D communication (e.g., data) transmitted from a source WTRU, may be referred to as a non-destination WTRU. A WTRU may be configured to perform source WTRU, destination WTRU, and/or non-destination WTRU actions.

A WTRU may be configured to perform one or more source WTRU actions in accordance with a D2D communication. For example, these actions may include: transmitting SAs in response to respective triggering events; selecting resources for the transmission of SAs; and/or selecting resources for the transmission of data; and/or selecting resources for the transmission of D2D control or service signaling.

A WTRU may be configured to transmit one or more SAs, for example, in response to the occurrence of one or more triggering events, which may include one or more of: data being ready or scheduled for transmission; expiration of a timer; receiving one or more SAs; or the absence of an SA. An SA may be a control message that may be used to request or negotiate a resource. An SA may be used for one or more other purposes, for example, link adaptation, resource indication, WTRU presence indication, and/or WTRU status indication, and the like. A resource may be defined in one or more of the following domains: time; frequency; code and/or sequence, and/or space. An SA may be used to announce the use or the intention to use a resource. An SA may be transmitted more than once in a scheduling period. An SA may be associated with the same or a later or to multiple scheduling periods where a WTRU transmits D2D data.

A WTRU (e.g., a D2D WTRU) may have D2D data ready for transmission, for example in its data buffer. The WTRU may be configured to initiate transmission of an SA followed by transmission of data. The WTRU may be configured to transmit an SA, e.g., when the WTRU has data that is ready for transmission. The readiness of data for transmission may be indicated by a buffer status indication.

A WTRU may be configured to transmit an SA, e.g., based on the expiration of a timer. A WTRU may be configured to periodically transmit SAs, e.g., even when the WTRU may not have data (e.g., D2D data) to transmit. The WTRUs may transmit SAs periodically, for example, to indicate a presence of the WTRU and/or a status of the WTRU. Such a timer may be restarted, for example, upon the transmission of an SA, or upon a subsequent transmission of data.

A WTRU may be configured to transmit an SA based on the reception of an RRSP message. A resource response (RRSP) message may be a control or service message that may be provided in response to a resource request (e.g., an SA). An RRSP message may be used for one or more other purposes, for example link adaptation, resource indication, WTRU presence indication, or WTRU status indication. A WTRU may be triggered to transmit an SA based on content of the RRSP message.

A WTRU may be configured to transmit an SA based on the absence of a response (e.g., an RRSP message). For example, a WTRU may be triggered to transmit an SA based on the lack of receipt of a response (e.g., an RRSP message) from a destination WTRU prior to the expiration of a timer. Such a timer may be started upon transmission of the SA, for example.

A WTRU may be configured to transmit an SA, e.g., when the WTRU has identified that it is within coverage of a network. The WTRU may be configured to identify in-network coverage with at least one of a number of procedures, processes, or techniques. For example, the WTRU may be configured to identify in-network coverage by identifying a primary synchronization signal (PSS) or secondary synchronization signal (SSS) or common reference signal power above a predetermined threshold. The WTRU may be configured to identify in-network coverage when it has successfully decoded a physical broadcast channel (PBCH) or a common control channel. The WTRU may be configured to identify in-network coverage when it has successfully performed network entry, e.g., when it has obtained a timing advance or a radio network temporary identity (e.g., C-RNTI) or when it successfully completed network access procedures.

A WTRU (e.g., a D2D WTRU) may be configured to determine a set of allowed SA resources for transmission of the SA. The set of allowed SA resources may be a subset of a set of configured SA resources. For example, the WTRU may be pre-configured with a set of allowed SA resources to use, e.g., when the WTRU may not be under network coverage. For example, the set of allowed SA resources may be configured in the USIM of the WTRU, in its memory, or at the application layer.

The WTRU may determine the set of allowed SA resources, e.g., based on a signal received from a base station (e.g., an eNB). For example, a dedicated radio resource control (RRC) configuration signal or a signal broadcasted in the system information broadcasts (SIBs). The WTRU may determine the set of allowed SA resources based on the received signal from another D2D UE, for example via the PD2DSCH (Physical D2D Synchronization Channel) or another D2D control message. For example, the set of allowed SA resources may be the same as the set of configured SA resources. The allowed SA resource may be explicitly indicated by the base station via a grant.

A WTRU (e.g., a D2D WTRU) may be configured to determine and/or select an SA resource based on the characteristics of the data to be transmitted. For example, a WTRU may be configured to determine and/or select the SA based on one or more of the QoS (and/or QCI), traffic type (e.g., delay-sensitive vs non-delay-sensitive), application and/or other characteristic associated with the transmission data, or logical channel priorities. For example, a first SA resource may be selected for D2D data carrying voice, but a second SA resource may be selected for D2D data carrying IP packets. The association between the SA or set of SAs within a set of allowed SA and the transmission data characteristics may be pre-configured, for example in the application, the USIM, in device memory, or via RRC signaling.

A WTRU may be configured to select an SA resource for transmitting one or more SAs from the set of allowed SAs. An SA resource may be provided to a WTRU, for example via RRC signaling. A WTRU may be configured to select a resource from among a set of resources. For example, a WTRU may be configured to select an SA resource randomly for transmitting one or more SAs from a set of allowed SA resources. For example, an identity associated with the WTRU may be used for a random generator seed. For example, a random number may be used to determine an SA resource.

The WTRU may be configured to select the SA resource from the set of allowed SA resources based on received signals and/or measurements. For example, the WTRU may be configured to measure the power on previous SA resources and determine the set of available SA resources from the set of allowed SA resources by determining which resources are not being used (e.g., via receive power threshold or based on successful reception of the SA). The WTRU may be configured to measure the interference level in the set of allowed SA resources regions and select an SA resource that is subject to less interference or selected from a set of least interfered SA resources.

A WTRU may be configured to select an SA resource based on selection of a data transmission resource or an SA resource used in one or more previous SA transmissions, RRSP, and/or data transmissions. For example, a WTRU may be configured to select a resource based on selection of a data transmission resource using a predefined mapping between data and SA resources to determine an SA resource. For example, a WTRU that has selected a resource for data transmission at subframe N+X may select an SA resource at subframe N. In another example, a WTRU that has selected a resource for data transmission at Resource Block N may select an SA resource at Resource Block (N+X) % M (e.g., where X is a positive or null integer and M is a total number of Resource Blocks).

A WTRU may be configured to select a resource based on a resource used in one or more previous SA transmissions, RRSP messages, and/or D2D data or control, for example using a predefined mapping between a previous resource and a selected resource to determine an SA resource. In an example, a WTRU that has previously selected a resource for data or SA transmission at Resource Block N may select an SA resource at Resource Block (N+X) % M.

A WTRU may be configured to select a resource by identifying whether a transmission is outgoing on the channel, e.g., by trying to decode at least one of the following types of bursts on the channel: synchronization, control, and/or data.

A WTRU may be configured to select an SA resource at least in part by deriving SA transmission opportunities based at least in part on a location of synchronization, control, and/or data bursts and a predetermined channel structure.

A WTRU may be configured to select an SA resource at least in part by considering a preemption slot as an SA transmission opportunity. The WTRU may be configured to consider a preemption slot as an SA transmission opportunity, e.g., if its communication priority is higher than the priority set for the ongoing communication.

A WTRU (e.g., a D2D WTRU) may be configured to determine a set of allowed D2D data resources. The determination of allowed D2D data resources may take place in different instant of time than determining the allowed D2D SA resources. For example, the WTRU may be pre-configured with set of allowed D2D data resources to use when the WTRU may not be under network coverage. The set of allowed D2D data resources may be configured in the USIM, in device memory or at the application layer, for example.

The WTRU may determine the set of allowed D2D data resources based on the received signal from base station (e.g., an eNode B (eNB)). For example, the WTRU may receive the signal via a dedicated RRC configuration signal or an SIB broadcast signal. The WTRU may receive the signal via a DL Control Channel message.

The WTRU may determine the set of allowed D2D data resources based on the received signal from another D2D WTRU, for example, via PD2DSCH (Physical D2D Synchronization Channel) or a D2D-related control message. The set of allowed D2D data resources may be the same as the set of D2D data configured resources.

The WTRU may be configured to determine the set of allowed D2D data resources based on the set of allowed SA resources. The WTRU may be configured to select a set of allowed D2D data resources based on the selected SA resources. The association between the set of allowed D2D data resources and the set of allowed SA resources may be implicit or based on a configuration.

A WTRU may transmit D2D data according to the information in the associated SA. For example, a WTRU may determine the start of the scheduling period associated with the selected SA resource. The WTRU may transmit the data according to the parameters indicated in the SA. For example the WTRU may transmit the data on the first transmit occasion within the scheduling period determined according to the selected pattern. The WTRU may determine the transmission schedule for D2D data according to the T-RPT associated with the SA.

The WTRU may be configured to determine the set of allowed D2D data resources based on the characteristics of the data be transmitted. The WTRU may be configured to select a set of allowed D2D data resources based on one or more of the QoS (and/or QCI), traffic type (e.g., delay-sensitive, non-delay-sensitive, etc.), time budget to transmit the data in the buffer, amount of data in the buffer, application or other characteristic associated to the data, or logical channel priority. The association between the set of allowed D2D data resources and the data characteristics may be pre-configured. For example, the D2D data resources and the data characteristics may be pre-configured in the application or the USIM, in device memory or may be provided via RRC signaling.

A resource (e.g., a D2D data resource) may be provided to a WTRU, for example, via RRC signaling, and/or the WTRU may be configured to select a resource from a set of resources. A WTRU may be configured to select a resource for transmitting data from the set of allowed D2D data resources for transmission of the D2D data. For example, the WTRU may be configured to randomly select a D2D data resource for transmission from the set of allowed D2D data resources.

A WTRU may be configured to determine whether a resource is available (e.g., designated as available) using one or more RRSP messages received by the WTRU. For example, a WTRU may be configured to use an explicit binary indication from a received RRSP message. A WTRU may be configured to use one or more measurements applied to an SA (e.g., an SA transmitted by the WTRU) by a receiver of the SA (e.g., a destination WTRU). A WTRU may be configured to use one or more measurements transmitted to the WTRU (e.g., in an RRSP message). The measurements may be performed by a receiver of the SA, e.g., a destination WTRU. A WTRU may be configured to make the measurements on a reference signal (e.g. D2DSS, or DM-RS) associated to the SA and/or RRSP. A WTRU may be configured to apply one or more measurements to one or more RRSP messages received by the WTRU (e.g., an RRSP message received from a destination WTRU). A WTRU may be configured to determine whether a resource is available (e.g., designated as available). For example, a WTRU may be configured to determine whether a resource is available using one or more of the following procedures. A WTRU may be configured to designate a resource as available if the WTRU has not received an SA requesting the resource (e.g., within a predetermined time interval). A WTRU may be configured to designate a resource as available if the WTRU is not using the resource for an ongoing communication. A WTRU may apply one or more measurements on a requested resource. The WTRU may compare respective values of the one or more measurements with a threshold value. If the WTRU determines that the respective values of the one or more measurements are below the threshold value, the WTRU may designate the resource associated to the one or more measurements, as available.

A WTRU having identified network coverage, e.g., as described herein may combine any of the procedures, processes or techniques described herein with information on resource availability provided by the network to determine whether a resource is available. For example, the network may transmit a table indicating a level of interferences, e.g., measured by a base station (e.g., an eNB) or by a set of WTRUs on each resource.

A WTRU may be configured to perform procedures to set the content of one or more RRSP messages. For example, a WTRU may be configured to set one or more elements of an RRSP message, such as a resource index, a random token, an echo token, measurement results, or additional information pertaining to one or more non-available resources.

A WTRU may be configured to compare respective values of the one or more measurements with a threshold value, e.g., if the WTRU is configured to determine whether a resource is available by using one or more measurements applied to an SA (e.g., measurements applied by a receiver of the SA). The WTRU may be configured to determine if respective values of the one or more measurements are below the threshold value. The RRSP message may not be taken into account to determine the availability of the resource, for example, when the receiver of the SA that applied the measurement is considered far enough away (e.g., geographically) to not be interfered with by a data transmission by the WTRU.

A WTRU may be configured to compare respective values of the one or more measurements with a threshold value, e.g., if the WTRU is configured to apply one or more measurements to an RRSP message received by the WTRU. The WTRU may be configured to determine if the respective values of the one or more measurements are below the threshold value. The RRSP message may not be taken into account to determine the availability of the resource, for example, when the sender of the RRSP message is considered far enough away (e.g., geographically) to not be interfered with by a data transmission by the WTRU.

A WTRU may be configured to select a D2D data resource for transmission, for example, based on one or more measurements. For example, the WTRU may be configured to determine a set of available D2D data resources. A WTRU may be configured to determine the set of available D2D data resources (e.g., utilizing a power measurement-based approach). The WTRU may be configured to measure the amount of interference or the total received signal power for one or more D2D data resources. The WTRU may determine whether a D2D data resource is available, for example, by applying a threshold on the measurement. For example the WTRU may choose D2D data resources with low measured received signal power.

A WTRU (e.g., a D2D WTRU) may utilize SA monitoring based approach to determine which D2D data resources may be used. The WTRU may be configured to monitor one or more SAs from other WTRUs and determine the D2D data resources that are not in use by other D2D communications. For example, the D2D may determine data resources associated with each SA successfully received and marking those resources as not available. The WTRU may be configured to use the information from the power measurements and from the SA reception to determine a set of available D2D data resources. For example the WTRU may determine the available D2D data resources by considering the intersection of the set of resource available from the power-based approach and the inverse of the set of non-available resources as determined by the SA monitoring based approach. The WTRU may be configured to make such measurements and determination based on measurements on one or more previous scheduling periods. The measurements may be valid for an interval of time. The WTRU may be configured to perform measurements periodically, for example, to maintain a valid list of available D2D data resources.

A WTRU may be configured to select a resource for transmitting data, for example, based on a resource used in a previous SA, RRSP, scheduling period or data transmission interval. A WTRU may be configured to select a resource for transmitting data, for example, based on information received in one or more previous RRSP messages and/or transmitted in one or more previous SAs.

A WTRU may be configured to select a resource R1, e.g. if the resource is designated as available. For example, the availability of the resource R1 may be indicated by messages, e.g., messages received in response to SA transmissions from one or more destination WTRUs and/or non-destination WTRUs. A WTRU may select a resource R1, if R1 is indicated by SA, implicitly or explicitly. A WTRU may select a resource R1, e.g., if the resource R1 is designated as available by one or more destination and/or non-destination WTRUs having respective relative priorities that are equal to or greater than a priority of a data transmission of the WTRU. For example, non-available status designations from non-destination WTRUs may not be taken into account if those WTRUs have respective lower relative priorities. For example, priority based distinction of status designation may be based on D2D service or messaging or signaling type. A WTRU may select a resource R1, e.g., if the resource is designated as available by the WTRU based on sensing and/or based on the reception of other SAs and/or based on expiration of a timer.

If a resource R1 that was indicated in one or more previous SAs as non-available (e.g., in one or more received RRSP messages) or is designated as non-available for other reasons (e.g., determined via sensing), a WTRU may select another resource within a set of resources that may exclude R1. Such a resource may be selected randomly or according to a predetermined order, for example. A WTRU may randomly select a resource within a set of resources that may exclude R1 and Ri, e.g., if one or more SAs include other non-available resources Ri.

A WTRU may be configured such that if one or more selected resources (e.g., all selected resources) are designated as non-available, the WTRU may select a best resource from one or more received RRSP messages. In such an example, the WTRU may be further configured to transmit one or more SA messages to indicate the selected best resource.

A WTRU may be configured to set the content of one or more SA. For example, a WTRU may be configured to set one or more elements of an SA, such as a resource indication or a resource transmission index for data transmission, a random token, or a priority index of data. A WTRU may be configured to set a resource indication or a resource index for data transmission. The resource indication or resource transmission index may be based upon procedures used by the WTRU for selection of a resource for transmitting data, for example as described herein. A WTRU may be configured to set a random token. The WTRU may be configured to assign a value to the token within predefined boundaries. The value may be completely random or may be biased by a status of the WTRU (e.g., a buffer status) or by capabilities of the WTRU (e.g., a WTRU priority assigned during ProSe registration). A WTRU may be configured to set a priority index of data. The WTRU may compute a priority index for data communication based on, for example, one or more of the following elements: a quality of service (QoS); a buffer status; a time elapsed since a last transmission; a WTRU identifier; a WTRU or channel permissions level (e.g., as determined by configuration); and/or the like. A WTRU may be configured to set a security context.

A WTRU may be configured to set one or more identifiers. Some examples of an identifier (ID) may include: a user equipment ID, a target user equipment ID, a destination user equipment ID, a bearer ID, a logical channel number ID, a group ID, a communication ID, and/or the like. A WTRU may be configured to set a sequence number. A WTRU may be configured to set a flag indicating that the message is to preempt the channel. These may be included as part of the SA, RRSP or RREQ or be included into the D2D data transmission packets associated therewith.

A Physical D2D Broadcast Channel (PDBCH) may be provided. The PDBCH may carry control information or D2D data. The PDBCH may also be referred to as Physical D2D Broadcast Shared Channel (PDBSCH). The PDBCH or the PDBSCH may be referred to as scheduling assignment (SA) when carrying control information. The PDBCH or the PDBSCH may be referred to as D2D PSCH when carrying data.

Control information may be transmitted (e.g., transmitted implicitly or explicitly) in a physical channel, such as the PDBCH. A transmitting device (e.g., a D2D WTRU) may encode (e.g., separately encode) control information and/or transport block data. The transmitting deice may interleave and/or modulate the two sets of encoded bits and map the symbols to the same SA in a TTI or a subframe. The device may process and transmit the two sets of encoded bits as two distinct associated transmissions. The control information may be represented by a set of bits (e.g., a field) representing one of a set of possible values for the control information. The possible values may be pre-defined, pre-configured, and/or provided by higher layer signaling. Fields for different types of control information may be concatenated and/or jointly encoded. The fields may be concatenated and/or encoded separately from the data of the transport blocks.

Prior to encoding, a cyclic redundancy check (CRC) may be appended to the concatenated set of fields to increase reliability. The CRC may be masked with a bit field associated to the transmitter (e.g., a user ID or a service ID). The encoded bits may be punctured (or rate-matched) to fit the bits within a number of modulation symbols.

The encoded control information bits may be interleaved with the encoded bits from the transport blocks in such a way that the corresponding modulation symbols are mapped to a specific set of resource elements of the SA. The modulation and coding rates of the coding information may be pre-defined to facilitate decoding by the receiver.

The modulation used for the coding of control information may be set to be the same as the modulation used for the transport block data. For example, dummy bits may be interleaved with coded bits of the control information, e.g., when a high-order modulation is used (e.g., 64-quadrature amplitude modulation (QAM)). The dummy bits may be interleaved with coded bits of the control information to obtain a level of reliability similar to a low-order modulation (e.g., quadrature phase shift keying (QPSK)). The encoded control information bits may be modulated and mapped to a separate physical signal instead of being mapped to the SA along with higher layer data. The control information may be concatenated and jointly encoded with data from transport blocks. This approach may be useful for transferring control information that may not be directly relevant to the decoding of the transport blocks in the same subframe.

A receiving device may decode a transport block from an SA by decoding control information mapped to the SA and applying the control information to decode the transport block of the SA. A receiving device may decode an SA in a subframe by decoding control information to decode higher layer data included in the SA, if any. For example, the control information included in the SA may be indicative of a modulation and coding scheme used for the higher layer data. The control information included in the SA may be indicative of a T-RPT associated with a data transmission. Following decoding of the control information indicating the modulation and coding scheme, the WTRU may start processing the resource elements carrying data of the SA to decode the data.

To decode control information, a receiving WTRU may detect a subframe coarse timing based on a preamble or synchronization signals and/or DB-DMRS reference signals. The WTRU may identify the resource elements carrying the control information (e.g., an OFDM symbol) and demodulate the symbols mapped on these resource elements.

The WTRU may demodulate each of the resource elements of the PDBCH assuming a certain modulation order and extract the coded bits of the control information by de-interleaving the coded bits from the coded bits of one or more transport blocks.

The WTRU may attempt to decode the control information, e.g., by assuming a number of information bits (or coding rate). On a condition that multiple combinations of control information (or control information formats) are allowed, the WTRU may attempt decoding assuming each of the combinations and determine the applicable format based on successful CRC verification (blind decoding). On a condition that CRC verification is successful for a combination, the WTRU may attempt to demodulate and decode coded bits of the one or more transport blocks using, in an embodiment, all or some of the values obtained for the coding information (e.g., a modulation-and-coding scheme (MCS), a redundancy version, a retransmission sequence number, a new data indicator, a transport block size indicator, a HARQ process indicator, a resource block allocation, a WTRU and/or group identity, a channel identity, or a security context identity). The WTRU may deliver the one or more transport blocks to a higher layer, and the higher layer data may be successfully detected based on verification of the CRC appended to this data.

The WTRU may be configured to carry explicit control information in a symbol of the SA. The exact symbol in the subframe, for example, may be the first symbol in the subframe and/or may be a symbol adjacent to a pilot symbol (DB-DMRS) to maximize the probability of correct detection.

The WTRU may encode and/or interleave control information in the SA using an embodiment similar to that used for the encoding and interleaving of some uplink control information (such as HARQ acknowledgement/negative acknowledgement (A/N) and rank indication). The WTRU may transmit the SA using the Physical Uplink Shared Channel (PUSCH) structure. The WTRU may include control information from one or more of the following elements: MCS, D2D transmission pattern, number of PRB (or BW), destination ID. The WTRU may encode the control information and transmit using a PUSCH-like transmission structure with a fixed format, known to the receiver. For example, an MCS indicator, a new data indicator, a HARQ process indicator and retransmission sequence numbers may be jointly encoded using a block code or convolutional code, and the encoded bits may be interleaved such that the modulated symbols are mapped to resource elements in OFDM symbols close or adjacent to the DB-DMRS.

Control information may be multiplexed with a synchronization sequence or reference signal in a single OFDM signal. In an embodiment, the control information may be coded and then multiplexed with the sync sequence and/or the DB-DMRS signal in one of the OFDM symbols. For example, the WTRU may use one of the existing coding mechanisms already defined in the standards (e.g., convolution code) with a pre-defined amount of puncturing.

Figure 2:
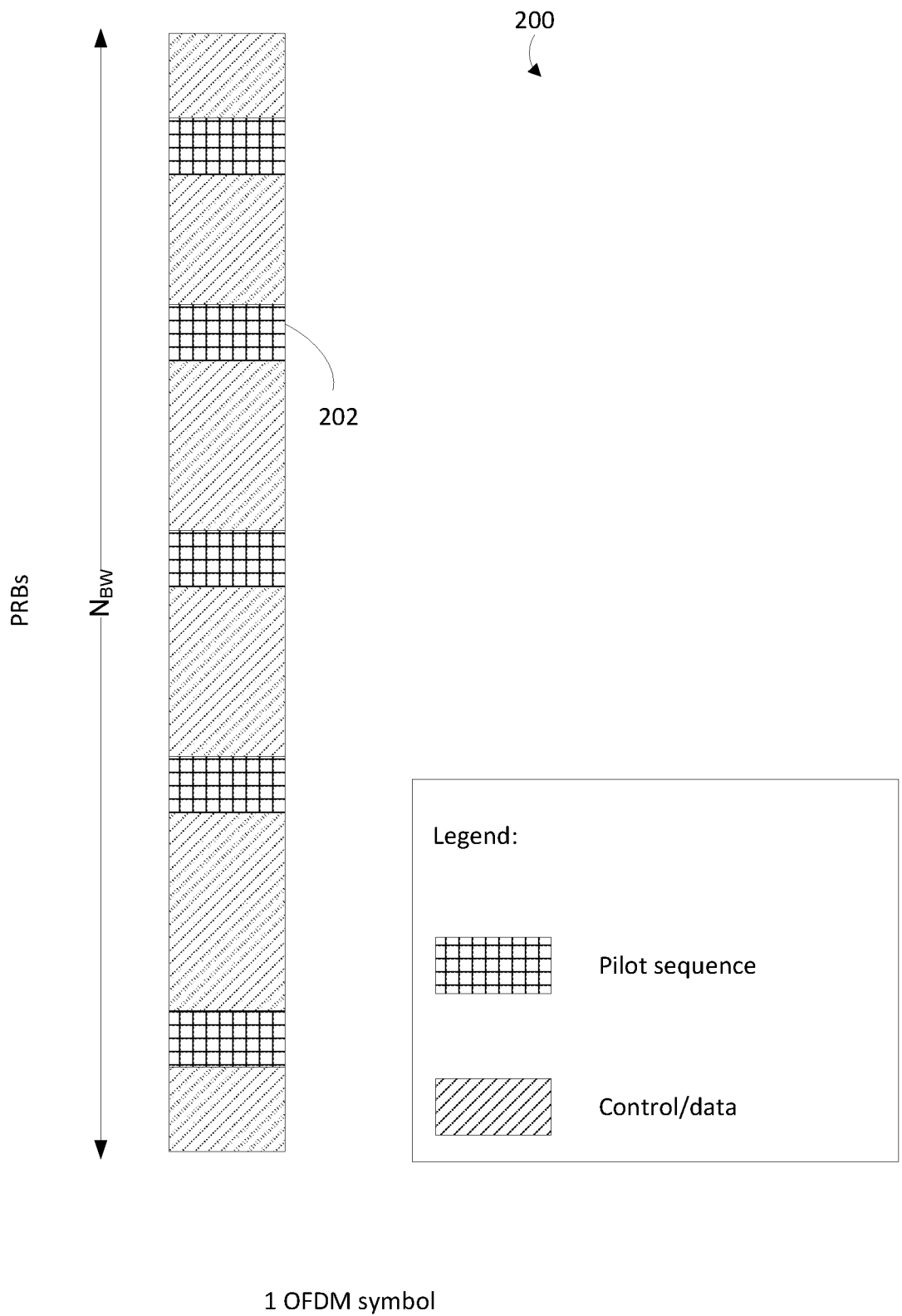
FIG. 2 is illustrates an example of an OFDM symbol carrying pilot and control information.

FIG. 2 illustrates an example of an OFDM symbol 200 carrying pilot and control information. As illustrated in FIG. 2, the pilot bits 202 are spread across the $N_{BW}$ PRBs of the transmitted signal in order for the pilot bits to cover the entire spectrum to allow channel estimation at the receiver.

An SA may carry additional control information in place of data from a transport block. A WTRU may include control information (and no data from higher layers) in a subframe where the WTRU may transmit the SA. This may be referred to as SA control transmission or an SA transmission. This may occur, for example, at the beginning of a new transmission burst, periodically, or upon a change of transmission parameters.

For example, an SA control transmission may be used at the beginning of a VoIP talk spurt or the beginning of a scheduling period to announce applicable transmission formats including MCS and/or HARQ process related information to receiving devices. In such a context, the SA transmission may serve the purpose of a scheduling assignment. This approach may allow these devices to process subsequently received SA transmissions including higher layer data in a power efficient manner and keep decoding complexity low.

An SA transmission may include less or additional control information compared to a normal SA transmission, e.g., carrying at least one transport block where control information is multiplexed into the same TTI. For example, control information contained on an SA transmission may possibly comprise a different set of control information elements when compared to an SA transmission where data and control are multiplexed into the same TTI.

An SA transmission in a first TTI transmitted by a device may include control information to announce which time/frequency resources may be used during a time period for any transmission containing user data from that device. A first SA transmitted by a device may include control information announcing the transmission format and/or HARQ related process information for at least one second or multiple following SA transmission in later TTI(s). For example, the SA sent in a first TTI may include at least an MCS setting that communicates to a receiver of the broadcast D2D transmission which modulation scheme and/or channel coding setting is in use for one or more subsequently transmitted SAs containing D2D data from that device in the form of one or more transport blocks.

Figure 3:
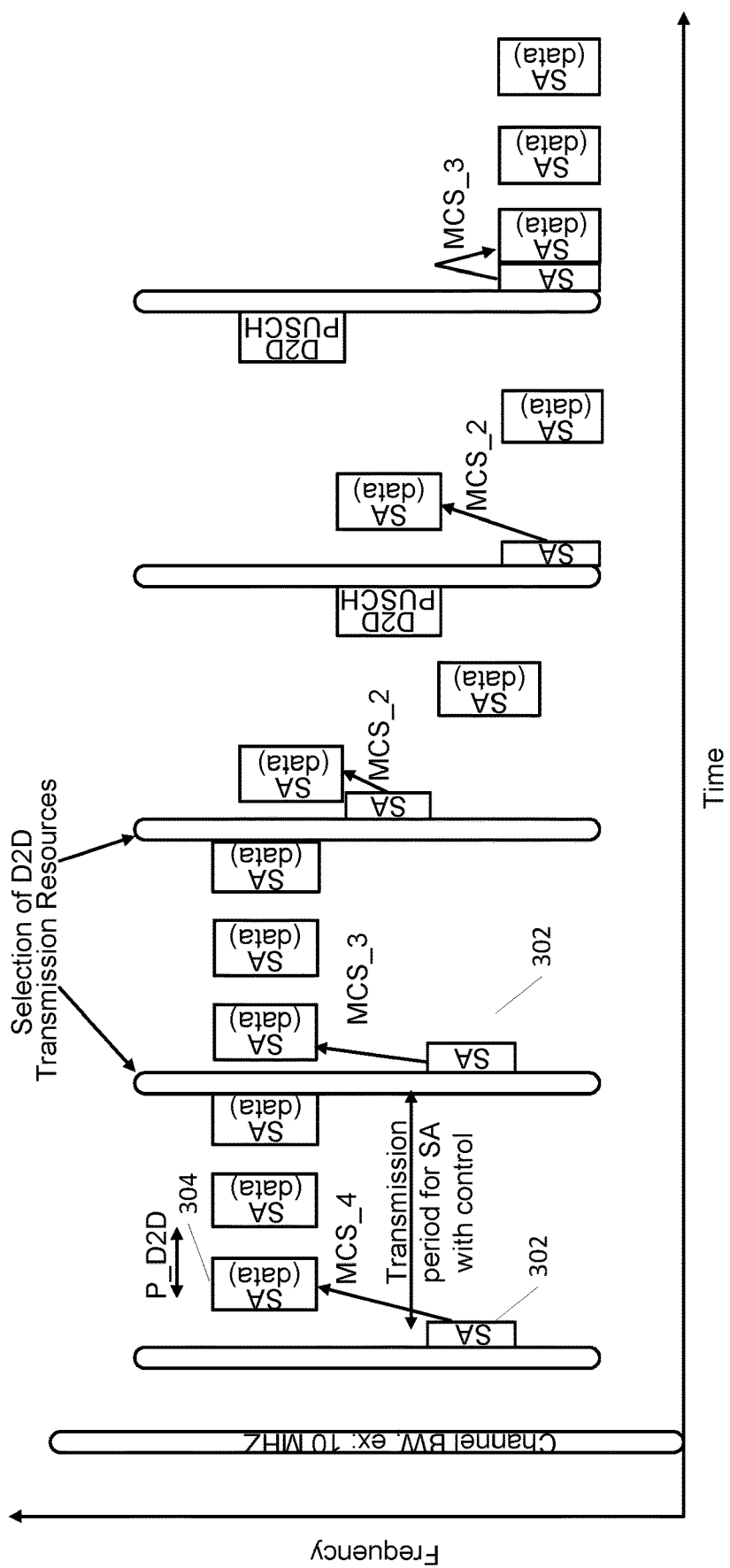
FIG. 3 illustrates an example of a scheduling assignment (SA) with control information used to announce transmission format(s) of an SA including data.

In an example, the SA sent in a first TTI may include HARQ related process settings that communicate to a receiver of the broadcast D2D transmission which HARQ process and/or which sequence instance like an RV number for a given HARQ process and/or whether a new transport block is sent for a given HARQ process for one or more subsequently transmitted SAs including D2D data from that device in the form of one or more transport blocks. FIG. 3 illustrates the example of a first SA 302 used to announce the transmission format settings for a later transmission period where an SA with data 304 is transmitted.

Figure 4:
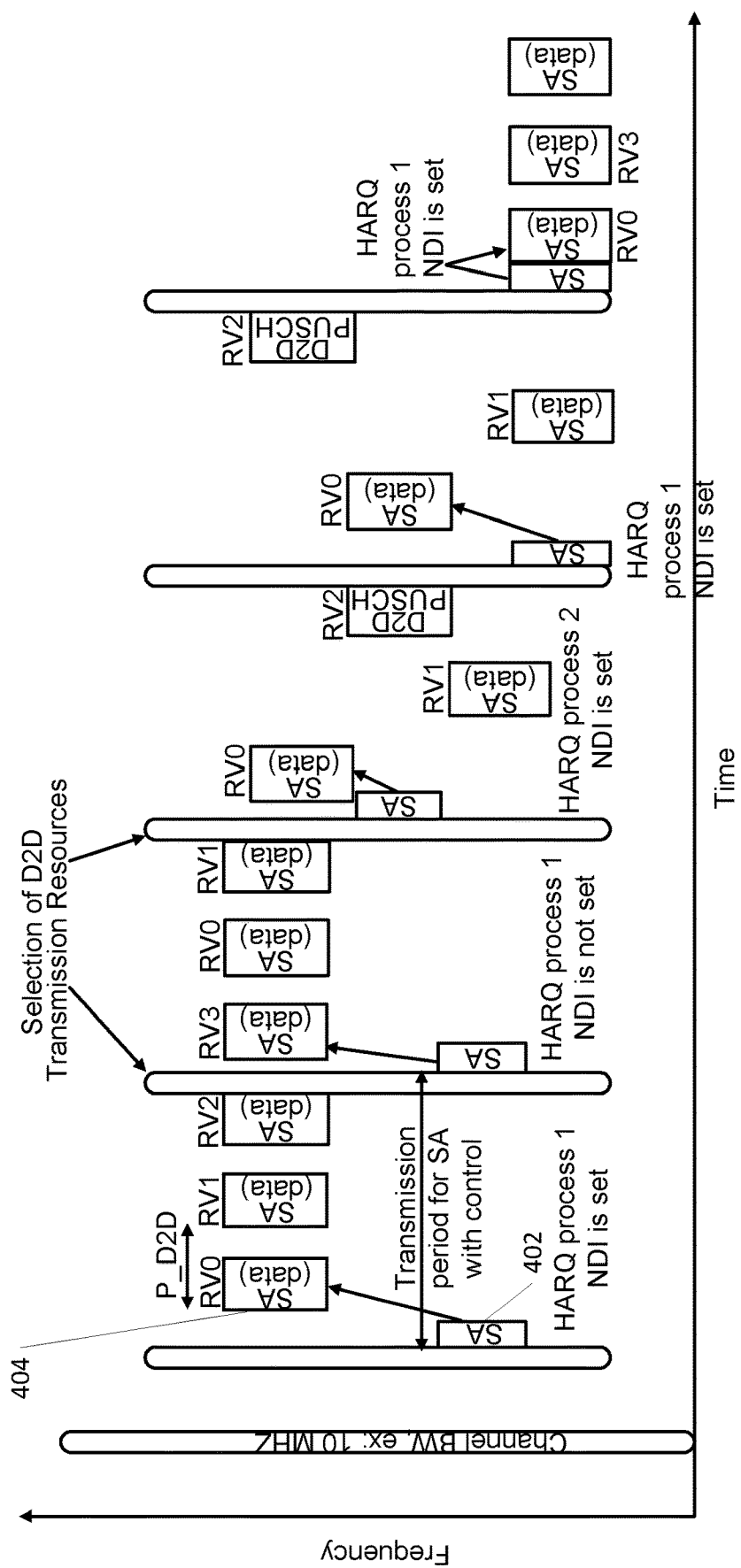
FIG. 4 illustrates an example of an SA with control information that may announce HARQ process related information for an SA including data.

FIG. 4 illustrates an example of an SA used to announce HARQ related process information for later SA(s) with user data. As illustrated in FIG. 4, control information may be in part included in TTI's with the SA 402 and/or in part in TTI's with user data 404. The SA at the beginning of the scheduling period may contain a HARQ process number indication and a New Data Indicator (NDI) indication. The actual redundancy version (RV) indication used to generate the SA with user data in this example may be provided as part of control signaling multiplexed in a TTI where the SA with user data is sent.

The SA may allow for efficient low-complexity processing of an SA including user data. In an example an SA may be sent intermittently in some TTI's, e.g., in-between SA transmissions including only data. In an example, only control information may be inserted in an SA in some TTI's. In an example, different types of control information may be included inserted in TTI's multiplexing both control information and data. In an example, control information may be sent on a dynamic per-TTI basis as part of any SA transmission, e.g., in the absence or presence of a user data transport block.

An SA may be realized using a number of different embodiments. In one embodiment, the SA may be processed in the same way as an SA including user data, except that modulation symbols that may carry data from transport blocks may use pre-defined (e.g., dummy) values or may be muted (e.g., sent with zero power).

In an example, an SA may be transmitted using a transmission format known to the receiver, possibly from a set of more than one candidate transmission formats in a limited or restricted set of settings. For example, an SA may be transmitted by a transmitting device selecting a specific transmission setting out of N=4 possible allowed transmission settings. A receiver attempting to decode the SA may perform a blind detection process to determine the specific transmission setting. If a D2D transmitter is allowed to select from N=4 robust QPSK modulation schemes at different channel coding rate settings, i.e., different MCS settings, some limited flexibility for semi-static link adaptation may be introduced at a relatively small and modest expense in terms of added receiver complexity. Transmission format settings from the candidate set may include, for example, different settings for modulation schemes, channel coding rate, or size of the control information field(s), possibly represented by MCS, TB size, etc.

The control information in an SA may be processed in the same way as transport block data in the SA. For example, a control information field may indicate whether the SA carries only control information. When this field is indicates control-only information, other control information fields that may normally be concatenated and processed as control information may be set to pre-defined values. This may allow a receiving device to detect the presence of an SA with control information without having to perform multiple blind decoding attempts.

An SA may be identified by a special OFDM symbol or encoding sequence in the subframe that indicates the format of the remainder of the subframe (e.g., with or without control information). The WTRU may be configured to transmit this special OFDM symbol or encoding sequence at a predefined symbol in the subframe. The WTRU may be further configured to select the content of this OFDM symbol or values for the encoding sequence to indicate the format of the subframe. For example, the WTRU may be configured with one or more different bit sequences (e.g., different roots of a fixed-length Zadoff-Chu sequence) associated to each configured subframe format. The WTRU may select the actual bit sequence based on the subframe format it transmits. In this example, the receiving WTU may be configured to detect the sequence transmitted on the special OFDM symbol and determine the subframe format by looking into the pre-configured association table.

The WTRU may be configured to receive information from a transmitter device. The WTRU may be configured to determine configuration information from information received from a transmitter device. The transmitter device may be configured to determine configuration information. The WTRU may determine configuration information based on data received. The WTRU may determine configuration information based on a group, service, and/or application identity. For example, the WTRU may determine configuration information based on a group, service, and/or application identity for which data may be transmitted. A WTRU may be configured to transmit data pertaining to a group identity, for example, in a channel or on a carrier frequency.

The WTRU may be configured to receive data. The WTRU may be configured to determine configuration information based on a type of data. The WTRU may be configured to receive data including QoS information. The WTRU may be configured to determine configuration information based on QoS characteristics of the data. The WTRU may be configured to transmit data. The WTRU may be configured to transmit data for a codec type. The WTRU may be configured to transmit data for a codec type in a channel or carrier frequency. The carrier frequency may be associated with the codec type. The channel or carrier frequency may be associated to the codec type using a resource block allocation. The channel or carrier frequency may be associated with the codec type using a modulation order or modulation scheme or transmission format. The channel or carrier frequency may be associated with the codec type using a coding scheme that may be associated to a codec rate. The WTRU may determine a codec rate. The WTRU may determine the codec rate that may apply to a transmission. The WTRU may determine the codec rate that may apply to a transmission as a function of the channel or carrier frequency used for the transmission. The WTRU may be preconfigured with a set of one or more codec types and/or rates. The WTRU may be configured to index codec types and/or rates. The WTRU may be configured to associate a physical layer configuration to encoding parameters. The WTRU may be configured to associate a physical layer configuration to codec types and/or rates.

The WTRU may be configured to select configuration information. The WTRU may be configured to select configuration information from a set of values. The WTRU may be configured to receive values from an application or from memory on the device. The WTRU may be configured to select configuration information from a set of values received from the application or memory on the device. The WTRU may be pre-configured with values. The WTRU may be configured to select values from the preconfigured values. The WTRU may be configured to randomly select values. The WTRU may be configured to select a sequence identifier. The WTRU may be configured to randomly select a sequence identifier. The WTRU may be configured to select a sequence identifier from a range of sequence identifiers. The WTRU may be configured to select a channel or carrier frequency. The WTRU may be configured to transmit data. The WTRU may be configured to transmit data on a physical channel. The WTRU may be configured to randomly select a carrier frequency to transmit data on a physical channel. The WTRU may be configured to select an index to a security context. The WTRU may be configured to randomly select an index to a security context.

The WTRU may be configured to determine configuration information based on measurements. The WTRU may be configured to select a channel or carrier frequency including an interference measurement. The WTRU may be configured to select a channel or carrier frequency on which an interference measurement is minimized. The WTRU may be configured to select a channel or carrier frequency on which an interference measurement is below a threshold. The WTRU may be configured to select a channel or carrier frequency from a set of channels or carrier frequencies. The WTRU may be configured to determine channels or carrier frequencies from an application or from device memory. The WTRU may be preconfigured with channels or carrier frequencies. The WTRU may be configured to select a channel or carrier frequency based on information from the application. The WTRU may be configured to select a channel or carrier frequency based on information from the preconfigured channel or carrier frequencies. The WTRU may be configured to select an MCS. The WTRU may be configured to select a codec rate based on a measured level of interference over a carrier frequency. The WTRU may be configured to select an MCS based on a measured level of interference over a carrier frequency The WTRU may be configured to select configuration information based on feedback from one or more receiving devices. The WTRU may be configured to select configuration information parameters. The WTRU may be configured to select configuration information parameters based on a scheduling assignment. The WTRU may be configured to transmit selected configuration information values. The WTRU may be configured to transmit selected configuration information values based on a pre-configured physical resource.

The WTRU may be configured to determine a scheduling assignment. The WTRU may be configured to encode configuration information. The WTRU may be configured to determine a scheduling assignment by encoding configuration information. The WTRU may be configured to encode configuration information included as control information at the physical layer. The WTRU may transmit the scheduling assignment using a physical control channel. The WTRU may be configured to interleave configuration information into the physical channel. The physical channel may be used for carrying data. The physical channel may use a format applicable to transmissions with control information. The WTRU may be configured to encode configuration information in a control PDU. The WTRU may be configured to encode configuration information in a control element of a higher layer protocol. The higher layer protocol may be a MAC. The WTRU may be configured to transmit a transport block containing the configuration information. The WTRU may be configured to transmit a transport block containing the configuration information using a physical channel for data transmission.

The scheduling assignment may include encrypted information or include information fields derived from identifiers by means of cryptographic hash values. The WTRU may be preconfigured with a security context. The scheduling assignment may include integrity-protected information using the pre-configured security context. The scheduling assignment may include integrity-protected information with MAC-I appended. The WTRU may be preconfigured with a security context, wherein the security context is separate from the security context used for the transmission of data. The scheduling assignment may include a sequence number. The scheduling assignment may include a user identity or an identifier recognizable to a user provisioned with the proper cryptographic credentials. The scheduling assignment may include a sequence number, wherein the sequence number is incremented at one or more transmission of the scheduling assignment.

The scheduling assignment may have a validity period. The WTRU may be configured to consider the configuration information invalid after the validity period expires. The WTRU may be configured to transmit the scheduling assignment. The WTRU may be configured to transmit the scheduling assignment periodically. The WTRU may be configured to transmit the scheduling assignment upon determination of a trigger. The WTRU may be configured to transmit the scheduling assignment upon determination of a trigger, wherein the trigger is the expiration of a timer. The timer may start at the last transmission of the scheduling assignment. The timer may start when the WTRU has data to transmit. The data may be D2D data. The timer may start when the WTRU receives data to transmit.

The WTRU may transmit the scheduling assignment on the same carrier frequency as physical channels. The WTRU may transmit the scheduling assignment on a different carrier frequency as physical channels. The WTRU may transmit the scheduling assignment on the same carrier frequency used for transmitting data. The WTRU may transmit the scheduling assignment on a different carrier frequency than the carrier frequency used for transmitting data. The WTRU may transmit the scheduling assignment on the same carrier frequency used for transmitting control information. The WTRU may transmit the scheduling assignment on a different carrier frequency than the carrier frequency used for transmitting control information. The scheduling assignment may include a dedicated physical resource. The WTRU may be configured with a dedicated physical resource. The scheduling assignment may include a dedicated physical resource specific to a WTRU. The dedicated physical resource may be similar to a PUCCH resource index for a control channel similar to PUCCH.

The scheduling assignment may include control information. Control information may include a sequence identifier for synchronization. Control information may include a sequence identifier for demodulation reference signals. Control information may include a security context identifier applicable to data transmissions. Control information may include a carrier frequency. Control information may include a modulation. Control information may include a coding scheme used in data transmissions. Control information may include a set of resource blocks within the carrier frequency. Control information may include a codec rate.

A WTRU may be configured to determine a best resource to use, for example, in response to a lack of resources that are designated as available for use by the WTRU (e.g., when there are no resources that are designated as available for use by the WTRU).

A WTRU may be configured to use one or more measurements that are applied to one or more SAs by respective receivers of the SAs, and that are transmitted to the WTRU, for example in one or more corresponding SAs. Such measurements may be used, for example, to identify a WTRU (e.g., a destination WTRU or a non-destination WTRU) that is furthest from the WTRU. A resource that corresponds to the furthest WTRU may be selected as the best resource.

A WTRU may be configured to apply one or more measurements to one or more SAs. Such measurements may be used, for example, to identify a WTRU (e.g., a destination or non-destination WTRU) that is furthest from the WTRU. A resource that corresponds to the furthest WTRU may be selected as the best resource.

A WTRU may be configured to add or combine one or more measurements pertaining to one or more respective SAs and/or responses related to the SA messages. The WTRU may compute an average value of resource usage in a neighborhood of the WTRU. The WTRU may select a best resource based on this combination and/or average resource usage value.

A WTRU may be configured to use a random token to select a best resource. For example, a resource associated with a WTRU (e.g., a destination or non-destination WTRU) having a lowest token value may be selected as the best resource.

A WTRU may be configured to use a priority index of data to select a best resource. For example, a resource associated with a lowest priority index may be selected as the best resource. A WTRU may be configured to use at least one measurement to monitor one or more of the available resources and select the best resource for data decoding. A WTRU may be configured to receive an SA that may indicate a set of resources used.

A WTRU may be configured to determine a relative priority between multiple communications, for example, using one or more of the following elements: a random token; a priority index of data; a resource used for an SA; and/or an identifier associated with the transmission. For example, the WTRU may determine the priority of another communication based on an identifier associated with the transmission.

The WTRU may determine one or more identifiers associated with the transmission. For example, the WTRU may determine the identifier from the received SA. The identifier may be indicated explicitly, for example, in a field of the SA. The identifier may be indicated implicitly, for example, based on one or more characteristics of a signal (e.g., DMRS cyclic shift, ZC sequence root, scrambling sequence, etc.).

The WTRU may be configured to determine the relative priority based on a destination group identifier, for example, received in the SA. The WTRU may be configured (e.g., pre-configured) with group identifier priorities.

The WTRU may be configured to determine the relative priority based on a transmission source identifier. In a public safety example, communication priority may be given to a group commander or a dispatcher, for example.

A WTRU may be configured to determine if the WTRU can transmit data, for instance based on one or more of a number of example criteria or conditions. A WTRU may be configured to apply one or more measurements on a channel before transmitting. The WTRU may compare the value of at least one such measurement with a predetermined threshold value, for example, for a predetermined amount of time, in order to determine whether it is allowed to transmit.

A WTRU may be configured not to transmit unless there is at least one resource that is designated as available in an SA. Such a resource may or may not be the same as a resource requested by the WTRU in an SA. For example, a destination WTRU may provide an alternative resource if the requested resource is not available (e.g., when the SA is received).

A WTRU may be configured not to transmit until a best resource is determined. The WTRU may be configured to determine a best resource as described herein, for example. A WTRU may be configured to transmit in one or more requested resources. The WTRU may determine whether it is allowed to continue transmitting using the one or more requested resources for one or more subsequent time slots.

A WTRU may be configured to monitor for release indication and determine that it can transmit on a resource after it has received a release indication or after an occupancy timer has expired. The WTRU may reset the occupancy timer when it receives data or energy in the channel. The value of the timer may be predefined or configured by higher layers.

A WTRU that has transmitted at least one data burst, e.g., based on the conditions disclosed herein may be configured to stop data transmission based on one or more of a number of example conditions or criteria.

For example, the WTRU may be configured to release the channel after each burst transmission. If the WTRU has further data after releasing the channel, the WTRU may be configured to initiate another transmission request (e.g., according to one of the procedures, processes or techniques disclosed herein).

The WTRU may be configured to designate or consider the channel as reserved for its D2D session until the WTRU transmits a release notification (e.g., an explicit release notification). The WTRU may be configured to switch to a receive mode for a given duration before transmitting another burst. This duration may allow for receiving an acknowledgment or a channel preemption request. The WTRU may be configured during that duration to monitor for control channel information or transmissions on other resources. The WTRU may be configured to stop data transmissions, e.g., if the WTRU receives a channel preemption request on a preemption slot or if it receives data from a higher priority channel. For example, a higher priority physical channel, which may be defined by a set of resources, or a higher priority logical channel, in which case the WTRU may be configured to decode data packets before establishing the priority. When receiving a channel preemption request, the WTRU may determine whether the request is of higher priority. The WTRU may be configured to cease (e.g., immediately) any transmission on the channel or transmit a last control burst indicating a channel release to listeners to the channel; transmit a new SA in a different channel; and/or, when in network coverage, transmit a report to the network indicating channel preemption and identity of the preemptor.

A transmitting WTRU may be configured to determine that a channel preemption request has been received, for example, when the WTRU receives an SA. For example, the preemption request may be received during a predefined preemption slot, with one or more of a number of characteristics. These characteristics may include, for example, a source identifier, a destination identifier, a group identifier, and/or resources requested, in any order or combination.

The WTRU may be configured to determine that its transmission is being preempted after receiving a preemption request when one or more events occurs, e.g., in any order or combination. An event may comprise a condition that the received SA may target the same resources that the WTRU is currently using, but with a higher priority than the current transmission. An event may comprise a condition that the SA may have the same destination identifier than the current WTRU transmission, e.g., the same group identifier, but with a higher priority than the current transmission. An event may comprise a condition that that the received SA may have a specific source identifier (e.g., from a predefined list) with a higher priority than the current WTRU source identifier. An event may be that the received SA has a specific source identifier (e.g., from a predefined list) and with the same destination identifier than the current WTRU transmission, but with a higher priority than the current WTRU source identifier.

A WTRU (e.g., a D2D WTRU) may be configured to perform one or more destination WTRU or non-destination WTRU actions in accordance with a D2D communication. For example, the D2D WTRU may receive SA messages in response to respective triggering events; selecting resources for receiving SA messages; transmitting response messages (e.g., RRSP messages) in response to respective triggering events; and/or selecting resources for the transmission of the response messages (e.g., RRSP messages).

A WTRU may be configured to receive one or more SAs, for example in response to the occurrence of one or more triggering events, which may include one or more of: expiration of a timer; and/or transmission of one or more SAs.

A WTRU may be configured to scan one or more SAs periodically, for example in accordance with a predetermined interval. The interval may be associated with a timer, such that when the timer expires, the WTRU may scan for SAs. Such a timer may be restarted, for example, upon completing a scan for SAs. A WTRU may be configured to scan for SA messages in a predetermined resource, or in a set of resources.

A WTRU may be configured to receive one or more SAs in response to transmission of one or more response messages (e.g., RRSP messages). For example, content sent in one or more response messages (e.g., RRSP messages) may trigger a WTRU to scan for one or more SAs in a predetermined resource, or in a set of resources.

A WTRU may be configured to receive one or more SAs in response to identifying the occurrence of one or more of the triggers disclosed herein for transmitting an SA, e.g., data ready for transmission; timer expiration; reception and/or absence of a response message (e.g., RRSP messages); and/or network coverage.

A WTRU may be configured to select a resource for receiving one or more SAs. For example, a resource may be provided to a WTRU via RRC signaling. A WTRU may be configured to apply respective measurements to one or more resources. The WTRU may identify the presence of one or more messages within the one or more resources. For example, a WTRU may be configured to measure respective energy values in one or more slots and to compare the one or more energy value measurements to a threshold value. A WTRU may be configured to select a resource for receiving one or more SAs, e.g., based on one or more resources used from previous SAs and/or data transmissions. A WTRU may be configured to use a predefined mapping between a previous resource and a selected resource to determine a resource for receiving SAs. A WTRU that has previously selected a resource for reception of data transmissions and/or SAs at Resource Block N may select an SA resource at Resource Block (N+X) % M (e.g., where X may be a positive or null integer and M may be a total number of Resource Blocks).

A WTRU may be configured to transmit one or more RRSP messages. For example, the response messages may be transmitted in response to the occurrence of one or more triggering events including, for example, reception and/or decoding (e.g., successful decoding) of one or more SAs. The content of one or more received SAs may trigger a WTRU to transmit one or more RRSP messages. For example, the WTRU may determine that one or more received SAs carry an identifier (e.g., the WTRU identifier, or a group identifier to which the WRTU is associated to). The identifier may trigger the WTRU to transmit one or more RRSP messages. In an example one or more received SAs may carry an indication of a resource associated to the WTRU, for example a resource which is used by the WTRU for transmission. A WTRU may initiate the transmission of an RRSP messages, e.g., if the WTRU detects that data is available for transmission. A WTRU may initiate the transmission of an RRSP message, e.g., if a grant or a request from the network or a controlling entity is received.

A WTRU may be configured not to respond to a received SA, unless the WTRU is identified as a destination WTRU for the communication. A WTRU may be configured to respond to an SA that is successfully decoded by the WTRU.

A WTRU may be configured to apply one or more measurements to a received SA and may be configured not to respond to the received SA, unless respective values of the one or more measurements are greater than a threshold value.

A WTRU may be configured to select a resource for transmitting one or more response messages (e.g., RRSP messages). A resource may be provided to a WTRU, for example, via RRC signaling.

A WTRU may be configured to select a resource from a set of resources to select a resource for transmitting one or more response messages (e.g., RRSP messages). For example, the resource may be selected randomly. For example, an identity associated with the WTRU may be used for a random generator seed. A WTRU may be configured to select from a set of resources reserved to transmission of response messages (e.g., RRSP messages). The set of resources reserved for transmission of response messages may be configured by the network (e.g., via RRC signaling) or may be preconfigured directly in the specifications or by higher layers.

The resource may be selected based on measurements. For example, a WTRU may apply measurements to a set of resources and may select a resource accordingly (e.g., the WTRU may select a resource with a lowest interference level).

The resource may be selected based on a resource used in one or more previous SAs, response messages, and/or data transmissions. A WTRU may be configured to select a resource based on a resource used in one or more previous transmissions of SAs, RRSP messages, and/or data, for example using a predefined mapping between a previous resource and a selected resource to determine an RRSP resource. For example, a WTRU that has previously selected a resource for RRSP message transmission at Resource Block N may select an RRSP resource at Resource Block (N+X) % M.

A WTRU may be configured to set one or more resource indexes, for example, with associated status. The WTRU may indicate the status (e.g., available or non-available) of at least one resource. A WTRU may be configured to set a random token. The WTRU may be configured to provide the random token. The random token may be used for contention resolution. A WTRU may be configured to set an echo token. The WTRU may be configured to provide an echo token that may be a copy of a random token received in an SA. A WTRU may be configured to provide measurement results applied to one or more SAs. The WTRU may provide measurements applied to a requested resource or to a set of resources, for example.

A WTRU may be configured to provide additional information pertaining to one or more non-available resources. For example, the WTRU may be configured to provide one or more of: a master and/or source WTRU identity; a priority index; one or more destination WTRU identities; a power level; one or more measurements; a duration of a resource assignment; a resource that has been requested but not assigned; and/or a resource that is under contention resolution (e.g., for a set of WTRUs).

A WTRU may be configured to select a resource for receiving data, for example using one or more of the following procedures, processes or techniques. A resource may be provided to a WTRU, for example, via RRC signaling. A WTRU may be configured to apply respective measurements to one or more resource (e.g., to a set of resources). The WTRU may identify the presence of one or more messages within the one or more resources. For example, a WTRU may be configured to measure respective energy values in one or more slots and to compare the one or more energy value measurements to a threshold value. A WTRU may be configured to select a resource for receiving data based on a resource indicated in an SA. A destination WTRU that has received a resource request may use such a resource for data reception. In such an example, the WTRU may be configured to not transmit RRSP messages via the resource. The WTRU may be configured to transmit an RRSP message, but application of the response may be limited to future data transmissions. A WTRU may be configured to select a resource for receiving data based on a resource indicated in an RRSP message. A destination WTRU that has confirmed a resource request as available, for example in one or more RRSP messages, may use the resource for data reception.

The WTRU may determine configuration information. The WTRU may transmit control information. The WTRU may receive control information. The WTRU may be configured to decode data. The WTRU may be configured to decode data. The WTRU may be configured to decode data, wherein data is decoded based on one or more selected configuration values. A WTRU may be configured to decode a physical channel. A WTRU may be configured to decode a physical channel, wherein the physical channel is on a set of carrier frequencies. A WTRU may be configured to continuously decode a physical channel, wherein the physical channel is on a set of carrier frequencies.

The WTRU may decode data based on configuration information included in a scheduling assignment. The WTRU may be configured to decode data based on the information contained a scheduling assignment. The WTRU may be configured to decode data based on the information contained in a scheduling assignment, for example, if a timer started when the WTRU received the scheduling assignment and did not expire.

A WTRU may be configured to receive scheduling assignments from one or more WTRUs. The WTRU may be configured to behave based on the received scheduling assignment. The WTRU may be configured to receive scheduling assignments based on the reception capabilities of the WTRU. The WTRU may be configured to start a timer for a scheduling assignment. The WTRU may be configured to start a new timer for one or more scheduling assignments, wherein the WTRU receives the scheduling assignments from a second WTRU or group identity. The WTRU may be configured to decode the configuration information in the received scheduling assignment, wherein the timer associated with the scheduling assignment is not expired. The WTRU may be configured to decode a scheduling assignment at a time. The WTRU may be configured to decode a scheduling assignment at a time, wherein the time is pre-configured in the WTRU. The WTRU may be configured to receive a second scheduling assignment upon the expiration of the timer associated with the first scheduling assignment. The WTRU may be configured to receive second scheduling assignment during the pendency of a timer, wherein the timer is associated with the first received scheduling assignment. The WTRU may be configured to ignore second scheduling assignment during the pendency of a timer, wherein the timer is associated with the first received scheduling assignment. The WTRU may be configured to decode data based on configuration information provided in a second scheduling assignment during the pendency of a timer, wherein the timer is associated with the first received scheduling assignment. The WTRU may be configured to restart the timer when a second scheduling assignment is received during the pendency of a timer, wherein the timer is associated with the first received scheduling assignment. The WTRU may be configured to determine behavior based on priority information signaled in a second WTRU. The WTRU may be configured to determine behavior based on priority information associated with a second WTRU. The WTRU may be configured to determine behavior based on priority information associated with the identity of the user group transmitting the second scheduling assignment. The WTRU may be configured to determine behavior based on priority information associated with the identity of the user identity transmitting the second scheduling assignment.

A WTRU (e.g., a source WTRU, a destination WTRU, or a non-destination WTRU) that transitions from a network out-of-coverage zone to a network in-coverage zone may be configured to perform one or more of resource selection actions. A WTRU (e.g., an out of coverage WTRU) may be configured to transmit in resource N (e.g., an SA, an RRSP message, or a DATA burst). The WTRU may identify network coverage with one or more of the procedures, processes or techniques disclosed herein. The WTRU may be configured to read the SIBs. The WTRU may connect or register to the network and/or may request resources for SA transmission. The WTRU may stop transmitting to resource N. The WTRU may identify a new resource M for in-coverage transmission. The WTRU may identify the new resource M, for example, based on a predetermined mapping between N and M signaled on the SIBs and/or based on an explicit indication received from the network, e.g., via RRC signaling or via MAC CE or via the physical downlink control channel (PDCCH) using a downlink control information (DCI). The WTRU may be configured to obtain parameters signaled or derived from the SA or from a network grant or combination thereof.

One or more resources may be selected with a half-duplex transceiver or transceivers. One or more techniques may be used for the determination of D2D resources for the transmission of control or data, for example, when mutual and/or bi-directional communication may be useful within a set of WTRUs that may transmit and/or receive, or may transmit or receive at a given time.

A WTRU may determine its direction of communication (transmission and/or reception) or whether the WTRU should transmit or not, for a transmission time interval (TTI) or a subframe. For example, the WTRU may determine a transmission point (TP) resource or a time resource pattern of transmission (T-RPT) to use during the TTI or the subframe.

A minimum duration over which a WTRU may either transmit or receive before switching the direction (e.g., receive or transmit, respectively) may be referred to as a time unit. A time unit may correspond to one or more subframes (e.g., consecutive subframes).

A WTRU may transmit information, such as control information (e.g., SA, RRSP, etc.), a discovery signal, and/or data, or a combination thereof, within a period of time. The period of time may be referred to, for example, as a transmission time interval (TTI) or a transmission period (TP). The information may be inserted in one or more protocol data units (PDUs). The one or more PDUs that may be transmitted within the transmission period may be referred to as a payload unit.

Transmission of a payload unit by a WTRU may take place over a specific subset of time units within a TP. The subset of time units that may be used by a WTRU in a particular TP may be referred to as a TP resource or as a time resource pattern of transmission (T-RPT). The number of possible distinct TP resources (or T-RPTs) in a TP may depend on the number of time units that may be used in the TP resource (or T-RPTs) and/or on the number of available time units in a TP. It should be noted that the available time units in a TP may not be consecutive and may correspond, for instance, to a subset of subframes available for D2D communication. For instance, if a TP resource (or T-RPT) includes 3 time units over a TP of 10 time units, the number of different TP resources (or T-RPT's) may be equal to $$\binom{10}{3} = 120,$$

where $$\binom{n}{k} = \frac{n!}{(n-k)!k!}$$

may be the binomial coefficient. The number of TP resources (or T-RPT's) of k time units within a TP of n time units may be given by Such IP resource(s) (or T-RPT(s)) may be identified by an index ranging for instance from 0 to $$\binom{n}{k} - 1.$$

The number of time units (k) in which a transmission may take place, and/or the duration of a TP resource (or T-RPT) (n) may be the same for one or more TP resources (or T-RPT's) or it may depend on the TP resource (or T-RPT).

Within a TP, the payload unit may be fully transmitted by a WTRU in one or more time units of the TP resource (or T-RPT) such that a receiving WTRU (e.g., under sufficiently good radio conditions) may decode the payload within the time unit. Different subsets of coded bits (e.g., different redundancy versions) of the same PDUs may be transmitted in one or more time units to enhance the coding gain for a WTRU combining the signal received from one or more time units. The redundancy version may be predefined based on a time unit index (e.g., within the TP) and/or based on the order of the time unit within the set of time units of the TP resource (or T-RPT).

A WTRU may be configured to provide that multiple payload units may be transmitted and/or received in different time units within a TP resource (or T-RPT). A payload unit may correspond to a specific hybrid automatic repeat request (HARQ) process or HARQ entity. A transmission in a particular time unit may correspond to a specific HARQ process and/or a specific redundancy version (RV) and/or retransmission sequence number (RSN) associated to one or more HARQ processes and the like. The HARQ process index associated to a transmission may be pre-defined based on a time unit index (e.g., within the TP) or based on the order of the time unit within the set of time units of the TP resource (or T-RPT).

A WTRU may be configured to provide that a TP resource (or T-RPT) may be associated with a single HARQ process or payload unit. Concurrent transmission of multiple HARQ processes may be supported by using TP resources (or T-RPT's) that may be orthogonal in the time domain (e.g., occupy different time units) or frequency domain (e.g., occupy different frequency resources) but span a similar time interval or time period. For example, in a scenario involving four HARQ processes, the TP resource (or T-RPT) associated to the $n^{th}$ HARQ process may be restricted to a subset of subframes within a set of subframes defined by a period of four subframes and an offset n. The above example involving four HARQs is a non-limiting example provided in this disclosure for clarity and ease of description. Other configurations may provide associations among one or more TP resources (or T-RPT), or among one or more subsets of subframes as well as one or more offsets in a scenario involving greater or less than four HARQ processes.

The duration corresponding to a scheduling period may be larger than the duration corresponding to a TP resource (or T-RPT). For example, a scheduling period may be defined for a period of 160 ms while a TP resource (or T-RPT) may be defined for a transmission period (TP) of 20 ms. The duration of the scheduling period may be a fixed value that is used for each of the D2D transmissions or alternatively it may be variable and/or configurable. The WTRU may chose a scheduling period duration or a transmission period duration as a result of a configuration provided by a network, pre-configured in the WTRU, e.g., signaled as a grant from the eNB, or autonomously chosen by the WTRU based on available data and transmission opportunities as described below. The duration of the scheduling period may be explicitly signaled in the SA, may be implicitly determined by other information signaled in the SA (e.g. pattern index— e.g., a pattern may be linked to a scheduling duration) or resource used by the SA or number of TPs signaled in the SA or it may be linked to a service (e.g., application, group, etc.)

A WTRU may be configured to use the same TP resource (or T-RPT), or set of TP resources (or T-RPT's), in each successive transmission period within the scheduling period. A WTRU may be configured to use a different TP resource (or T-RPT) or set of TP resources (or T-RPT's) in each successive transmission period. The TP resource (or T-RPT), or set of TP resources (or T-RPT's), used in each transmission period of the scheduling period may be determined by the WTRU at the beginning of the scheduling period, such that this information may be included in the scheduling announcement. A WTRU may be configured such that a set of TP resources (or T-RPT's) used in each transmission period may be determined according to a pre-determined sequence.

A common time reference may be established between a set of WTRUs that may find it useful to communicate with each other, such that TP's may be synchronized. A WTRU may determine a TP resource (or T-RPT) to use for or more, or each, TP. A WTRU may transmit its payload during those time units that may correspond to the determined TP resource (or T-RPT). A WTRU may attempt reception of signals from other WTRUs at least during time units that might not correspond to the determined TP resource (or T-RPT). The WTRU may attempt reception of signals from other WTRUs during one or more (e.g., all) time units of the TP irrespective of any determined TP resource (or T-RPT), such as, for example, in scenarios in which the WTRU may not have a payload unit to transmit for a given TP.

A pair of WTRUs may be capable of mutually receiving each other's transmitted signal in at least one time unit in a TP, for example, in scenarios in which they may have determined a different TP resource (or T-RPT) for this TP. Bi-directional communication may be possible between any pair of WTRUs within a group of WTRUs that may be assigned different TP resources (or T-RPT's) in a TP.

Transmission of a payload unit in a time unit may take place over one of one or more, or multiple frequency resources. A frequency resource may be defined, for instance, as at least one set of resource blocks that may or may not be contiguous in frequency. A WTRU transmitting in a time unit may select a frequency resource that is a function of this time unit and/or the TP resource (or T-RPT), such that the frequency resources corresponding to the same time unit for different TP resources (or T-RPT's) may be different, perhaps to enhance the reliability of communication within a set of WTRUs. Orthogonality (e.g., full orthogonality) may be achieved between transmissions taking place in different TP resources (or T-RPT), for example, if the number of available frequency resources in a time slot may be sufficient, among other scenarios. Orthogonality (e.g., full orthogonality) may be achieved within a set of TP resources (or T-RPT's) of k time units within a TP of n time units, e.g., if $$\binom{n-1}{k-1}$$

orthogonal frequency resources may be available within or one or more time slots. Partial orthogonality may be achieved between transmissions taking place in different TP resources (or T-RPT's), for example, in scenarios in which fewer orthogonal frequency resources may be available.

The frequency resource that may be used in one or more time units of a TP resource (or T-RPT) may be determined from the TP resource index (or T-RPT index) and/or from a combination of a TP resource index (or T-RPT index) and frequency resource index.

The frequency resource that may be used in one or more time units of a TP resource (or T-RPT) may be predetermined according to a fixed mapping for one or more, or each, TP resource index (or T-RPT index). For instance, frequency resources #23, #13 and #8 may be used in time units #2, #3 and #7 respectively, perhaps when TP resource (or T-RPT) #35 may be used. Frequency resources #21, #7 and #14 may be used in time units #1, #3 and #6, perhaps when TP resource (or T-RPT) #56 may be used, and so on. In such scenarios, among others, the set of time and/or frequency resources to use for a TP resource (or T-RPT) may be determined (e.g., completely determined) from the TP resource index (or T-RPT index). The set of frequency resources may be obtained using an independent frequency resource index mapped to a set of frequency resources. The TP resource index (or T-RPT index) may indicate the time units to use while a frequency resource index may indicate the frequency resources to use during these time units.

A transmission in a given time unit may also be defined in terms of a generalized resource index, for example, such that two simultaneous transmissions with different resource index values may be orthogonal. For instance, a transmission may be similar to PUCCH with a defined resource index (e.g., depending on the format of PUCCH). The same techniques as described herein for the frequency resource may also applicable for a generalized resource index.

The TP resource (or T-RPT) to use in successive TPs may change, for example, according to a predefined sequence (e.g., hopping). A WTRU may be configured to select a hopping pattern, in addition to the D2D transmission pattern. This may be the case if the D2D transmission pattern is defined as a time pattern. The WTRU may be configured to set the hopping pattern based on one or more parameters, such as WTRU ID, transmission pattern index, SA resource. The information on which the hopping pattern is based may be indicated in the SA. In one example of this, the SA may determine the hopping pattern based on one or more identifier carried in the SA (e.g. the source ID, target ID). In another practical example, the SA may set the hopping pattern based on the target ID associated with the D2D data transmission and the D2D transmission pattern index. The setting of the hopping pattern may be motivated by the receiving WTRU being capable of receiving a single transmission for a given service. In an example, the WTRU may set the hopping pattern based on a target ID and SA resource.

The TP resource index (or T-RPT index) used by a WTRU may vary between successive TPs, e.g., according to a predefined pattern and/or sequence, for example, to provide diversity and/or to avoid a situation in which a pair of WTRUs might not be constantly assigned a pair of TP resources (or T-RPT's) for which a small number of time units may not be overlapping. For instance, the TP resource index (or T-RPT index) may be obtained from a pseudo-random function of a TP index and/or time unit index. A set of sequences may be defined such that the TP resource index (or T-RPT index) may not be identical at any time between two different sequences. By assigning different sequences to different WTRUs, at least one time unit may be available in one or more TPs, for example, to receive the signal from another WTRU. A payload may be repeated in two or more consecutive TPs to further increase diversity. The frequency resource index may also vary between successive TPs according to a predefined pattern, for example, in scenarios in which a frequency resource index may be defined independently of a TP resource index (or T-RPT index).

The transmission and reception of signals (e.g., transmission and reception of data) from one or more WTRUs may be performed according to one or more techniques disclosed herein. For proposes of clarity and ease of description, the following description is provided from the perspective of one or more receiving WTRUs. It may be appreciated that one or more transmitting WTRUs may likewise be configured to perform the one or more techniques. For example, in a scenario where a receiving WTRU utilizes information inserted in an SA to derive a reception parameter (e.g., resource, HARQ, MCS, and the like), it is understood that this example also describes a technique for a transmitting a WTRU to indicate such a parameter through inclusion of the information in an SA to be transmitted.

The WTRU may determine the set of TP resources (or T-RPT's) that other WTRUs may be using (or may be known to be using) for transmission in the TP. Such information may be provided by a scheduling entity such as a cluster head, or from the reception of control messages, such as RREQ or SA. The WTRU may attempt reception of these signals in one or more combinations of time unit and/or frequency (or generalized) resource unit on which a signal may have been transmitted, perhaps based on the set of TP resources (or T-RPT's) used by potentially transmitting WTRUs, perhaps if the WTRU may not itself transmit in the time unit (and/or if the time unit may correspond to a time unit for reception for this WTRU).

The WTRU may be configured such that one or more TP resources (or T-RPT's) on which to attempt reception may be defined by one or more resource indicators. A resource indicator may include, for example, an index to a single TP resource (or T-RPT) that may be used during the scheduling period, possibly in successive time periods. A resource indicator may include, for example, an indicator of a sequence of TP resources (or T-RPT's) that may be used in successive time periods within the scheduling period, or in a time-indexed function. The sequence may be a predetermined sequence such as a linear sequence or a pseudo-random sequence. The indicator may be a value used to initiate the sequence, or an index to the first TP resource (or T-RPT) of the sequence.

A WTRU may be configured to determine the one or more TP resources (or T-RPT's) on which to attempt reception based one or more resource indicators explicitly included in a field of the SA.

A WTRU may be configured to determine the one or more TP resources (or T-RPT's) on which to attempt reception based on one or more transmission parameters such as MCS, transport block size, number of resource blocks (or resource block allocation), and the like, that may be indicated in the SA or from higher layers A WTRU may be configured to determine the one or more TP resources (or T-RPT's) on which to attempt reception based on an identity parameter, such as the identity of the transmitter, or a group identity. Such identity parameter may be included as a field in the SA or be used to mask a cyclic redundancy check (CRC) used in the SA. For example, the identity parameter may be used to determine a value used to initialize a pseudo-random sequence of TP resources.

A WTRU may be configured to determine the one or more TP resources (or T-RPT's) on which to attempt reception based on a property of the SA transmission corresponding to the set of TP resources (or T-RPTs). For instance, the time or frequency resource (or index thereof) in which the SA was decoded may indicate the set of TP resources (or T-RPT's) according to a defined relationship. For example, an SA may be potentially decodable in one out of an M resources. The resource m in which an SA was successfully decoded may be mapped to the resource indicator p of the set of TP resources (or T-RPT's) which may be data associated to this SA. For instance, the mapping may be p=m+P0 where P0 is a parameter that may be pre-defined or provided by higher layer signaling.

A WTRU may be configured to determine the one or more TP resources (or T-RPT's) on which to attempt reception based on the timing or index of the subframe or starting subframe of the TP resource (or T-RPT). A WTRU may be configured to determine the one or more TP resources (or T-RPT's) on which to attempt reception based on a frame number of system frame number during the start of the TP resource (or T-RPT) or at the start of the TP resource (or T-RPT). The techniques disclosed herein and parameters used for the determination of the TP resource (or T-RPT) may depend on whether or not the receiving WTRU, and/or the transmitting WTRU, is under coverage of a network.

The WTRU may attempt reception in a set of predefined frequency resources (or generalized resources) in one or more time units corresponding to a time unit where no transmission might occur for this WTRU (and/or where no transmission can occur). A WTRU may be configured to determine HARQ-related information when attempting to decode data for a specific transmission. A WTRU may be configured to determine a HARQ process identity, in case transmission takes place using multiple HARQ processes. A WTRU may be configured to determine a redundancy version or retransmission sequence number, in case a set of PDU's is retransmitted in at least one subframe. A redundancy version may correspond to a retransmission sequence number according to a fixed mapping. A WTRU may be configured to determine whether the data is a new transmission or a retransmission of previously transmitted data. A WTRU may be configured to determine a HARQ entity—in case multiple transmission of different destinations groups is performed in the same scheduling/transmission period. A HARQ entity may be associated to a destination group from a transmitter perspective and to a transmitting source or layer 1 ID on the receiving entity. A HARQ entity associated to a destination group IDs or a transmitting source ID is a set of HARQ processes used for transmission/reception of data associated to those IDs.

A WTRU may be configured to determine a number or maximum number of HARQ processes and/or to determinate a total number of transmissions for each HARQ process. Such types of information (e.g., number or maximum number total number of transmissions for each HARQ process) are referred to in this disclosure as HARQ information.

A WTRU may be configured to determine HARQ information for a transmission based on one or more pre-defined parameters or configured information supplied by higher layers. In one non-limiting example, the maximum number of HARQ processes may be pre-defined to be 4, and the total number of transmissions for a given HARQ process, which may depend on the HARQ process identity, may be pre-defined to be 3. These parameters may be provided by higher layer signaling from a network entity or device or the parameters may be stored in the memory of the WTRU.

A WTRU may be configured to determine HARQ information for a transmission in a scenario where the WTRU may have received or receives from multiple allowed transmitting sources. In such scenarios, the WTRU may create and maintain separate HARQ entities/processes for each of the received transmitting sources (e.g., in a given transmission period or over a period of time).

A WTRU may be configured to determine HARQ information for a transmission based on an explicit indication which may be in an SA. For example, the actual number of HARQ processes used during the scheduling period may be explicitly indicated in an SA. The SA which may further include, for example, an indication of the transmitting source ID or a layer 1 ID associated to the transmitting source. As such, the WTRU may be configured to determine an association between the data and the applicable HARQ process entity or applicable HARQ process ID (e.g., based upon the transmitted source ID or a layer 1 ID associated to one or more transmitting sources).

A WTRU may be configured to determine HARQ information for a transmission based on the order of transmission in the time domain, within a TP resource (or T-RPT). For example, the WTRU may be configured in a scenario where the number of HARQ processes may be a specific value (e.g., four or another predetermined specified value) or a predetermined maximum number of HARQ processes. In such a scenario, the HARQ process identity may cycle between successive transmissions in a TP resource (or T-RPT) or in a scheduling period such that the HARQ process identity for the $m^{th}$ transmission may be equal to m (e.g., mod 4 or another modulo operation depending on a predetermined specified value). The WTRU may be configured in a scenario where the redundancy version (RV) or retransmission sequence number (TSN) may cycle between successive transmissions associated to the same HARQ process identity. In such a scenario employing a RV or TSN, the number of transmissions for a PDU may be defined as a first predetermined specified value (e.g., three (3) or another predetermined specified value) and the number of HARQ processes may be defined as a second predetermined specified value (e.g., four or another predetermined specified value). Also, in this scenario, the retransmission sequence number of the $m^{th}$ transmission may be equal to R (mod 3 or another modulo operation depending on a predetermined specified value) where R may be the smallest integer larger than m/4 (e.g., where the second predetermined specified value is 4). In a scenario employing a RV or TSN, there may be a new transmission for a HARQ process after 3 transmissions of a PDU for the particular HARQ process.

A WTRU may be configured to determine HARQ information for a transmission based on the frequency resource of the transmission.

A WTRU may be configured to determine HARQ information for a transmission based on the timing of the transmission. The timing of transmission may be determined based upon a subframe number, a frame number or a combination thereof. The timing may be determined based upon a predetermined number of subframes since reception of SA or an initial SA for the scheduling period. The techniques and scenarios for determining HARQ information for a transmission based on the order of transmission in the time domain, described in this disclosure, may be modified to replace the order of transmission in the time domain with timing information.

A WTRU may be configured to determine HARQ information for a transmission based on an index to a TP resource (or T-RPT), or a resource indicator. For example, a single HARQ process identity may be associated to a TP resource (or T-RPT) or resource indicator. The TP resource (or T-RPT) or resource indicator corresponding to each HARQ process identity may be indicated in the SA. The number of HARQ processes or the number of transmissions per HARQ process may depend on the TP resource (or T-RPT) or resource indicator.

A WTRU may be configured to determine the number of HARQ processes or PDU's. That is, such a configuration may assist a destination WTRU, for example, decoding data from dynamic and multiple HARQ processes, new data indicator (NDI) and/or RVs which may be signaled along with the SA. The resources or TP resource indices or T-RPT indices for each different HARQ processes or their RV's may have pre-defined and distinct offsets to the signaled resource or TP resource index (or T-RPT index). For example, the number of HARQ processes may be dynamically signaled by a special combination of NDI and RV columns in SA. For example, (NDI, RV)=(1, n), where n is 2, 3, 4 or some other predetermined value and may indicate that the current number of HARQ processes is n.

A WTRU may be configured to determine a plurality of parameters which may include parameters relating to a modulation and coding scheme (MCS), a bandwidth (BW), resource block (RB) information (e.g., the number of resource blocks per transmission, or resource block allocation) and a transport block (TB) size. At least one of plurality of parameters may be a function of one or more of TP resources (or T-RPTs) or of a resource indicator thereof, used during the scheduling period. For example, the number of resource blocks may depend on the TP resource index (or T-RPT index).

A WTRU may be configured to determine MCS, BW, RB information and TB size parameters based on an explicit indication in a predetermined field of an SA, or implicitly indicated by a property of the SA. The parameters may be indicated by independent field. The value of a single field may indicate a combination of parameters according to a pre-determined mapping, or a configured mapping (e.g., where each value is configured by higher layers). For example, a single field may indicate both the MCS and the number of resource blocks.

A WTRU may be configured to determine MCS, BW, RB information and TB size parameters based on locally stored pre-determined information or configured by higher layers. For example, the number of resource blocks may be configured by higher layers. Some parameters may be locally stored pre-determined information, while others may be configured by higher layers. These parameters may be provided by higher layer signaling from a network entity or device or the parameters may be stored in the memory of the WTRU.

A WTRU may be configured to determine MCS, BW, RB information and TB size parameters by deriving information pertaining to one or more unknown parameters from one or more known parameters according to a pre-determined function or mapping. The function may include parameters that are pre-determined or configured. For example, the WTRU may be configured to derive the TB size from the MCS and the number of resource blocks. The function may consist of a table that associates each possible pair of MCSs and number of resource blocks values to a TB size. The WTRU may be configured to derive a MCS and possibly a number of resource blocks from a TB size according to a table. These techniques may be used by both transmitting and receiving WTRUs.

The WTRU may be configured with a table of possible transport block sizes and at least an associated allowed MCS. For example, a one-to-one mapping between a transport block and a MCS to use may be pre-configured or specified. This mapping may also depend on the type of service. In a scenario involving a scheduling opportunity, the WTRU may use a different bandwidth. In such a scenario, the WTRU may be configured with TB, BW, and MCS. The WTRU may be configured to select a preferred TB size as described in this disclosure and determine the associated BW and MCS which it may use based on the selected TB size.

Resource selection may be performed on a TP resource index (or T-RPT index) basis and/or on a sequence index basis, for example, in case of hopping. The techniques described herein for selecting a resource for transmission (e.g., including whether it may be available) may be applicable to a resource that may be defined in terms of TP resource index (or T-RPT index), and/or in terms of a combination of a TP resource index (or T-RPT index) and/or a frequency resource index (perhaps if defined). A resource may be defined as a TP resource index (or T-RPT index) and/or a frequency resource index, for example, in scenarios in which the TP resource index (or T-RPT index) may not vary between successive TPs. The WTRU may perform measurements on one or more time units and/or frequency resource unit of the TP resource (or T-RPT), which in some embodiments may be averaged over one or more TP's. A resource may be defined as a sequence index that may identify at least one of a set of sequences that may not have a pair of sequences that have the same TP resource index (or T-RPT index) in the same TP, for example, in scenarios in which the TP resource index (or T-RPT index) may vary between successive TPs according to a sequence. A WTRU may perform measurements in a resource defined as a sequence index. Such measurement in a TP may be performed, for example, by determining the TP resource index (or T-RPT index) corresponding to this sequence index in this TP, perhaps based, for instance, on a TP index. Measurements may be performed on one or more, or each, time unit and/or frequency resource unit of the TP resource index (or T-RPT index) in this TP.

The WTRU may be configured to perform resource selection based on number of simultaneous transmissions to different destination groups or destination IDs. That is, a WTRU may be authorized and may have data to transmit to multiple destination groups or destination IDs.

The WTRU may be configured to perform resource selection by creating different MAC PDUs that are targeted to different groups or receivers. This configuration may be beneficial in a scenario where a WTRU may not be capable of multiplexing data from different groups into the same transport block.

The WTRU may be configured to perform resource selection by restricting transmission to a single destination in a given scheduling period or transmission period. In this scenario, the WTRU may select the highest priority destination or service (if there is a priority) and perform the procedures describe herein to transmit the data belonging to the given destination within a scheduling period. In the next scheduling opportunity, data for the other destination group may be transmitted. The order in which the data for different destinations is transmitted may, for example, depend on a priority level, data rate level, or be based on a round robin scheme.

The WTRU may be configured to perform resource selection by transmitting to multiple destinations within the same scheduling period. For example, the data transmitted to different destinations is multiplexed in time within the scheduling period. In order to be able to multiplex in time, the WTRU may be configured to pick two transmission patterns that have no overlapping transmission opportunities for the duration of the scheduling period. The WTRU may be configured to pick two transmission patterns that have the minimum amount of overlap in transmission opportunities (up to a predetermined allowed maximum). The WTRU may be configured to pick one MAC PDU among a plurality of MAC PDUs to transmit, and drop the other transmission (e.g., during the TTIs or TP at which there is an overlap), either in order of priority or alternating between packets prioritized (or dropped) in a round robin manner. The WTRU may be configured to pick transmission opportunities that overlap if the PRBs associated to the transmissions are adjacent.

A WTRU may be configured to select one or more of the following transmission parameters for the duration of a scheduling period associated to an SA: TBS, MCS (e.g., an MCS index), bandwidth (e.g., number of PRBs), number of HARQ processes, inter-PDU interval time, number of HARQ transmissions. The WTRU may be configured to determine the number of bits to transmit during transmission period (e.g., scheduling period) or an interval based on one or more of the amount of data in the D2D buffer, the data priority, and the type of data (e.g. delay sensitive or not) associated to the configured applications (e.g., voice, video streaming, etc.) and/or a transmission rate for the data to be transmitted. For example, the WTRU may be configured to determine the TBS (e.g., an TBS size), MCS (e.g., an MCS index) and/or bandwidth of each transmission in the scheduling period by estimating the amount of data that needs to be transmitted during the interval and the number of new MAC PDU that may be transmitted according to the HARQ profile and the D2D transmission pattern. The transmission parameters such as TB, BW, and MCS may remain constant during a transmission duration, e.g., if an SA carries the information for a transmission duration or scheduling period.

A WTRU may have an option to determine the MCS, TB size, MCS, TBS index and number of required transmission opportunities. A trade-off between range of links (e.g., coverage) and capacity may be taken into account, e.g., when selecting such parameters. For some services, e.g., emergency services, a larger coverage may be necessary to ensure reception of the communication. For another type of service, coverage may be less important and the WTRU may try to optimize capacity by using lower bandwidth and higher MCS, for example. These types services may be configured in the WTRU on a per application, service, or logical channel basis, or may be provided as a user preference indication. For example, a user initiating an important emergency call may indicate the emergency level or coverage requirement. Such a criteria may force the WTRU to optimize coverage over capacity.

The WTRU may determine the desired number of bits or transport block size that may be transmitted, e.g., using one or a combination of the methods described herein. The UE may determine the available transmission parameters based on allowed, available, or configured BW options (e.g., number of RBs that may be used for this transmissions) and MCS that may be used and available transport block sizes. This may be, for example, provided in a tabular format (e.g. MCS (TBS Index)/RB combination pairs and corresponding TB size for each combination). The WTRU may determine the number of bits of data to transmit, for example. The WTRU may select TBS index that may provide the lowest possible BW available (e.g., number of RBs) that may allow the WTRU to transmit the selected number of bits using the lowest modulation order that may achieve the transmission of the selected number of bits. For example, if TBS index 0-9 correspond to modulation order 2 and 10-16 to modulation order 4, and if the WTRU wants to transmit 144 bits, it may select the lowest BW that allows 144 bits for lowest modulation order (which in case of 144 bits may be modulation order 2), e.g., $N_{PRB}=2$ and Itbs=5.

TABLE 1

| $I_{TBS}$ | $N_{PRB}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | 1032 |
| 11 | 176 | 376 | 584 | 776 | 1000 | 1192 |
| 12 | 208 | 440 | 680 | 904 | 1128 | 1352 |

The WTRU may select the lowest BW (number of RBs) that will allow the UE transmit the selected number of bits using the lowest possible MCS (TBS) Index. The UE may be configured to make such selections (e.g. if the UE always wants to optimize range within available resources). Using table 1 as an example, with this method the WTRU may determine that the lowest TBS index that can transmit the selected number of bits (e.g., 144 bits) corresponds to TBS index 1 and the lowest bandwidth to transmit at that TBS index is $N_{PRB}=4$.

The WTRU may use the minimum number of RBs and a modulation order (e.g., a lowest modulation order) that may allow transmission of the selected transport block. The WTRU or the service may be configured to make such selections (e.g., if the WTRU wants to minimize resource usage and coverage is not as important).

The WTRU may be given a set $N_{PRB}$ and choosing the MCS and TBS index may be a function of the selected number of bits to transmit.

The WTRU may select a set of parameters or a selection method based on whether the WTRU is operating in a coverage-optimized or a capacity-optimized mode. The WTRU may be configured with an operating mode. The WTRU may determine the operating mode on its own, e.g., based on the system and/or resource utilization. For example, if the WTRU measures low resource utilization, it may optimize coverage and use more resources. The WTRU may optimize capacity or reduce the rate to meet coverage constrains, e.g., when the resources are determined to be utilized.

The WTRU may be configured with a target ratio of information bit rate and bandwidth. In wireless systems, the required Eb/No (e.g., ratio of Energy per Bit (Eb) to the Spectral Noise Density (No)) may be higher than $(2^y-1)/y$, e.g., where y is the ratio between information bit rate R and bandwidth W. According to this relationship, e.g., for a single user link, to minimize Eb/No and maximize range, y=R/W may be set to low (e.g., very low) and W may be set to high (e.g., very high). The setting of the values or W and y may use higher system resources. In some cases (e.g., voice) and service with guaranteed bit rate, the target information bit rate R may be provided or fixed. The BW may be provided or the WTRU may select from a set of possible choices. The WTRU may determine the BW required for given target bit rate R and y values. The WTRU may be given a target rate and a fixed BW. The WTRU may select the smallest MCS and/or MCS/TBS index that may allow the transmission of the transport block size, e.g., when a BW may be provided or determined by the WTRU, and a transport block may be selected. The WTRU may be given one or more sets of parameters (e.g., two sets of parameters with W values as W1=2 RB and W2=4 RB). The WTRU may select the sets of parameters to use, e.g., based on whether the WTRU is operating in coverage-optimized or capacity-optimized mode. The WTRU may select the sets of parameters, e.g., as described herein.

A target y=R/W value may be set, e.g., for one or more of services, applications, logical channels, group of logical channels, WTRUs, etc. The ratio of information bit rate to bandwidth R/BW may drive the range of a transmission power level. One or more services may have different target ranges. The Eb/No value (e.g., the actual required Eb/No value) may be different for different services, e.g., due to different BLER requirements, etc. For a given power Pt, a max or target information bit rate R max may be configured (e.g., which may translate to a given max TB size). For a given rate and configured y, the WTRU may determine the target bandwidth W as (R max*Y). Based on BW and TB size the WTRU may determine target MCS and/or TBS index required to transmit the TB with the given target BW. The WTRU may be configured with a subset of other parameters and may determine the missing parameters.

The number of bits available for transmission may be less than the configured R max or max TB (e.g., determined by the target rate R max). For example, as illustrated herein, the WTRU may determine that the amount of data available for transmission is less than max TB or rate is less the R max. The WTRU may determine that the TB size is less than max TB. The WTRU may not utilize each of the HARQ transmissions. The WTRU may transmit at the R max rate. The WTRU may transmit with the TB max size. The WTRU may use padding. The WTRU may adjust the TB size from max TB size to a TB size that may fit the amount of data available for transmission. The new TB size may be translated into Rnew rate and the new bandwidth W may be determined as y/Rnew. The W (e.g., final W) to be used for the given selected number of bits (e.g., TB selected) may be determined by scaling the target W (e.g., determined using the R max or TB max) by a factor of TB selected/TB max or Rnew/R max. Once the W (e.g., $N_{PRB}$) is selected, the MCS or lowest MCS or lowest TBS index used to transmit the selected TB may be selected from a table.

The WTRU may determine the target BW (W) determined, e.g., if the WTRU may transmit at a max target rate. The WTRU may determine the MCS or TBS index required to transmit the selected TB with the target BW (W). The WTRU may keep same determined target MCS. The WTRU may find the new required BW to transmit the given TB size. The WTRU may use the same target Power Pt. The WTRU may determine the new required power, e.g., as a function of the new selected bandwidth and the MCS (and other adjustment factors, for example).

As described herein, the WTRU may determine that it doesn't have enough power available (e.g., due to adjustment from eNB) to transmit at the given and/or selected BW and TBS index. The WTRU may find the next smallest allowed BW and corresponding TBS index (e.g., likely higher TBS index) to allow the transmission of the selected TB size. The WTRU may find the next available BW that may be transmitted with the given power and adjust the selected TB size to the size of the next available BW and/or the selected target TBS index (e.g. selected TBS index as described above). The WTRU may determine the next largest available BW. The WTRU, e.g., based on the new BW, may configure y and/or may determine the new rate R. The new value of R may translate into a new TB size. The WTRU may determine the correct MCS, e.g., based on the new TB size, the selected BW.

The WTRU may determine each of the available BWs and MCSs (e.g., TBS indices) combinations allowed by the available power. The available WTRU power may be configured at the WTRU (e.g., P max for D2D transmission or for a service). The WTRU may be controlled and adjusted by the eNB, e.g., to provide co-existence of the WTRU with other cellular WTRUs. If the power required to transmit a TB for a give BW and MCS combination is higher than available allowed power, the WTRU may exclude these combinations from available and/or allowed combinations.

The WTRU may determine a transport block size to transmit, e.g., to determine the transmission parameters. The selection of transmission parameters by a WTRU may be a function of one or more transmission parameters. For example, the transmission parameters may include a predetermined, expected packet arrival rate or a minimum predetermined rate (or a guaranteed bit rate), a predetermined amount of buffered data, a predetermined time period (e.g., a time period in which the WTRU may know that it should transmit the received, buffered, and/or anticipated data (e.g., a scheduling or transmission period)), a predetermined allowed transport block sizes, a predetermined allowed bandwidth, and/or predetermined allowed transmission opportunities and duration of a scheduling period.

The WTRU may select one or more transmission parameters based on the total number of anticipated data and/or available data. The WTRU may determine the minimum number of bits to transmit in one or more TTIs or TPs. That determination may, for example, be based on the available scheduling/transmission opportunities within a scheduling period. The WTRU may determine the minimum number of bits the WTRU may transmit in a particular transmission opportunity to empty the buffer at an acceptable minimum and/or target rate.

The WTRU may be configured to determine the number of available transmission opportunities (e.g., Time units) within a scheduling period. The transmission opportunities within a scheduling period or transmission may be fixed (e.g., within one or more scheduling period associated with the WTRU or allowed for D2D transmissions) or one or more transmission patterns may consist of the same number of new transmission opportunities (e.g., TTIs in which the WTRU may transmit new data, e.g., not accounting for HARQ retransmissions). The transmission opportunities within a scheduling period may vary. For example, transmission patterns with different frequency of transmission times may be available and selected.

The WTRU may determine the optimal transmission pattern and/or the optimal number of transmission opportunities within a time period (e.g., scheduling period), it may utilize. The selection of the transmission opportunities by the WTRU may follow a plurality of transmission opportunity rules. For example, the WTRU may follow one or more of the following rules. The WTRU may be configured to adhere to a rule that may provide for optimizing the pattern selection, e.g., by selecting the pattern with the lowest number of transmission opportunities that may carry data using a predetermined target allowed TB size. For example, the predetermined target allowed TB size may be associated with a WTRU, a plurality of WTRUs, each of the WTRUs used for D2D transmissions, or a logical channel or service of a WTRU. The rule may prioritize a range of transmission (e.g., minimum TB size) over number of TTIs used for transmission. The WTRU may be configured to adhere to a transmission opportunity rule. The transmission opportunity rule may select a pattern with the lowest number of transmission opportunities that may be used, e.g., assuming that the WTRU may use up to the largest allowed TB size, or up to a selected or configured/target TB size. For example, the TB size may be based on a target system operating point or based on power limitations/restrictions, or based on allowed/available BW and/or MCS associated with a WTRU, a group of WTRU, with a service, application, or logical channel group. The WTRU may adhere to a rule that may compromise on range to reduce the number of TTIs the WTRU may occupy during a scheduling period. The WTRU may be configured to adhere to a rule that may determine transmission opportunities, e.g., based on a configuration of a service.

To determine transmission opportunities, the WTRU may be configured to determine the number of transport blocks to create for transmitting data within a given time period. The determination of the transmission opportunities may depend on an assumed transport block size, e.g., as described herein. For example, using smallest TB, largest TB, and/or a predetermined selected/configured transport block size. The WTRU, e.g., based on the target TB size, may determine the number of transport blocks in accordance with Equation No. 1.

$$\# \text{ of } TBs = \frac{\text{Data to Transmit}}{\text{target } TB \text{ size}} \quad \text{(Equation No. 1)}$$

As illustrated in Equation No. 1, the target TB size may be a predetermined value indicating a minimum, maximum, or particular selected/configured/target size. The data to transmit may be the number of bits expected to be transmitted within the transmission period as described herein. The total number of transport blocks may be an integer value (e.g., rounded up). The WTRU may be configured to account for possible headers (e.g. MAC, RLC, PDCP) that may be included for each TB (e.g., the TB size would be equivalent to TB size minus possible headers).

For one or more of the allowed or available patterns, the WTRU may select the pattern that allows the WTRU to maximize the number of utilized TTIs in a period (e.g., pick a pattern in which transmission opportunities do not go unused or a minimum number of transmission opportunities that go unused) or a pattern which allows the WTRU to transmit all the data (if possible).

To perform a selection of a pattern, the WTRU may be configured to determine (for each pattern or for each scheduling period) how many opportunities for new transmissions are available. For example, the WTRU may determine that a pattern allows for N new TBs to be transmitted. The value N for the different allowed patterns may already be known in the WTRU, or the WTRU may calculate a the value N based on the maximum number of total TTIs over which the WTRU may transmit within the transmission/scheduling period, the number of re-transmissions, and HARQ processes. In a scenario where the WTRU assumes the smallest TB size, the WTRU may pick the pattern that may allow the WTRU to maximize the number of utilized TTIs. For example, the WTRU may pick the pattern that has the largest number of new Tx opportunities equal to, or smaller than, the determined Number of transport blocks.

In a scenario where the WTRU minimizes the number of used Tx opportunities, the WTRU may select a pattern with the lowest number of new Tx opportunities that may transmit the transport blocks within the time period. For example, it may transmit the pattern with the smallest number of new Tx opportunities that is equal to or larger than the determined Number of transport blocks.

A WTRU may be configured to determine the amount of data to transmit in a scheduling period. The data to transmit in a scheduling period may be a function of available data to transmit and/or a function of target transmission rate.

That is, the WTRU may determine the amount of available data it has to transmit within a transmission period according to one or a combination of factors. The WTRU may base its determination regarding the amount of available data to transmit based on the total amount of buffered data at the time of the selection. The WTRU may base its determination regarding the amount of data to transmit based on the total amount of buffered data and expected data arrival within the scheduling period (e.g. arrival rate). The WTRU may base its determination regarding the amount of data to transmit based on a minimum predetermined rate or guaranteed bit rate.

Various techniques described herein may be used individually or in any combination to determine the amount of available data to transmit in a scheduling period. The techniques used to determine how to transmit data may be a function of a configuration associated to a service or a logical channel.

The WTRU may be configured to determine data to transmit based on buffer and/or arrival rate. That is, the data expected to be transmitted may include data already in the buffer plus data expected to arrive and be transmitted (e.g., the WTRU may attempt to empty the content of the buffer plus new arrived data within the scheduling period). In this scenario, the data available for transmission is equivalent to the data already in the buffer plus the data expected to arrive.

$$\text{Data available for Transmission} = \quad \text{(Equation No. 2)}$$
$$\text{Data already in Buffer} + \text{Expected Data}$$

Equation No. 2 is a non-limiting example configuration in which a TTI duration value (e.g. 1 ms) and the number of TTIs until the end of a transmission period (e.g., the first available scheduling period) may be considered. As illustrated in Equation No. 2, if multiple logical channels with the same destination ID are available for transmission, the data already in the buffer and expected new data arrivals may be calculated as the sum of data available from multiple logical channels or applications belonging to the same destination group that may be multiplexed together. The expected data may be the data the WTRU may be expecting to receive within the scheduling period. The WTRU may determine the expected data based on:

expected data Rate*(TTI value*# of TTIs until the
end of a transmission period)

The expected data may be the rate at which date (e.g., new data) may be expected to arrive. This may be a parameter related to a service (e.g., voice, best effort, or the like) and may be configured or predetermined in the WTRU. The arrival rate may correspond to a transmission rate or a target expected rate. For example, expected data rate for best effort may be zero (e.g., the WTRU may determine the data that is already buffered). When calculating expected data, the WTRU may account in the calculation for possible header compression and header removal of potential packets to arrive. In an example of Equation 2, the WTRU may determine the data available for transmission based on data available in the buffer.

The WTRU may be configured to determine the data to transmit based on a target predetermined rate. The target predetermined rate may be a rate to guarantee some quality of service (e.g. guaranteed rate of transmissions) or a maximum rate the WTRU may be allowed to transmit on the given resources or a target information bit rate and may be configured or pre-configured for a given logical channel, for a group of logical channels (LCG), or for a particular service, or related to a group ID or destination ID. The target predetermine rate may correspond to PBR (prioritized bit rate) associated with a LCG. For example, the WTRU may try to transmit data at a target predetermined rate (e.g., as configured for a given service or logical channel).

$$\begin{aligned}&\text{Data to transmit according} \quad \text{(Equation No. 3)}\\&\text{to target Predetermined Rate} =\\&\text{target predetermined Rate} * (TTI \text{ value} * \# \text{ of}\\&TTIs \text{ until the end of a transmission period})\end{aligned}$$

Equation No. 3 may be a non-limiting example configuration where the data to transmit may be set according to the target rate requirement which may be equal to a target predetermined rate. A TTI value (e.g., a duration of a TTI (e.g. 1 ms)) and the number of TTIs until the end of a transmission period (e.g. the first available scheduling period) may be considered. If multiple logical channels with the same destination ID are available for transmission, the data available for transmission may be calculated as the sum of data available from multiple logical channels allowed to be multiplexed together or applications belonging to the same destination group.

The WTRU may determine that data to transmit may be equivalent to Data available for Transmission. The WTRU may determine that data to transmit may correspond to Data to transmit according to target Predetermined Rate.

The WTRU may determine the data to transmit in a scheduling period is equivalent to the minimum of the Data to transmit according to target Predetermined Rate value and Data available data for transmission value.

$$\begin{aligned}&\text{Data to Transmit} = \min(\text{Data to transmit} \quad \text{(Equation No. 4)}\\&\quad \text{according to target Predetermined Rate,}\\&\quad \text{Data available data for transmission)}\end{aligned}$$

Equation No. 4 illustrates a non-limiting example configuration in which the data to transmit may be equal to a predetermined minimum value which may be data to transmit according to the minimum rate requirement and available data for transmission (e.g., buffered data+expected data to arrive). The WTRU may be configured to account for possible headers (e.g., MAC, RLC, PDCP) that may be included for n TB.

The WTRU may be configured to determine the data to transmit for best effort services. That is, the WTRU may be configured with a best effort service, in which case the WTRU may not have a minimum predetermined rate to comply with, but rather attempt to transmit the data in a best effort manner. The WTRU may attempt to transmit the data in the buffer as described herein. The WTRU may determine to transmit as a function of available resources, measured interference in the system and/or a maximum delay time. For example, the WTRU may measure the level of resource utilization and adjust the rate of transmission within each transmission period (e.g., scheduling period). For example, the WTRU may determine the number of available resources in a given time frame based on received scheduling assignments or based on the measured energy on a data resource, or a scheduling resource, or on an average thereof.

The WTRU may be configured, for example, to make the following determination: if at least one or a subset of some of the resources are not utilized or the average utilization of resources is below a threshold, the WTRU may determine to initiate transmission of the buffered data. The WTRU may determine the data to transmit based on the total value of buffered data as above (e.g., arrival rate is equivalent to zero). The WTRU may attempt to transmit the greatest amount of data (e.g., based on the buffer and most potential transmission opportunities) in a given transmission opportunity, e.g., if there are available resources.

The WTRU may be configured to start transmitting at the lowest possible rate (e.g., lowest rate and TB) and in the next scheduling opportunity increase the rate if more available resources are detected.

The WTRU may be configured to select a transport block size after selecting or determining the number of new transmission opportunities in a scheduling period and the total number of data to transmit. The WTRU may be configured to determine a transport block size to use for the duration of transmission with a period (e.g., a scheduling period).

The transport block selected may be selected such that the WTRU may attempt to empty its buffer (e.g., at a predetermined target rate) or to deliver the data to transmit as described herein within the transmission period and the given transmission opportunities.

The WTRU may be configured to determine the minimum number of information bits to transmit in a D2D TTI. The minimum number of bits to transmit in a D2D TTI may equal the data to transmit divided by the total number of opportunities in the first available scheduling period (e.g., the total number of new Tx opportunities). The total number of new TX opportunities may correspond to the sub-frames in which the WTRU may transmit a new TB size within a time period (e.g., scheduling period).

The WTRU may be configured, for example, to select the smallest available transport block that can carry the minimum number of bits to be transmitted in a D2D TTI and the possible headers predetermined to transmit the minimum number of bits in a D2D TTI. The headers included in the calculations may, for example, include the PDCP headers (e.g., taking into account header compression), RLC headers, and MAC headers.

The WTRU may be configured to select an available transport block to correspond with an available transport block size allowed by a configuration set, power limitations (e.g., based on available power and range predetermined for the given service), bandwidth limitations (e.g., depending on the allowed bandwidth the WTRU may select) and/or a selected pattern.

The WTRU may be configured for example to select a RLC PDU size such that it maximizes the amount of data from a logical channel that may be transmitted on the selected transport block size.

The WTRU may be configured to provide one or more scheduling announcements in accordance with various techniques and procedures described herein. The WTRU may be configured to provide a framework to support scheduling announcement functionality which may include one or more apparatuses, mechanisms, or Systems, as well as similar techniques. The WTRU may include computer implemented instructions tangibly embodying a program storage device readable by a machine, or tangibly embodying a program of instructions executable by the machine to implement the techniques. The framework described herein takes into account that device-to-device (D2D) communications may take place outside network coverage or under network coverage (e.g., eNB or equivalently here a controlling node). As such, in these scenarios, it may be desirable for the network to control the D2D resources to improve resource efficiency and control interference.

Figure 5:
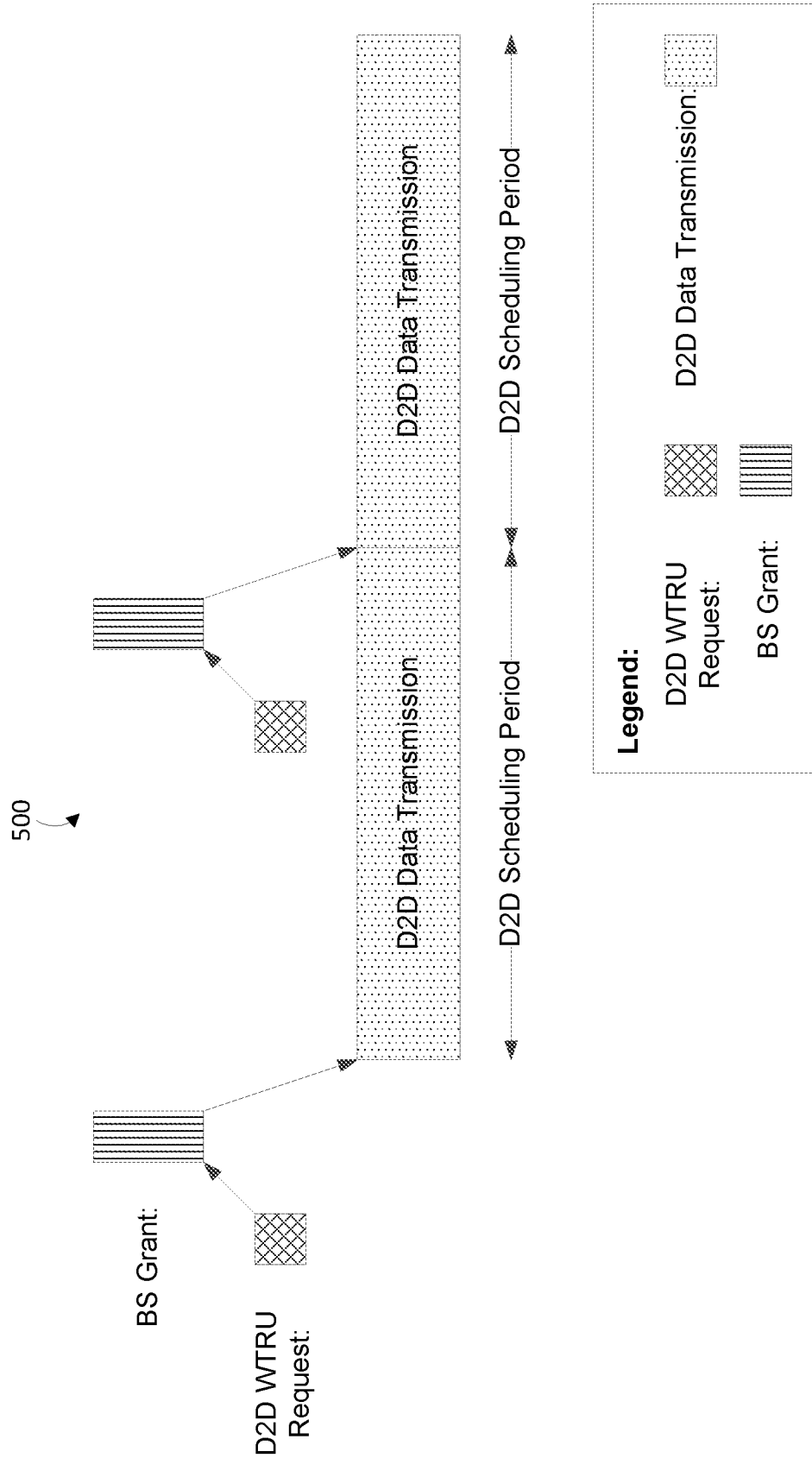
FIG. 5 illustrates an example transmission procedure of a baseline operation framework for providing one or more scheduling announcement.

FIG. 5 is an illustration of an example of a baseline operation framework for providing one or more scheduling assignments 500. As illustrated in FIG. 5, the WTRU (e.g., the D2D WTRU) may be configured to request D2D resources to a base station (BS) (e.g., an eNB configured for Mode 1 D2D communications operations). The BS may, for example, issue a grant for the WTRU to use for D2D communications. The grant may, for example, be valid for a specific period of time, which may include one or more D2D scheduling periods.

Figure 6:
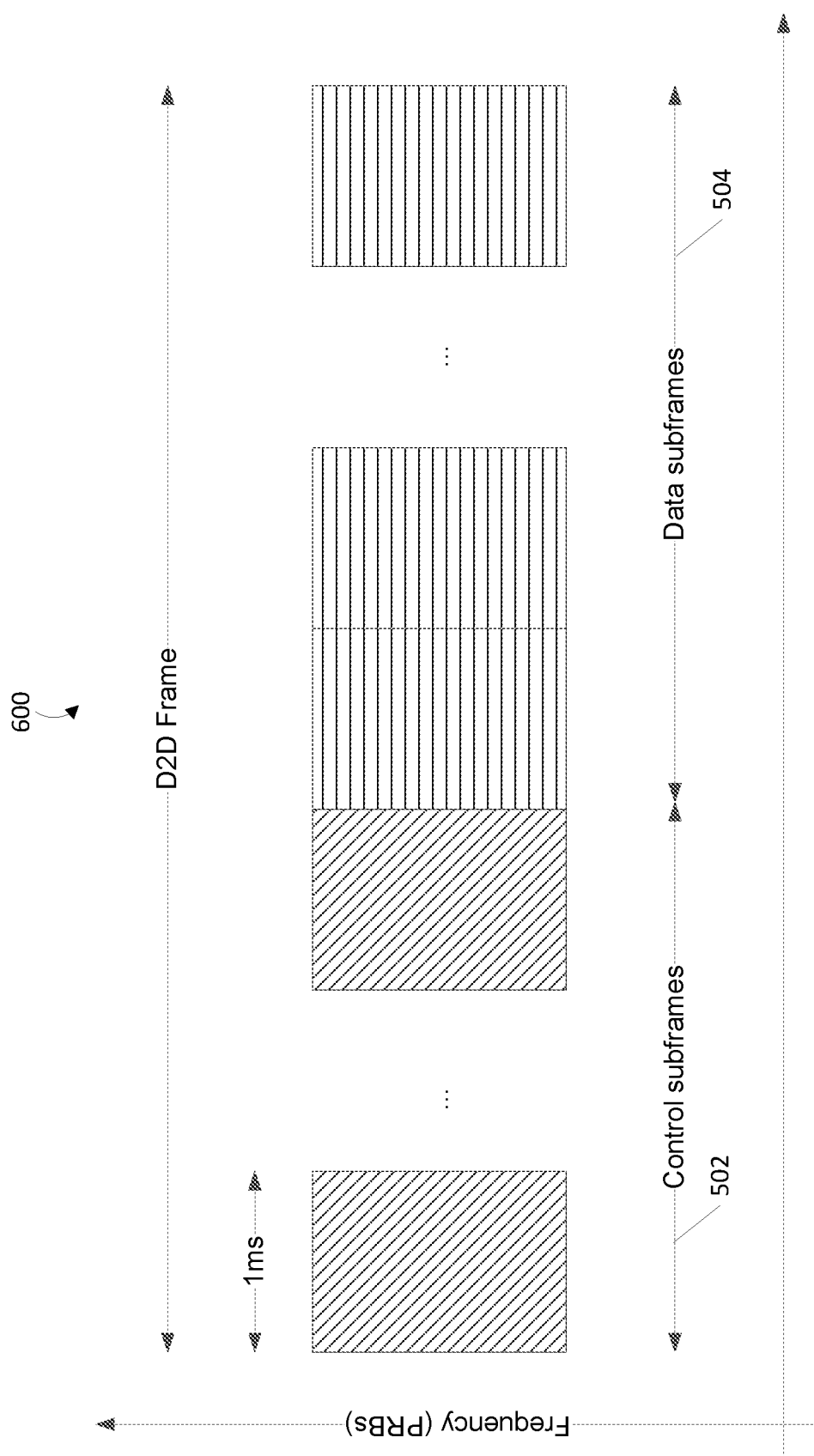
FIG. 6 illustrates the structure of an example of a device-to-device (D2D) frame.

The D2D scheduling period may, for example, consist of one or more D2D frames. FIG. 6 is an illustration of an example of a device-to-device (D2D) frame structure 600. As illustrated in FIG. 6, the D2D frame may consists of multiple subframes of a predetermined length (e.g., 1 ms). As illustrated in the FIG. 6, one or more control subframes 602 and one or more data subframes 604 may be provided.

Figure 7:
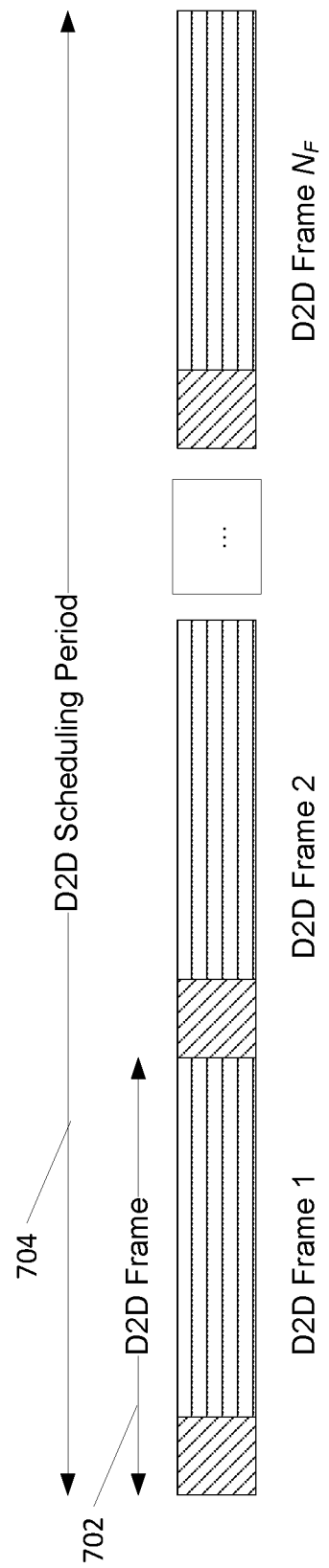
FIG. 7 illustrates an example of a D2D scheduling period which includes two types of D2D frames.

The WTRU may be configured with two or more types of D2D frames, for example, one or more frames carrying control subframes (such as those described herein), and data-only frames which do not carry control subframe. FIG. 7 illustrates an example of a D2D scheduling period 702 which includes the two types of D2D frames. As illustrated in FIG. 7, the D2D scheduling period may consist of $N_F$ D2D Frames. The length of a D2D frame (e.g., D2D frame 704) may be fixed. For example, the length of the frame may be set to a predetermined specified length (e.g., in accordance with 3GPP specifications such as 10 ms which is the same as a regular LTE frame). Similarly, the location and the number of the control and data subframes may be fixed in accordance with a 3GPP specification.

Grant reception and management procedures of scheduling announcements in accordance with various techniques and procedures are described herein. As illustrated in FIG. 5, the D2D grant received by the WTRU (e.g., the D2D WTRU), may include, for example, one or more elements. A D2D WTRU may be configured to include one or more of a data rate allowed for a transmission element, a transmission power element, a data rate allowed for transmission, or an allocated resource element (e.g., TP resource or T-RPT) for data transmission. The allocated resource element may include one specific resource index that the WTRU has to use and/or a set of resources from which the WTRU may further make a selection (e.g., randomly).

In accordance with the grant reception and management procedures described herein, the WTRU (e.g., the D2D WTRU) may be configured to include a grant element, which may provide for receiving and processing various types of grants. That is, for example, D2D WTRU may be configured to receive and process a semi-persistent grant. The WTRU may be configured to receive and process a time-limited grant. The actual validity duration of the time-limited grant may, for example, be fixed in accordance with 3GPP specifications or preconfigured in accordance with a predetermined time duration. The validity period may, for example, be explicitly signaled as part of the D2D grant. The validity may be expressed as an integer number of D2D Scheduling Periods (e.g. in a special case the validity of the grant is a single D2D Scheduling Period).

In accordance with the grant reception and management procedures described herein, the WTRU may be configured to include an element for determining the identity of the WTRU targeted to receiving the grant.

Also, in accordance with the grant reception and management procedures described herein, the WTRU may be configured to include services or set of logical channels for which the D2D grant applies. For example, when receiving a grant, the WTRU may determine if the grant is dedicated to that WTRU (e.g., by using its identity). The WTRU may be configured such that if the grant is carried over the PDCCH, procedure such as a DCI mechanism may be used. The WTRU may be configured to receive a new DCI format defined for the D2D grant. Once the WTRU has successfully decoded the D2D grant, it may then apply the parameters indicated in the D2D grant for transmission.

The WTRU may be configured, for example, to reset the grant and stop transmitting D2D data upon the occurrence of one or more events. For example, the grant validity period may expire, thereby causing a reset of the grant and/or stopping the transmission of D2D data. The D2D WTRU may be configured, for example, to receive a zero grant, or a semi-persistent scheduling deactivation order which may cause a reset of the grant and/or stop the transmission of D2D data. The WTRU may be configured, for example, to cause a reset of the grant and/or stop the transmission of D2D data when the WTRU moves out of coverage, or handovers to a different cell or base station. The WTRU may be configured to stop transmission at the end of a D2D Scheduling Period.

Upon reception of a new grant, the WTRU may be configured to use the new received grant at a predetermined specific time (e.g., at the start of the next D2D Scheduling Period).

As described herein, the WTRU may be configured to provide scheduling announcement procedures and techniques. The WTRU, for example, may be configured to transmit the SA with repetition. That is, when the WTRU is configured for D2D data transmission and has a valid grant (or is outside of network coverage), the D2D WTRU may be configured to transmit a scheduling announcement (SA) before the data transmission. The SA (which may be equivalent to the RREQ as described herein), may be used to indicate the presence of an associated data transmission and the parameters for decoding the data to the target (e.g., destination WTRU) receiving WTRUs.

In D2D broadcast communications, the scheduling may, for example, be carried out in a distributed manner. The SA may, for example, be assumed to be valid for the duration of a D2D Scheduling Period which may be comprised of multiple D2D frames. Since the duration of the D2D Scheduling Period may be large, it may appear important to provide robustness to SA detection by retransmitting the SA during the course of a D2D Scheduling Period. This procedure or technique provides the benefit such that receiving WTRUs that may have missed the first SA may still be able to start decoding data even if it misses the first SA at the beginning of a D2D scheduling period, for example.

A WTRU (e.g., a D2D WTRU) may retransmit an SA using same resources and time unit in the next SA transmission opportunity (within the SA resource set). The WTRU may retransmit an SA to increase the chances of reception from other WTRU (e.g. from WTRUs that may transmit the first SA at the same time as the first SA of the WTRU or in resources that may be less interfered). The WRU may chose a different resource (e.g. different time) within the resource set for retransmission. The WTRU may randomly pick a time and resource, or it may follow any of the solutions described above for resource selection.

The WTRU may be configured to determine the timing of one or more D2D scheduling periods based on SA. That is, to decode the data, the receiving WTRU may be configured to determine the TP resource (or T-RPT), the MCS, the TBS, the RV, and the like, as well as where the timing of the D2D scheduling period is located (e.g., to align with the TP resources or T-RPTs). The receiving WTRU may be configured to determine the D2D scheduling period based on an explicit or implicit indications in the SA. For example, the SA may carry an explicit indication of the D2D frame count within the D2D Scheduling Period. The transmitting WTRU may be configured to set a D2D Frame counter field in the SA at each D2D Frame within a D2D scheduling period (and reset the count at each new D2D scheduling period). The receiving WTRU may then determine the beginning of the D2D scheduling period by decoding the D2D Frame counter in the SA. An example of implicitly determining one or more scheduling periods from an SA may include a receiving WTRU configured such that it may derive the D2D Frame count implicitly based on the characteristics of the SA, and/or D2D Sync Signal (D2DSS). For example, the WTRU may use the characteristics of one or more reference signals in the D2DSS or SA associated to the D2D scheduling period to determine the D2D Frame count.

The WTRU may be configured to take certain actions upon reception of the SA. For example, upon reception of the SA, the WTRU may be configured to determine the D2D scheduling period (e.g., using the procedures and techniques described herein). The WTRU may be configured to determine if the SA is the first SA of the D2D scheduling period. The WTRU may determine the TP resource (or T-RPT) and attempt to decode the data in the indicated TP resources (or T-RPTs), e.g., using various predetermined indicated parameters (e.g., MCS, TBS, etc.). The WTRU may flush the HARQ memory and/or assume that the data being received is new data (e.g., assume that for one or more new HARQ processes the WTRU has received a new data indicator) at the beginning of the D2D scheduling period, or when it starts receiving for a new D2D scheduling period. The WTRU may be configured to determine that the SA received is not the first SA of the D2D scheduling period. In such a scenario, the WTRU may determine the TP resources (or T-RPTs) and shift the pattern according to a predetermined position in the D2D scheduling period (e.g., according to the determine D2D frame number), and attempt to decode the data.

The WTRU may be configured to handle a scenario where the WTRU does not successfully decode an SA during a D2D scheduling period, but has decoded a previous SA associated to the same D2D Scheduling Period. In this scenario, the WTRU may, for example, assume that the first SA received is still valid and attempt to decode the data using the same parameters received previously for the same D2D scheduling period. The WTRU may handle this scenario in accordance with a configuration that provides that the WTRU not attempt decoding of the data and wait for the next SA signal. The WTRU may be configured to receive a special indication on the SA (e.g., an early termination) which may indicate that there is no more data to be received in the D2D scheduling period. In such a situation, the D2D WTRU may be configured to stop attempting decoding the data for the remainder of the D2D Scheduling Period.

The procedures and techniques for reception of the SA described herein may be any order or combination of procedure and/or technique.

A transmitting WTRU (e.g., a transmitting D2D WTRU) may be configured to stop transmission of data and/or SA, or transmit a special termination indication. That is, the transmitting WTRU may, for example, be configured to transmit the SA at specific occasions as defined by the D2D Frame. When the transmitting WTRU has emptied its buffer, the transmitting WTRU may be configured to stop transmitting data. The transmitting WTRU may further transmit one or more SAs (e.g., until the end of the associated D2D scheduling period) with a special indication for early termination. This indication may allow one or more receiving WTRUs to stop monitoring for data. The transmitting WTRU may, for example, be configured to no longer transmit SA when it has emptied its buffer. In this situation, the one or more receiving WTRUs (e.g., D2D WTRUs) may be configured to either stop monitoring for data when not receiving the SA or still attempt decoding. In the event that the one or more receiving WTRUs continue to attempt decoding, they may waste battery energy.

The processes and instrumentalities described herein may apply in any combination, may apply to other wireless technology, and for other services. A WTRU may refer to an identity of the physical device, or to the user's identity such as subscription related identities, e.g., MSISDN, SIP URI, etc. WTRU may refer to application-based identities, e.g., user names that may be used per application.

Clear channel assessment may be utilized to determine whether D2D transmission resources are available and/or suitable to send and/or receive RREQ (or SA), RRSP, or D2D data channels. A WTRU may be configured to utilize clear channel assessment. A WTRU may be configured to utilize measurements and/or channel sensing to determine whether D2D transmission resources may be available and/or suitable in order to send and/or receive RREQ (or SA), RRSP, and/or D2D data channels.

The WTRU may be configured to determine whether D2D transmission resources may be available. The WTRU may be configured to determine which resources may be suitable for D2D transmission. The WTRU may be configured to select resources D2D transmissions and/or signaling. The WTRU may be configured to select resources for D2D control from other WTRUs. The WTRU may be configured to select resources for transmissions to other WTRUs.

The WTRU may be configured to obtain configuration information. The WTRU may be configured to obtain configuration information about D2D transmission resources in the vicinity. The WTRU may be configured to use stored configuration information to obtain configuration information about D2D resources in the vicinity. The WTRU may be configured to store configuration information in a database stored on the WTRU. For example, configurations may be stored on UICC/USIM, application data and/or through SW configuration. The WTRU may be configured to use signaled configuration information to obtain configuration information about D2D resources in the vicinity. The WTRU may be configured to decode control signaling from other WTRUs carrying information about D2D configurations in use. The WTRU may obtain signaled configuration information may by decoding of control signaling from other WTRU carrying information about D2D configurations in use. For example, the WTRU may obtain configurations from a Cluster Head, eNB, and/or D2D control server. The WTRU may be configured to obtain configuration information from manually selected configuration information based on user input. For example, the WTRU may obtain configuration information from the user of the device by selecting transmission resources such as channel numbers and code identifiers manually.

The WTRU may be configured to determine allowed D2D transmission resources in use in its vicinity. For example, the WTRU may determine one or more possible subframes allowed for D2D transmissions in a frame. The WTRU may determine one or more possible subframes allowed for D2D transmissions in a recurrence patterns of D2D subframes. The WTRU may determine one or more possible subframes allowed for D2D transmissions in frames that may determine when D2D transmission resources occur in time and/or D2D channel access parameters. Channel access parameters for advertised D2D transmission resources may include specific D2D allocations. Channel access parameters for advertised D2D transmission resources may include allowed resources. Allowed resources may transmit and/or receive beacon signals and/or SA signaling, etc.

The WTRU may perform channel measurements on one or more D2D transmission resources. The WTRU may perform channel measurements on one or more D2D transmission resources, wherein the transmission resources comprise a predetermined subset of transmission resources. The WTRU may perform channel measurements on one or more D2D transmission resources, wherein the transmission resources are selected to identify transmission resources for monitoring incoming D2D transmissions by other devices. The WTRU may perform channel measurements on one or more D2D transmission resources, wherein the transmission resources are selected to identify suitable transmission resources for the D2D transmissions of the WTRU.

Channel measurements and/or evaluation of transmission resources may be limited to a subset of one or more possible time/frequency resources. Limiting channel measurements and/or evaluation of transmission resources may reduce complexity of D2D transceiver design. Limiting channel measurements and/or evaluation of transmission resources may improve reliability of the measurement process, for example, by excluding time/frequency resources on which no transmission may be expected to occur.

The WTRU may be configured to determine the bandwidth of a system. The WTRU may be determined to start measuring identified subframes to determine which frequency and time resource combinations are least interfered. Frequency may comprise RBs. Time may comprise subframes. For example, the WTRU may be configured to determine that, in the entire system bandwidth of 10 MHz in subframes 7, 8, and 9, one or more even radio frame may be allowed for D2D transmission in the vicinity and start measuring those identified subframes to determine which particular combinations of frequency and/or time resources are least interfered.

The WTRU may be configured to distinguish different types of transmission resources in channel measurement to identify particular valid and/or suitable transmission resources. The WTRU may be configured to execute different measurements in parallel. The WTRU may be configured to execute different measurements overlapping in time. The WTRU may be configured to execute different measurements sequentially. For example, the WTRU be configured to perform a first type of channel measurement on a first subset of resources to search for D2D synchronization. For example, the WTRU be configured to perform a first type of channel measurement on a first subset of resources to search for beacon transmissions. For example, the WTRU be configured to perform a first type of channel measurement on a first subset of resources to search for a second type of channel measurement on a second subset of resources where SA transmission may occur.

A WTRU may be configured to distinguish different types of transmission resources. A WTRU may be configured to utilize measurement hardware and/or software to exploit features of the signal structure that may be expected to occur in these resources, for example, when the WTRU distinguishes different types of transmission resources. Distinguishing different types of transmission resources may increase detection performance for the D2D signals. Distinguishing different types of transmission resources may reduce the complexity of the D2D transceiver design.

The WTRU may be configured to determine suitable D2D transmission resources that may be in use in its vicinity. The WTRU may be configured to determine one or more set of transmission resources that may distinguish between different purposes. The WTRU may be configured to determine the expected signaling that the sets of resources may carry.

The WTRU may be configured to select a transmission resource from the selected suitable D2D transmission resources. The selected resources may correspond to the D2D resources the WTRU monitors for incoming transmissions. The selected resources may correspond to resources that the WTRU selects for D2D transmission.

The WTRU may be configured to obtain measurements. A WTRU may be configured to compare measurements to make a selection. A WTRU may be configured to determine a set of suitable D2D transmission resources.

The WTRU may evaluate a list of D2D transmission resources by segmenting these resources into D2D access slots.

For example, if the D2D transmission resources correspond to subframes 7, 8, and 9 in even radio frames, the WTRU may be configured to partition these resources, wherein the WTRU is further configured to determine whether the resources are to be transmitted. If the WTRU determines the resources are to be transmitted, the WTRU may be configured to transmit the resources so that one or more, or each, D2D signal may occupy $L=2$ RBs of a subframe. For an example with bandwidth of 10 MHz or 50

RBs, the WTRU may be configured to determine that 22 access slots each comprised of L=2 RBs may be possible, such as when the WTRU may be configured to account for frequency guard or reserved RBs. The access slots may correspond to a subset of OFDM symbols in a subframe. The access slots may correspond to one or more RBs grouped over more than one subframe, which may occur in the same frequency location or may occur in a different frequency location. Different D2D signal types may correspond to access slots that may have different sizes in frequency domain and/or time. For example, a first type D2D signal/channel occupying 2 RBs in one subframe, and a second type of D2D signal/channel occupying 1 PRB and occurring over 2 different subframes, etc. The WTRU may distinguish between different type(s) of access slots. The WTRU may be configured to determine a map of channel access slots.

Measurements and metrics derived for the channel access slots may offer an objective measure of comparison of signal power received and/or interference level perceived to allow for spatial reuse of transmission resources. Measurements and metrics derived for the channel access slots may provide for an increased D2D capacity.

The WTRU may be configured to derive metrics for determined access slots. The WTRU may be configured to use the full set of REs available in an access slot to determine signal power on a transmission resource. The WTRU may be configured to use the full set of REs available in an access slot to determine interference on a transmission resource. The WTRU may be configured to use a subset of REs available in an access slot to determine signal power on a transmission resource. The WTRU may be configured to use a subset of REs available in an access slot to determine interference on a transmission resource.

The WTRU may be configured to measure received signal power on a subset of Res. The subset of Res may be known from the signal structure for D2D transmissions for a given access slot, for example, including pilot symbols. The WTRU may derive an interference measurement, for example, by evaluating received power contributions on a subset of REs in an access slot. Such measurements may be combined, for example, based on individual measurements obtained over multiple symbols or subframes.

The WTRU may obtain a list of metrics for individual access slots. The WTRU may process obtained channel measurements with a set of offset values. The WTRU may use a mapping function to produce a set of representative values for individual access slots. The WTRU may use a mapping function to produce a set of representative values for selected groupings of access slots.

For example, the WTRU may determine that a first access slot may have a channel occupancy value of 10 (e.g., high) whereas a second access slot may have a channel occupancy value of 2 (e.g., low). The WTRU may determine that received signal power on a first access slot of a first type is −90 dBm and the received signal power on a second channel access slot of a second type is −80 dBm when accounting for offset values.

The WTRU may select one or more suitable D2D transmission resources. For example, the WTRU may select one or more suitable D2D transmission resources perhaps based on measurement and evaluation described herein.

For example, the WTRU may determine a set of least interfered and/or used access slots. The WTRU may elect at least one transmission resource based on random selection from the set of the least K=10 interfered access slots.

The WTRU may be configured to determine the access slots that may carry a specific type of D2D signal from the set of measured access slots. The specific type of D2D signal may include D2D signals serving synchronization or discovery in vicinity.

The WTRU may select the access slots to monitor, wherein the access slots are selected from the set of access slots with observed highest signal power. The WTRU may decode incoming D2D transmissions from other WTRUs.

Figure 8:
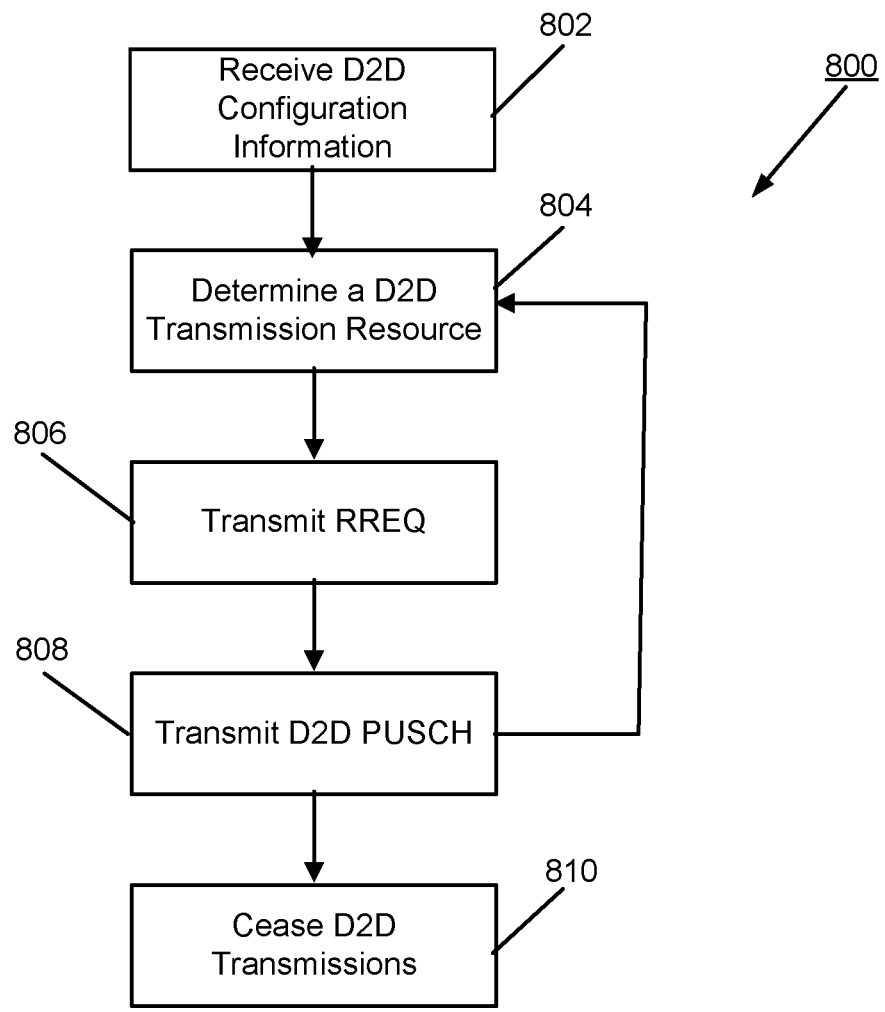
FIG. 8 illustrates an example transmission procedure using SA to announce a D2D Physical Uplink Shared Channel (PUSCH).

FIG. 8 illustrates an example transmission procedure 800 using SA to announce D2D PUSCH. A transmission may use SA to announce the use of D2D physical uplink shared channel (PUSCH) resources, for example, including link adaptation. At 802, the WTRU may receive D2D configuration information. At 804, the WTRU may determine the D2D transmission resource. At 806, the WTRU may transmit SA. At 808, the WTRU may transmit D2D PUSCH. The WTRU may be configured to repeat 804, 806, and 808 until the WTRU determines D2D transmissions may cease. The WTRU may be configured to cease D2D transmissions at 810.

At 802, the WTRU may receive a D2D configuration, for example, by reading configuration information through broadcast system information. The WTRU may receive a D2D configuration by reading a configuration message received from another device, for example via a D2D communication using D2D PUSCH or via a control channel such as the PD2DSCH (the Physical D2D Synchronization Channel). The configuration may include timing/synchronization information for D2D signal transmissions, such as periodicity and/or recurrence. The configuration may include one or more timing information. The timing information may be applicable to different types of D2D signals. For example, first timing information may correspond to transmission or reception opportunities for SA. Second timing information may correspond to transmission or reception opportunities for D2D PUSCH. The configuration may include applicable PRB(s) and/or resource index (e.g., depending on the D2D signal type) for the resource allocations corresponding to transmission and/or reception of SA and D2D PUSCH.

At 804, the WTRU that acquired a D2D configuration may be configured to determine a D2D transmission resource. The WTRU may determine the D2D transmission resource based on a measurement. The WTRU may determine the D2D transmission resource based on random selection of one of the resources from the set of available resources. The WTRU may determine the D2D transmission resource by a signaling exchange. The WTRU may determine the D2D transmission resource by a signaling exchanging including indication, resource requesting, and/or resource granting between the transmitting WTRU and an eNB. Determining D2D transmission resources by signaling exchange may be utilized when operating under network coverage.

At 806, the WTRU may transmit SA on a first set of selected D2D transmission resources during a first transmission period. During the first transmission period, a set of selected transmission parameters for D2D PUSCH that may be announced by the SA may be valid. The WTRU may transmit the SA for $N_{SA}$ times during a configurable $P_{SA}$ periodicity. For example, $N_{SA}$ may be 2, and $P_{SA}$ may be 50 ms. The SA may include information that may relate to the transmission parameters of the D2D PUSCH, such as MCS and/or HARQ-related information described herein.

At 808, the WTRU may transmit D2D PUSCH on a second set of selected D2D transmission resources during a second transmission period. The D2D PUSCH may be transmitted with a periodicity of $P_{D2D}$ TTIs, TPs or subframes. For example, $P_{D2D}$ may be 4 ms.

The WTRU may determine a set of D2D transmission resources that may be valid for the second transmission period (or, e.g., a scheduling period). For example, the WTRU may determine a set of D2D transmission resources that may be valid for the second transmission period before the first SA transmission period expires. The selected transmission resources of the following transmission period may correspond to the selected transmission resources of the preceding transmission period. The selected transmission resources of the following transmission period may be different than the selected transmission resources of the preceding transmission period. The WTRU may be configured to determine whether to select a new set of transmission resources for the following transmission period. The WTRU may determine to select a new set of transmission resources for example if the WTRU has used the same transmission resources consecutively for a pre-determine amount or number of time. The WTRU may determine to select a new set of transmission resources for example based on a random trial. For example, the WTRU may be configured to select a new set of transmission resources randomly (e.g. uniformly) $N_{select}$ times out of $M_{period}$, where the values for $N_{select}$ and $M_{period}$ may be pre-configured in the specifications, or via the network. The WTRU may be configured to select a new set of transmission resources at specific predetermined subframe numbers optionally parameterized by the WTRU ID or other transmission-specific identifier. More specifically, the WTRU may be configured to select a new set of transmission resources every $M_{period}$ frame or subframe with an offset associated to the WTRU ID or other transmission-specific identifier (ID). For example, the WTRU may be configured to select a new set of transmission resources when the following relationship holds: (SFN+ID) mod $M_{period}$=0, where SFN here is the subframe number. The set of selected transmission parameters may be the same or different.

At 810, the WTRU may determine whether the WTRU may end and/or cease its D2D transmissions. The source WTRU may stop transmitting D2D signals when there is no data. The WTRU may stop transmitting D2D signals when a timer expires. The WTRU may stop transmitting D2D signals when a maximum counter value is reached. The WTRU may stop transmitting D2D signals when receiving a signaling message from the eNB. The WTRU may stop transmitting D2D signals when receiving a signaling message from the eNB while operating under network coverage.

Figure 9:
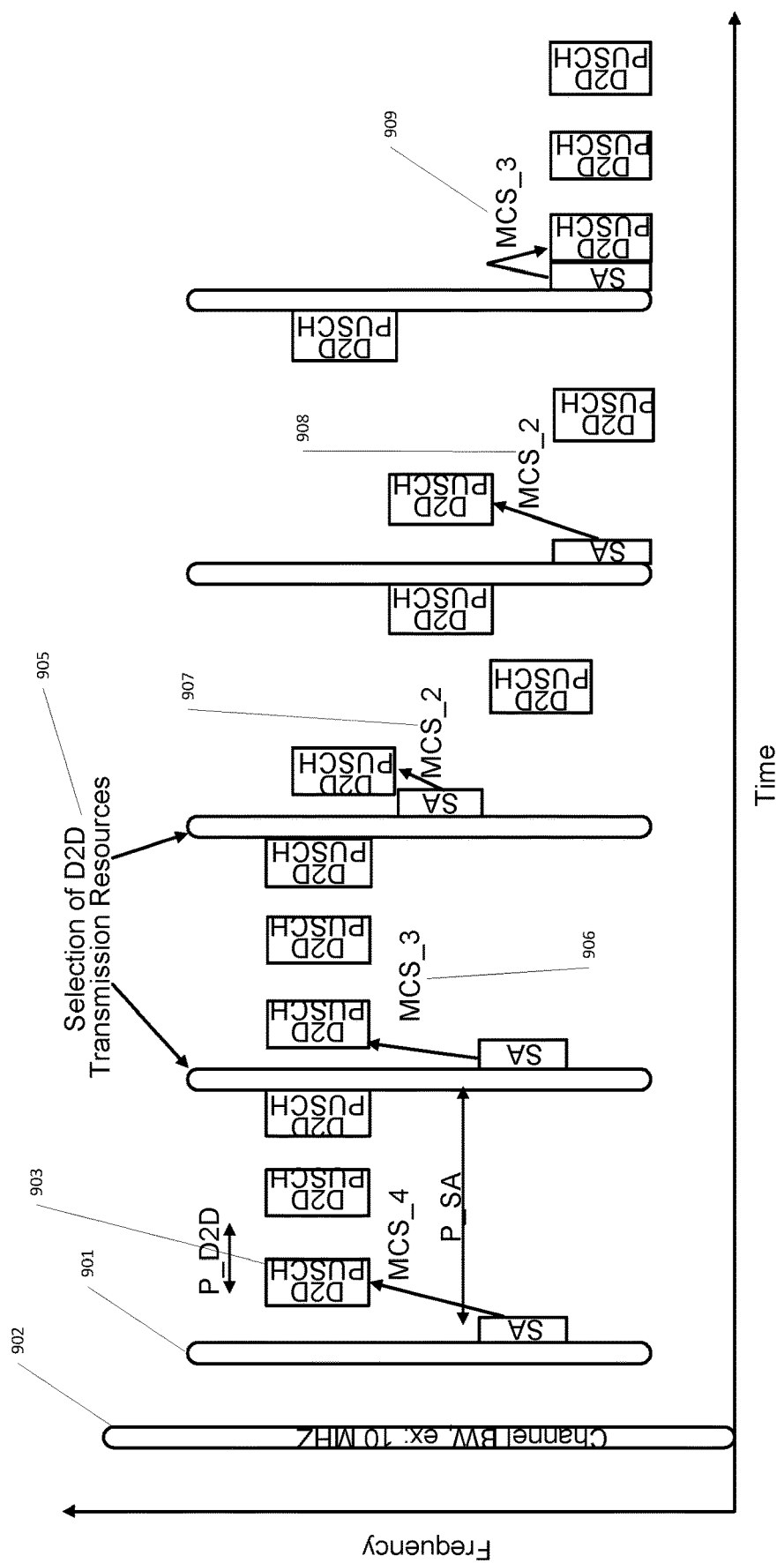
FIG. 9 illustrates an example transmission procedure employing efficient D2D data signaling.

FIG. 9 illustrates an example of how the transmission may be utilized for efficient D2D data signaling. As shown in FIG. 9, the measurement bandwidth 901, where the source WTRU may determine D2D transmission resources to transmit at 806 and 808, may be set to less than the full nominal uplink channel bandwidth of 10 MHz 902. The periodicity of SA transmission may be configured to be $P_{SA}$=40 ms. There may be one SA transmission per SA period, e.g., $N_{SA}$ may be 1. Transmission of D2D PUSCH may be done at 8 ms (e.g., Tx repeated at 8 ms intervals) using $P_{D2D}$=8 ms. During the first SA scheduling period, frequency hopping may be omitted for D2D PUSCH, and the associated SA 903 may indicate MCS_4. In the second scheduling period, following another determination of transmission resources 905, the same transmission resources may be kept. Another MCS 906 may be indicated by the SA. In the third scheduling period, both MCS 907, 908 as indicated by SA may be changed, and frequency hopping for D2D PUSCH may be enabled. In the fourth scheduling period, preceded by another round of channel availability assessment by the WTRU, another set of D2D transmission resources may be selected to transmit at 806 and 808 of FIG. 8. The MCS 909 may be set to a value indicated through SA.

A destination WTRU may separately decode transmission parameters. Decode transmission parameters may include frequency location and/or MCS for D2D PUSCH. A WTRU may receive the SA. The WTRU may tune the receiver to the subsequent occurrences of D2D PUSCH during a scheduling period. Reception of the SA may be sufficient to tune the receiver to the subsequent occurrences of D2D PUSCH during the scheduling period. A WTRU may send SAs frequently and/or intermittently. Frequent intermittently sending SA may allow a destination WTRU to tune into any ongoing D2D transmissions by the source WTRU even if the destination WTRU may have missed the beginning of a talk spurt.

The WTRU may be configured to select one or more of the following transmission parameters for the duration of a scheduling period associated to a SA: TBS, MCS, bandwidth, number of PRBs, number of HARQ processes, inter-PDU interval time, number of HARQ transmissions. The WTRU may be configured to determine the number of bits to transmit during a scheduling period. The WTRU may be configured to determine the number of bits to transmit during an interval. The scheduling period or interval may be based on one or more of the amount of data in the D2D buffer, the data priority, and the type of data (e.g., delay sensitive or not) associated to the configured applications, a transmission rate for the data to be transmitted. Configured applications may include Voice, video streaming, etc. For example, the WTRU may be configured to determine the TBS, MCS and BW of one or more transmissions in the scheduling period. The WTRU may be configured to determine the TBS, MCS and BW of one or more transmissions in the scheduling period by estimating the amount of data that needs to be transmitted during the interval and the number of new MAC PDU that may be transmitted according to the HARQ profile and the D2D transmission pattern.

The WTRU may be configured to select a hopping pattern. The WTRU may be configured to select the hopping pattern and the D2D transmission pattern. The WTRU may select the hopping pattern if the D2D transmission pattern is defined as a time pattern only. The WTRU may be configured to set the hopping pattern based on one or more parameters. Parameters may include WTRU ID, transmission pattern index, SA resource, time (e.g. frame/subframe number), destination ID, D2DSS parameters, etc. The SA may indicate in part the information on which the hopping pattern is based. The WTRU may be configured to receive information on which the hopping pattern is based from the SA. For example, the WTRU may determine the hopping pattern based on one or more identifiers carried in the SA, such as the source ID, target ID. The WTRU may sets the hopping pattern based on the target ID associated to the D2D data transmission and the D2D transmission pattern index. The WTRU may set the hopping pattern if a receiving WTRU may be capable of receiving a single transmission for a given service. The WTRU may sets the hopping pattern based on a target ID and SA resource.

The WTRU may include control information from one or more of the following elements: MCS, D2D transmission pattern (i.e. T-RPT), number of PRB (or BW), destination ID. The WTRU may encode the control information. The WTRU may transmit using a PUSCH-like transmission structure with a fixed format. The fixed format of the SA may be known to the receiver.

Two or more WTRUs (e.g., D2D WTRUs) may be configured to support direct D2D communications, e.g., in the absence of network infrastructure. For example, in public safety applications (e.g., police, firefighters, ambulances, etc.), two or more WTRUs may communicate directly when out of range of a network. For example, the WTRUs may be in a tunnel or a basement with no or a low power network access. In public safety applications, the ability to communicate directly may be critical to the operation.

An example of public safety communication may be where multiple users may communicate in a group, e.g., using push-to-talk (PTT). PPT may be half-duplex, as only a single user may talk at a time in a given group. Each group may be assigned a specific PTT-channel for communication. The PTT-channel may be a physical channel and/or a logical channel that is mapped to a set of physical resources either on a semi-static basis (e.g., determined by the network). The set of physical resources may be pre-configured. The PTT-channel may be considered to be a service. For example, a WTRU may be configured with multiple concurrent services.

D2D broadcast communications (e.g., for public safety purposes) may be functional in the absence of a network infrastructure, such that the WTRUs may operate without control from the network (e.g., no physical downlink control channel (PDCCH)). As a result, the receiving WTRUs may require an indication of the parameters of received transmissions in order to decode them properly.

D2D broadcast communications may be characterized by a high range (or coverage) requirement. The D2D transmission link may be more different than an infrastructure-based uplink transmission (WTRU-to-eNB) since both devices (e.g., D2D WTRUs) may be located at a low height above the ground and the receiver sensitivity of each of the devices may not be as high as that of a base station (e.g., 9 dB noise figure instead of 4 dB).

Systems, methods, and instrumentalities may be provided to enable data transmission in D2D broadcast communications with sufficient range. For example, a WTRU may transmit higher layer data from a number of transport blocks (e.g., zero, one or more than one) in a transmission time interval (TTI) over a physical channel (physical D2D broadcast physical channel (PDBCH)). The WTRU may transmit control information in the TTI over the PDBCH. The PDBCH may be referred to as D2D PUSCH.

Figure 10:
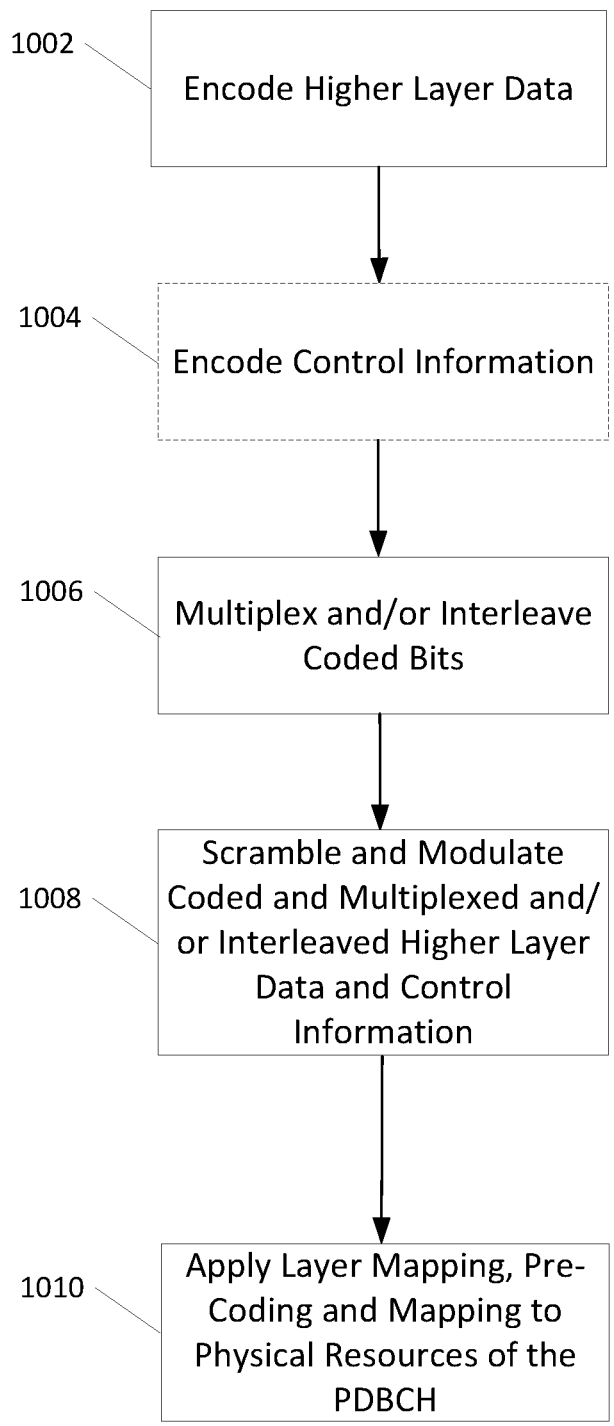
FIG. 10 illustrates an example of transmitting higher layer data and control information.

FIG. 10 illustrates an example of transmitting higher layer data and control information. The processing of the control information may be similar to that defined for other control channels (e.g., a physical uplink shared channel (PUSCH) or a physical downlink shared channel (PDSCH)). As illustrated in the example in FIG. 10, at 1002, higher layer data may be encoded (e.g., from each transport block), and the control information (e.g., if applicable). At 1004, the higher layer data and/or control information may be segmented into code blocks and/or transport blocks. Cyclic redundancy check (CRC) information may be added for each of the code blocks and/or transport blocks. At 1006, the coded bits may be multiplexed and/or interleaved for higher layer data and control information (e.g., if applicable). At 1008, the coded and multiplexed and/or interleaved higher layer data and control information (e.g., if applicable) may be scrambled and modulated. At 1010, layer mapping, pre-coding, and mapping may be applied to the physical resources of the PDBCH.

A WTRU may transmit at least one reference signal (D2D broadcast demodulation reference signal (DBDM-RS)) for each port at least to assist in reception of the PDBCH by one or more receiving WTRUs. The DBDM-RS may have a structure similar or identical to a reference signal used for uplink or downlink communication (DM-RS). The DBDM-RS may use resources in time and frequency that are close to that of the PDBCH (i.e., within same subframe and resource blocks) to maximize quality of the channel estimates. The DBDM-RS may be referred to as the D2DSS.

A receiving WTRU may measure the at least one DBDM-RS to estimate the channel of each antenna port used for transmitting the PDBCH. Corresponding steps to the method illustrated in FIG. 10 may be performed, for example, in reverse order for the reception of the PDBCH and subsequent decoding of transport block(s) and/or control information (e.g., an SA).

The control information (e.g., the SA) may include information required to process the data included in the current PDBCH transmission. For example, in combination with one or more previous PDBCH transmissions. The control information may include parameters, such as used in one or more of the following. For example, the control information may include parameters in a hybrid automatic repeat request (HARQ) information for the data transmitted on the PDBCH (e.g., an indication of a HARQ entity or process, an indication of new data or retransmitted data, a redundancy version or retransmission sequence number (RSN)). For example, the control information may include parameters in an indication of the number of transport blocks (e.g. for the duration of the scheduling period). For example, the control information may include parameters in an indication of whether control information is included (e.g., multiplexed and/or interleaved). For example, the control information may include parameters in an indication of whether higher layer data is included (e.g., one or more transport blocks) or if the PDBCH includes control information, resource mapping (such as an indication of the set of resource blocks used by the PDBCH, such as number of PRBs (bandwidth) or a set of PRBs). For example, the control information may include parameters in an indication of the set of antenna port(s) used for the transmission. For example, the control information may include parameters in an indication of a parameter used for the initialization of a pseudo-random sequence for scrambling and/or reference signal generation. For example, the control information may include parameters in an indication of a user and/or service index and/or an indication of a security context index. The control information may include information supporting other functionality, such as scheduling request or channel state information reporting (if applicable), a sequence number in support of higher layer functionality (such as ciphering and/or integrity protection), and/or a frame or sub-frame number.

Control information may be pre-defined, pre-configured for the WTRU or provided by higher layer signaling. The control information may be transmitted (e.g., transmitted explicitly) in a physical channel, such as the PDBCH, according to the processing outlined in the previous paragraphs, or in a separate physical channel used for carrying control information (e.g., the PD2DSCH). The control information may be provided (e.g., provided implicitly), e.g., by associating a property of a transmitted signal to a possible value of the control information.

With respect to implicit provision of control information, a receiving device may obtain SA decoding (e.g., transport block (TB) size or modulation and coding scheme (MCS)) based on detecting one of a set of possible values for a property of DB-DMRS (e.g., cyclic shift difference between two symbols or more). The control information may be implicitly indicated by a property of a reference signal (DB-DMRS) transmitted along the SA, or of a specific OFDM symbol of the SA. The implicit indication may reduce or eliminate the need for explicitly indicating the SA (e.g., in the PDBCH itself), thus maximizing the available energy per information bit.

The SA control information may include an index to a set of N possible pre-defined transport combinations, where a transport combination may be defined as a specific set of parameter values associated to the transmission of the SA. For example, a transport combination may define a certain value for the number of resource blocks and a value for the modulation and coding scheme. A transport combination may define a certain value for the transport block size. The set of possible pre-defined transport combinations may be pre-defined, pre-configured, or may be provided by higher layers.

Some examples of properties of DB-DMRSs that may be associated with control information include, e.g., a value of the cyclic shift a detected in a specific OFDM symbol where DB-DMRS is present, a difference between the values of the cyclic shift between two specific OFDM symbols where DB-DMRS is present, a base sequence number uf, a sequence number v, a combination of (u,v), an index I to an orthogonal sequence $w_i(m)$, a time different between OFDM symbols where DB-DMRS is present, etc.

The DB-DMRS may have a structure similar to that of UL DM-RS associated to PUSCH or physical uplink control channel (PUCCH). The reference signal in an OFDM symbol may be derived from a cyclic shift of a zadoff-chu base sequence as illustrated in Equation 5.

$$r_{u,v}^{(\alpha)}(n) = e^{j\alpha n}\bar{r}_{u,v}(n),\qquad\text{(Equation 5)}$$

where $\bar{r}_{u,v}(n)$ is a zadoff-chu base sequence of group number u, sequence number v, α is a cyclic shift, and n is an index to the sequence, which increases with the sub-carrier. The reference signal in an OFDM symbol indexed by m may be multiplied by $w_i(m)$, e.g., if the number M of OFDM symbols in which DM-DMRS is present is larger than 1. The $w_i(m)$ may be one of a set of orthogonal sequences of length M.

One or more transport block sizes (e.g., TBS1 and TBS2) and/or MCSs (e.g., MCS1 and MCS2) may be provided. A receiving device may determine from pre-configuration a specific set of parameters (u,v) and $w_i(m)$ that are known to be used for a D2D communication, and may know the time difference between 2 OFDM symbols where DB-DMRS should be present. The receiving device may attempt detection of DB-DMRS using these parameters, e.g., using 2 hypotheses for the difference in cyclic shifts ($\alpha_0$ and $\alpha_1$) between the two OFDM symbols. This detection may be implemented using a correlator design (e.g., where the received signal in each OFDM symbol is multiplied by a sequence corresponding to a possible DB-DMRS sequence according to the hypotheses). The detection may be assisted by other synchronization signals (e.g., a preamble signal) that may be transmitted along with the PDBCH and DB-DMRS. The receiving device may determine the value of the time difference between cyclic shifts and attempt decoding the PDBCH according to the corresponding TBS value.

A receiving device may determine the bandwidth of the PDBCH in a TTI by detecting a property of a synchronization sequence. For example, an SA may include the bandwidth (or number of resource blocks of the allocation) of the PDBCH. The WTRU may be configured to transmit a first synchronization/pilot sequence occupying a fixed and known portion of the transmission bandwidth. For example, the WTRU may be configured to transmit this first sequence (e.g., referred to as the sync sequence) over the middle $N_{sync}$ PRBs (e.g., $N_{sync}=1$). The WTRU may be configured with a set of sequence parameters (e.g., root sequence number, cyclic shift, etc.) associated with each configured/possible signal bandwidth, for example, as illustrated in the look-up table, Table 2. The WTRU may select the parameters for the first sequence based on the transmission bandwidth. The WTRU may be configured to select the parameters of multiple synchronization/pilot sequences, e.g., to indicate the signal bandwidth.

TABLE 2

Example illustrating sync sequence parameters for ZC root for each of the configured BWs

| Index | Bandwidth (in # of PRBs) | Sync. sequence Root sequence index |
| --- | --- | --- |
| 0 | 1 | 129 |
| 1 | 2 | 710 |
| ... | ... | ... |
| $N_{BW}$ | 12 | 140 |

The receiving WTRU may determine the PDBCH bandwidth by detecting the sync sequence parameters (e.g., the ZC root) and finding the associated entry in the lookup table to determine the number of PRBs for the PDBCH.

Figure 11:
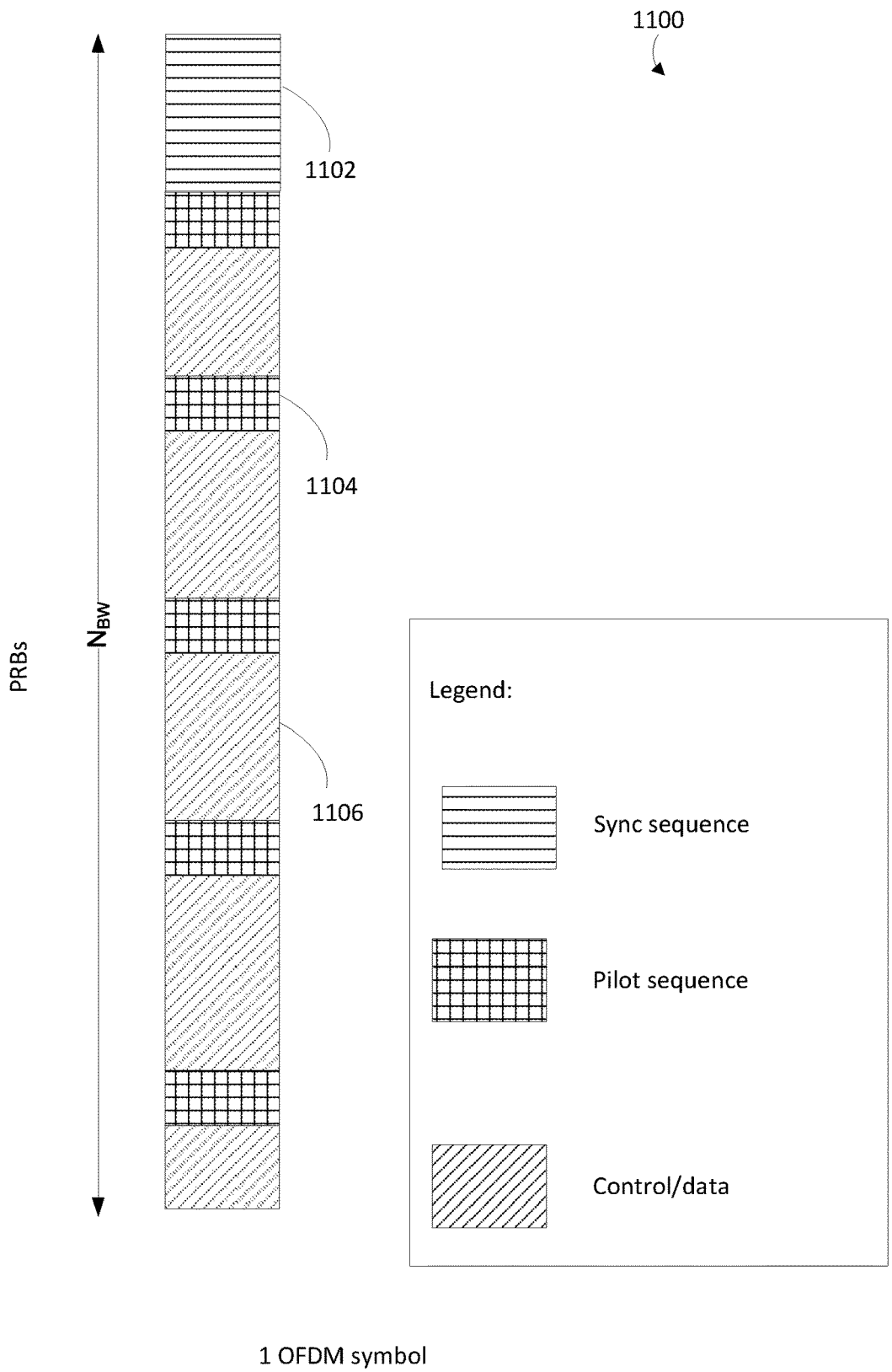
FIG. 11 illustrates an example of an OFDM symbol carrying a sync sequence and control information.

FIG. 11 illustrates an example of an OFDM symbol 1100 carrying Sync sequence 1102 and control information. On a condition that the PDBCH bandwidth is larger than the sync sequence (predefined) bandwidth, the WTRU may be configured to transmit other information, such as data or control 1106 and/or pilots 1104, on the same OFDM symbol as the sync sequence such that the signal occupies the full PDBCH bandwidth. For example, the WTRU may be configured to transmit information using an OFDM type of multiplexing (e.g., as opposed to single carrier-OFDM (SC-OFDM)). As illustrated in FIG. 11, the WTRU may carry pilot symbols in the non-sync sequence space of the OFDM symbol.

One or more WTRUs may be configured to communicate directly over the air, such as in device to device (D2D) communications. The WTRU configured to communicate directly over the air may be configured to communicate without having to go through a network infrastructure. The WTRU may use device to device communication, for example, to determine the proximity of devices and/or to exchange information between one or more devices that may be within communications range.

The WTRU may be configured to support direct D2D communications in the absence of assistance from a network infrastructure. The WTRU may be configured to support direct D2D communications in the absence of assistance from a network infrastructure, for example, in public safety applications when two or more WTRUs may need to communicate when out of range of a network (e.g., in a tunnel, in a basement, etc.). In public safety (e.g., police, firefighters, ambulance, etc.) the ability to communicate directly is critical to the operations.

PTT-channels may be generally referred to herein as channel. PTT-channels may be considered a service. The WTRU may be configured with multiple concurrent services, for example, if a PTT-channel is considered a service.

Multiple channels may be allocated. Multiple channels may be allotted to a group of users, for example, within the same session.

The WTRU may be configured to monitor multiple channels (e.g., a PTT-channel), for example, in public safety. The WTRU may be configured to receive multiple channels (e.g., a PTT-channel), for example, in public safety. The WTRU may implement rules or logic. The WTRU may implement rules or logic such that the WTRU may determine when to monitor and/or receive channels. The WTRU may monitor and/or receive channels in parallel. The WTRU may infer one or more aspects of the communication from the identity of the physical channel and/or the identity of the associated logical channel. The WTRU may associate one or more physical channel(s) with at least one logical channel (e.g., PTT-channel(s)). For example, the WTRU may associate one or more physical channel(s) with at least one logical channel for proper delivery at the application layer. The WTRU may be configured to differentiate and/or route different data streams from the physical layer to the application.

While embodiments described herein may be described based on the 3GPP LTE technology and related specifications, the embodiments may be equally applicable to any wireless technology implementing methods for direct device-to-device communications, including but not limited to other 3GPP technology based on WCDMA, HSPA, HSUPA, and/or HSDPA.

A WTRU may be configured to communicate D2D transmissions for security. A WTRU may be configured to communicate D2D transmissions for non-security purposes. The WTRU may perform security-related procedures. The WTRU may activate security for one or more transmissions of a D2D communication.

A WTRU may be configured to cipher D2D communications and/or data. The WTRU may be configured to decipher D2D communications and/or data. The WTRU may be configured to perform ciphering at layer 2. Layer 2 may include PDCP, RLC or MAC. The WTRU may be configured to perform ciphering so that data unit that is ciphered may be the data part of the applicable PDU. For example, for PDCP, the WTRU may be configured to perform ciphering so that data unit that is ciphered may be the data part of the applicable SDU. The SDU may comprise the application data and/or the IP packet. For example, for MAC, the WTRU may be configured to perform ciphering so that data unit that is ciphered may be the data part of the applicable MAC SDU. The MAC SDU may correspond to the application data and/or the IP packet. The WTRU may be configured to apply a security context. The WTRU may be configured to apply the security context when performing ciphering. The security context may include ciphering algorithm, keys, etc. The WTRU may apply deciphering. The WTRU may apply deciphering, for example, when the WTRU may receive a transmission with security applicable.

The WTRU may be configured to perform integrity protection and verification. The WTRU may be configured to perform integrity protection at layer 2. Level 2 may comprise PDCP, RLC or MAC. The WTRU may be configured to perform integrity protection so that the data unit that is integrity protected may include the PDU header part of the applicable PDU after ciphering. The WTRU may be configured to perform integrity protection so that the data unit that is integrity protected may include the data part of the applicable PDU after ciphering. For MAC, the WTRU may be configured to perform integrity protection so that the data unit that is integrity protected may include the data part of the applicable MAC PDU after ciphering, for example, by excluding the MAC-I field itself, by setting one or more bits of the MAC_I field to a known value (e.g., zeroes), etc. The WTRU may use integrity protection to activate security, ciphering/deciphering, and/or to confirm the determination of the applicable security context for the concerned transmission(s), etc.

The WTRU may be configured to utilize such security procedures, activate security, and/or manage the applicable security context(s). The WTRU may be configured with security parameters. The WTRU may be configured with security parameters by (e.g., out-of-band) pre-configuration. The WTRU may be configured with security parameters by higher layers. The WTRU may be configured in part with security parameters by reception of configuration aspects over the D2D link. Security may be applicable per D2D session, per D2D channel, per D2D transmission, per group or subset of Ws/users, and/or for transmissions related to a specific user. The WTRU may be configured to apply security per D2D session, per D2D channel, per D2D transmission, per group or subset of Ws/users, and/or for transmissions related to a specific user. The Layer 2 protocols may be configured to perform security. The layer 2 protocols may include PDCP, RLC or MAC, or the physical layer. An application layer may perform security. An application layer may include an IP application or a codec.

Security may be utilized for one or more, or all, transmissions. For example, the WTRU may be configured to determine that security is applicable to one or more, or all, transmissions for a given D2D session. For example, the WTRU be configured to determine that security is applicable all transmissions for a D2D session that may use a preconfigured security context. The WTRU may be configured to determine the applicable security as a function of an identity that may be included in a transmission that is received and/or transmitted by a WTRU. The WTRU may be configured to determine the applicable security as a function of an index to one of a plurality of security contexts that may be included in a transmission that is received and/or transmitted by a WTRU. The WTRU may be configured to determine the applicable security as a function of the channel for which transmissions for the session may be performed, received, or transmitted.

Security may be utilized for one or more, or all, transmissions of a channel. For example, the WTRU may determine that security is applicable to one or more, or all, transmissions for a given D2D channel. For example, the WTRU may determine that security is applicable to one or more, or all, control channels that may be part of a set of channels applicable to a D2D session. A control channel that may be part of a set of channels applicable to a D2D session may, for example, be a control channel that may provide further security parameters for other channels and/or communications that may be part of the concerned D2D session. The control channel that may be part of a set of channels applicable to a D2D session may, for example, be a control channel that may provide configuration aspects applicable to the concerned D2D session. The configuration aspects applicable to the concerned D2D session include, but are not limited to, a physical resource, channel arrangements, and/or arbitration of such resources. The control channel that may be part of a set of channels applicable to a D2D session may be a control channel that may provide configuration aspects applicable to the concerned D2D session for a specific secured channel. The specific secured channel may be part of a set of channels applicable to a D2D session. The control channel that may be part of a set of channels applicable to a D2D session may be dedicated to one or more users with specific privileges in the D2D session (e.g. a contention-free channel available to a super-user).

Security may be utilized for one or more, or all, transmissions of a WTRU and/or user. A WTRU may be configured to utilize security for one or more, or all, transmissions. For example, the WTRU may determine that security is applicable to one or more, or all, transmissions for a WTRU and/or user. The WTRU may determine that security is applicable as a function of an identity that may be included in the transmission. An identity may be included in a transmission when received and/or transmitted by a WTRU. The WTRU may determine that security is applicable as a function of an index to one of a plurality of security contexts that may be included in the transmission. An index to one of a plurality of security contexts may be included in a transmission when received and/or transmitted by a WTRU. The WTRU may determine that security is applicable as a function of the channel for which the transmission may be performed. A transmission may be performed, for example, when received or transmitted by a WTRU.

Security may be utilized for a group of WTRUs and/or users. The WTRU may determine that security is applicable to one or more or all transmissions for a given group of WTRUs and/or users. The WTRU may determine that security is applicable to one or more or all transmissions for a given group of WTRUs and/or users as a function of an identity included in the transmission. An identity may be included in a transmission when received and/or transmitted by a WTRU. The WTRU may determine that security is applicable to one or more or all transmissions for a given group of WTRUs and/or users as a function of an index to one of a plurality of security contexts included in a transmission. An index to one of a plurality of security contexts may be included in a transmission when received and/or transmitted by a WTRU. The WTRU may determine that security is applicable to one or more or all transmissions for a given group of WTRUs and/or users as a function of the channel for which the transmission may be performed. A transmission may be performed, for example, when received or transmitted by a WTRU.

Security may be utilized per transport block/PDU. The WTRU may determine whether security is applicable to a transmission for one or more, or all, transport block and/or PDU. The WTRU may determine whether security is inapplicable to a transmission for one or more, or all, transport block and/or PDU. The WTRU may determine whether security is applicable to a transmission for one or more, or all, transport block and/or PDU as a function of an explicit indicator in the PDU format and/or from the presence of a specific field in the PDU format, for example a MAC-I field. An indicator may be an index to one of a plurality of security contexts.

Security may be utilized per packet. Security may be explicitly indicated in received PDU. The WTRU may determine that security is activated from an indication in the received PDU. An indication may be a bit or flag. The WTRU may determine that security is activated from an indication in the received PDU when the WTRU may not have other techniques to determine whether security may be applicable for a given transmission, such as when the use of security might not be a static aspect of the D2D session and/or at least some parameters may change dynamically during the duration of a session.

Security may be utilized per packet. Security may be explicitly indicated from a presence of MAC-I field in received PDU. The WTRU may determine that security is activated from the presence of the MAC-I field in the received PDU. The WTRU may determine that the selected security context may be valid, perhaps if the MAC-I verification succeeds.

The WTRU may determine that security is applicable for the entire session. The WTRU may determine that security is applicable for one or more, or all, transmissions of a given D2D session as a function of at least one of a static configuration, the set of channels applicable to the D2D communications, and/or the identity of the channel itself, etc.

One or more security contexts may be managed. The WTRU may determine the proper security context to apply to a PDU. The WTRU may determine the proper security context to apply to a PDU, for example, as a function of an identity.

Figure 12:
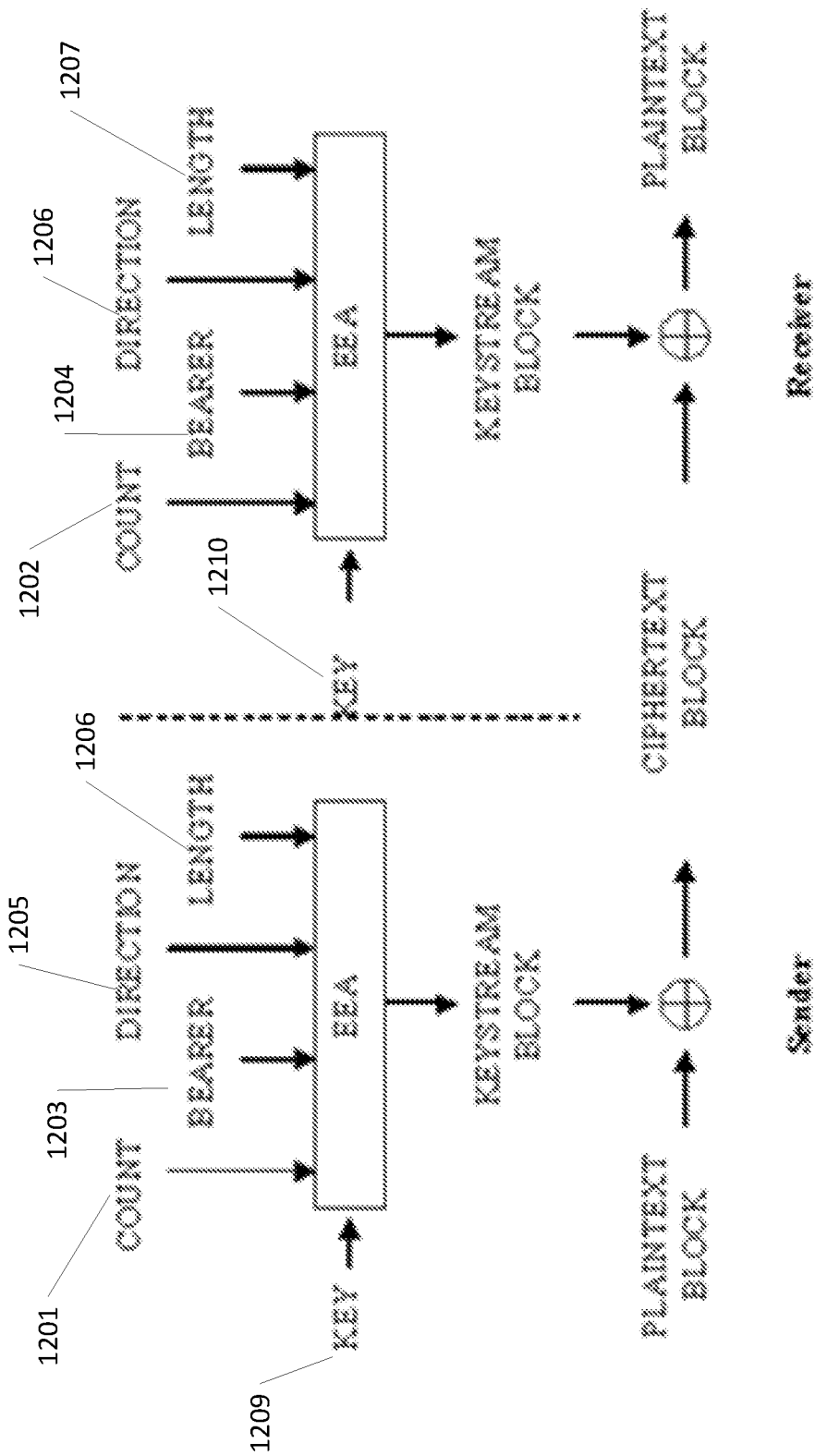
FIG. 12 illustrates an example security principles applicable to LTE security.

FIG. 12 depicts an example security principles applicable to LTE security. As shown in FIG. 12, the inputs to the security function may include a COUNT 1201, 1202, BEARER identity 1203, 1204, DIRECTION 1205, 1206 and/or LENGTH 1207, 1208 of the block on which the security function may be applied. The COUNT may comprise sequencing information. The BEARER identity may include a logical channel. The DIRECTION may include one bit indicating whether the channel is uplink or downlink. The KEY 1209, 1210 may also be an input to the security function.

The WTRU may determine the security context that may be applicable to a given transmission, channel, group of WTRUs/users, and/or D2D session as a function of an identity. The WTRU may determine the security context that may be applicable to a given transmission, channel, group of WTRUs/users, and/or D2D session as a function of an index to one of a plurality of security contexts. For example, the WTRU may determine that a given channel may correspond to a specific security context. The WTRU may use that security context to perform one or more security-related procedures for a transmission that may be applicable to the channel. For example, when activated, the WTRU may use that security context to perform one or more security-related procedures for a transmission that may be applicable to the channel. The WTRU may determine that a given transmission may corresponds to a specific security context. The security context may be identified by the presence of an identifier in the concerned PDU. The WTRU may use that security context to perform security-related procedure for the concerned PDU. For example, if activated, the WTRU may use that security context to perform security-related procedure for the concerned PDU.

The WTRU may derive keys for a security context as a function of an identity. The identity may be a session identity, for example, for session-specific security parameters. The identity may be a channel identity, for example, for channel-specific security parameters. The identity may be a transmitter identity, for example, for user and/or WTRU specific security parameters. The WTRU may use the identity as a similar input to the security function as the legacy BEARER 1203, 1204 parameter.

The WTRU may derive the key 1209, 1202 from a concatenation of a key and/or one or more fields associated to the communication. The field may be an identifier. The field may be an identifier similar to identifiers described herein. The field may be a value(s) used to perform a rekeying operation. The WTRU may exchange a value with one or more WTRUs of a session using a specific security context. The WTRU may receive a value. The WTRU may derive a new key by a concatenation of the key that may be applicable to the session and the new value. A security context may be associated with a validity period. The WTRU may be configured to associate a security context with a validity period. A security context may be revoked. The WTRU may be configured to revoke a security context. A security context may be revoked based on time relative to the start of a session, relative to the last configuration, relative to a timestamps received on the communication channel itself, and/or based on absolute time. The WTRU may be configured to revoke a security context based on time relative to the start of a session, relative to the last configuration, relative to a timestamps received on the communication channel itself, and/or based on absolute time.

A Packet Data Convergence Protocol (PDCP) may provide sequencing information, header compression, and/or security, ciphering and/or authentication. A PDCP D2D layer may be configured to interact with one or more higher layer(s). The PDCP D2D layer may be configured to interact with one or more lower layer(s). The PDCP D2D layer may be configured to interact with the Radio Link Control (RLC). The LTE RLC may provide segmentation/re-segmentation and Automatic Retransmission ReQuest (ARQ). The RLC D2D layer may be configured to interact with one or more higher layer(s). The RLC D2D layer may be configured to interact with lower layers (MAC).

The LTE Medium Access Control (MAC) may provide one or more functions. A MAC D2D PDU may include a MAC header, zero or more MAC Service Data Units (SDUs), zero or more MAC Control Elements (CE), zero or one MAC-I field, and/or padding. A MAC PDU header may include one or more MAC PDU subheaders. One or more, or each, subheader may correspond to a MAC SDU, a MAC control element, and/or padding. One or more, or each subheader in the MAC header may have the same order in the MAC PDU as the corresponding MAC SDU.

A WTRU may be configured to utilize a MAC PDU header for security. A MAC PDU header may include sequencing information. Sequencing information may include a sequence number (SN). An indication may be part of a MAC CE. The SN may be used for security. The WTRU may be configured to use an SN for security. The WTRU may determine that security may be applicable from the presence of sequencing information and/or MAC CE. The SN space that may be WTRU-specific. The SN space may be channel- or session-specific. For example, if WTRUs are capable of avoiding SN collision, the SN may be channel- or session-specific.

A MAC PDU header may include timestamp information. Timestamp information may include time information that may be absolute or time information that may be relative to the start of a session, last configuration, to the previous transmission or similar. For example, timing information may be WTRU-specific, if it is relative. The SN space may be channel- or session-specific, for example, if timing is absolute. Timing information may be used as sequencing input to the security function. Timing information may be used as sequencing input, in place of the SN/COUNT, to the security function. The WTRU may use timing information as sequencing input to the security function. The WTRU may use timing information as sequencing input, in place of the SN/COUNT, to the security function.

A MAC PDU header may include an indication of the source of the data. The indication of the source of data may be an identity. An indication may be part of a MAC CE. For example, the WTRU may derive the identity from a static value assigned to a WTRU. For example, the identity may be derived from a category of the user and/or WTRU, such as a priority level and/or role in the D2D session. For example, the WTRU may derive the identity from a category of the user and/or WTRU such as a priority level and/or role in the D2D session. For example, the identity may correspond to an index to a security context. For example, the WTRU may determine that the identity corresponds to an index to a security context.

A MAC PDU header may include an indication of the type of MAC SDU. The indication of the type of MAC SDU protocol type field. The field may be part of a MAC subheader associated to the corresponding MAC SDU. The field may indicate that the MAC SDU may include application payload. The field may identify the type of application and/or application layer formatting. The application layer formatting may be the arrangement of coded bits in the form of a codec mode. The field may indicate that the MAC SDU may include a RLC PDU, a PDCP PDU, and/or data corresponding to an IP packet.

A MAC PDU header may include an indication of whether or not security may be applicable and/or activated. For example, the field may be part of a MAC subheader associated to the corresponding MAC SDU.

A MAC PDU header may include an indication of whether or not a security-related field may be present in the concerned MAC SDU. For example, the field may be part of a MAC subheader that may be associated to the corresponding MAC SDU. For example, a flag in a MAC subheader may indicate the presence of a MAC-I for the corresponding MAC SDU.

A MAC SDU may be according to at least one of the following: a PDCP PDU; a RLD PDU; application data, for example, a number of speech coded bit in case of audio data; and/or the determination of ciphered and/or deciphered content of the MAC SDU using a security method such as those described herein. For example, the WTRU may determine that security may be applicable, such as if the MAC PDU may include a MAC-i. The WTRU may successfully verify the MAC-i. The WTRU may perform a deciphering operation on the secured part of the MAC PDU, such as on the MAC SDU part of the MAC PDU. The WTRU may perform operations using the applicable security context, such as those described herein.

A MAC-I field may be according to at least one of the following: the MAC-I field may be of a fixed length, such as a 32 bits field. The field may be present for one or more, or all, occurrence of a specific MAC PDU format. If security is inapplicable, the bits of the field may be set to zero. The field may be present when security may be applicable. The field may be present when security is available. The applicability or availability of security may be determined as described herein.

At least one MAC-I field for one or more, or each, SDU may be utilized. For example, at least one MAC-I field for one or more, or each, SDU may be utilized instead of zero or one per PDU.

Hybrid Automatic Retransmission reQuest (HARQ) may be utilized for D2D transmission. A WTRU may be configured to perform a transmission for D2D using one or more HARQ process(es). HARQ processes may be associated to a HARQ entity. A HARQ entity may be dedicated to D2D operation. A HARQ entity may handle HARQ processes for more than one D2D session. A HARQ entity may handle HARQ processes for more than one D2D link. A HARQ entity may handle HARQ processes for a set of physical resources associated to D2D. For example, the WTRU may configure a HARQ entity for D2D operation. The HARQ entity may handle one or more HARQ processes. For example, for one or more, or each, transmission of user data information and/or control information, the MAC instance may invoke the same HARQ process. The MAC instance may invoke the same HARQ process using pre-determined pattern(s). The MAC instance may invoke the same HARQ process for up to a specific number of transmissions. For example, the pre-determined patterns may be a set of consecutive transmission time intervals. The pre-determined patterns may be similar to a bundle transmission and/or to blind non-adaptive retransmissions. The pre-determined patterns may include a set of disjoint transmission time intervals, for example, based on periodically occurring occasions and/or some fixed delay offsets. A control channel may exist. The HARQ operation may be dynamic. The HARQ operation may be according to the concerned scheduling information. One or more, or each transmission of data information may be transmitted as a bundle. One or more, or each transmission of data information may be transmitted periodically and repeated up to a preconfigured number of total transmissions.

The MAC D2D layer may interact with one or more higher layer(s). The higher layers may be one or more of a L2 protocol entity (e.g. a RLC layer, a PDCP layer, etc.), an L3 control entity (e.g. RRC entity), an entity implementing an IP stack, and/or an application (e.g., a codec). The interaction may be direct and/or indirect. For example, direct interaction may include an audio codec that may interact directly with the MAC entity. Direct interaction may include an audio codec that may interact directly with the MAC entity, for example, if no IP, PDCP or RLC may be configured. Direct interaction may include an audio codec that may interact directly with the MAC entity, for example, if transparent to the MAC service. The security functions may be performed by the codec application and/or by the MAC entity. The WTRU may be configured to utilize the security functions performed by the codec application and/or by the MAC entity.

The MAC D2D layer may interact with lower layers (e.g., PHY). The MAC D2D layer may interact with the Physical layer (L1). For radio link management in interactions between the MAC D2D and lower layers, an indication of out-of-synch, contention, medium busy, pre-emption, loss of control channel, leads to MAC interruption, leads to MAC suspend, etc. may be based on reception of a channel dedicated to control aspects. For data transmission in interactions between the MAC and lower layers, the PHY layer may indicate one or more transmission occasions. Transmission occasions may be based on synch acquisition and/or internal timing. The MAC may be told when to invoke the HARQ process. For data reception in interactions between the MAC and lower layers, the PHY layer may indicate reception of a transport block, which may be routed to a proper HARQ process.

Data stream(s) multiplexing/demultiplexing to/from application layer may be utilized for radio resource access and control. For D2D broadcast communication, the WTRU may be configured to use a configuration to determine in which resource a transmission may take place and/or to support physical layer and higher layer functionalities, such as security. The configuration may involve physical layer resources and/or protocol or application configuration. The physical layer resources may include a type of physical channel, carrier frequency over which a transmission may take place, time period over which a transmission may take place, resource block allocation and/or resource index for physical channels that may be multiplexed in a single carrier, a modulation and coding scheme, sequence identifier(s), such as initial value to a pseudo-random sequence, used in reference signal generation or scrambling, and/or a transmission power, or configuration parameters used for determining the transmission power. The protocol or application configuration may include security context identifier, and/or codec type and/or rate.

A WTRU may be configured to receive or monitor at least one physical channel on one or more carrier frequencies according to a configuration. A WTRU may receive data associated to an application, a service, and/or a user or a group.

A WTRU may transmit on at least one physical channel on one or more carrier frequencies according to a configuration. The WTRU may transmit data associated to an application, a service, a user or a group. A WTRU may be configured to determine and/or receive a configuration for D2D broadcast communications.

The WTRU may be configured to receive a pre-configuration from an application or an external module. The WTRU may receive configuration information from an application programming interface (API) between an application and a radio resource control entity for D2D broadcast (e.g., RRC-DB). The WTRU may enable end-users to directly configure parameters such as a carrier frequency and/or a security context that may be used for a certain group identity. The WTRU may receive some or all of the configuration information from an external module, such as a USIM.

Mapping between a physical resource and a type of data may be utilized. The WTRU may establish mapping between some characteristics of the data being transmitted and the physical resource that may be used for the transmission. The mapping may be part of the configuration information. The WTRU may obtain the mapping using the same technique that may be used for the rest of the configuration (e.g. pre-configuration from application).

The WTRU may select a physical resource for the transmission and/or reception of data and/or a signal based on a property of the data according to the mapping. The WTRU may determine a property of the data and/or of a signal from the physical resource in which the data may have been decoded according to the mapping.

The WTRU may determine that a physical resource may be associated a user ID. For example, the WTRU may determine the identity of the originator of a given transmission as a function of the physical resource used for the transmission. For example, the WTRU may have a preconfigured set of one or more identities, each indexed such that the device may associate a physical resource to such identity. The WTRU may determine from such identity other parameters associated to the transmission, if configured and/or available.

The WTRU may determine that a physical resource may be associated with a security context. For example, the WTRU may determine what security context to apply to a given transmission. The WTRU may determine what security context to apply to a given transmission as a function of the physical resource used for the transmission. The WTRU may have a preconfigured set of one or more security contexts, where one or more, or each, may be indexed such that the device may associate a physical resource to such an index.

The WTRU may determine that a physical resource may be associated with a type of application. The type of application may include one or more of a source IP address, a destination IP address, a source port at the transport protocol layer (e.g. UDP, TCP), a destination port at the transport protocol layer (e.g. UDP, TCP), an application protocol (e.g. RTP), an application type, an encoding rate, or any combinations thereof. For example, a channel may be associated to a set of parameters that may include a source/destination IP addresses, and source destination UDP ports.

The WTRU may be configured to determine the destination address and port number combination of a specific IP packet. For example, the WTRU may be configured to determine the destination address and port number combination of a specific IP packet based on the received signal PHY/MAC layer characteristics. The WTRU may be configured to set the value of the IP destination/port and/or other IP parameters. For example, the WTRU may be configured to set the value of the IP destination/port and/or other IP parameters before passing the IP packet to the application layer, among other scenarios.

The WTRU may be configured with a mapping between destination IP/port number and physical resources/communication ID. The WTRU may be configured via higher layer/via pre-configuration on the USIM, etc. The WTRU may be configured to determine the destination IP address and port combination from the lookup table, for example, when receiving a transmission on a specific physical channel resource. The WTRU may be configured to determine the port from the lookup table, for example, when receiving a transmission on a specific physical channel resource. The WTRU may be configured to pass on the decoded data to the higher layer. The WTRU may be configured to overwrite the destination address/port number, for example, when building the IP packet and/or before passing it on to the higher layer.

The WTRU may determine that a physical resource may be associated with a type of encoding, and/or to a type of data. A channel may be associated to a codec type. A channel may be associated to a codec rate. The WTRU may determine the codec rate that may be applicable to a given transmission, for example, as a function of the channel that may be used for the transmission. The WTRU may have a preconfigured set of one or more codec types and/or rates, where one or more, or each, may be indexed such that the device may associate a physical channel to such encoding parameters.

The WTRU may determine that a physical resource may be associated with a control channel. A control channel may indicate what other channels may be present. A control channel may indicate the respective association for the concerned D2D session.

The WTRU may determine the start of the scheduling period associated to the selected SA resource. The WTRU may transmit data according to the parameters indicated in the SA. The WTRU may transmit data on the first transmit occasion within the scheduling period. The WTRU may transmit data on the first transmit occasion within the scheduling period determined according to the selected pattern.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed is:

1. A wireless transmit/receive unit (WTRU) comprising circuitry including a transmitter, a receiver and a processor, configured, at least in part, to:
   determine time and frequency resources to use for device-to-device communications based on (i) first information indicative of any of an availability of at least some time and frequency resources of a plurality of time and frequency resources and an unavailability of at most some of the plurality of time and frequency resources, (ii) a number of transmission periods within a scheduling period, and (iii) a periodicity of the transmission periods within the scheduling period;
   transmit second information during a plurality of the transmission periods, wherein the second information indicates the time and frequency resources and a duration of the scheduling period; and
   transmit data via device-to-device communications during the plurality of the transmission periods using the time and frequency resources.

2. The WTRU of claim 1, wherein the circuitry is configured to receive at least one transmission during at least one transmission period, and wherein the at least one transmission comprises third information indicating at least a portion of the first information.

3. The WTRU of claim 1, wherein the circuitry is configured to receive one or more transmissions of at least another WTRU and determine at least a portion of the first information based on energy value measurements of the one or more transmissions satisfying respective thresholds.

4. The WTRU of claim 1, wherein the circuitry is configured to receive at least transmission during at least one transmission period and determine at least a portion of the first information based on energy value measurements of the one or more transmissions satisfying respective thresholds.

5. The WTRU of claim 1, wherein the circuitry is configured to receive at least one scheduling assignment transmission during at least one transmission period, and wherein the at least one scheduling assignment transmission comprises at least a portion of the first information.

6. The WTRU of claim 5, wherein the at least one scheduling assignment transmission comprises information indicating any of a priority value, one or more indexes corresponding to the time and frequency resources, a source identifier, a destination identifier, and one or more data transmission parameters.

7. The WTRU of claim 1, wherein the plurality of time and frequency resources are based on a set of higher-layer defined time and frequency resources.

8. The WTRU of claim 1, wherein the second information comprises any of a priority value, one or more indexes corresponding to the time and frequency resources, a source identifier, a destination identifier, and one or more data transmission parameters.

9. The WTRU of claim 1, wherein the circuitry is configured to determine the duration of the scheduling period based on an amount of the data and an amount of the time and frequency resources.

10. The WTRU of claim 1, wherein each of the transmission periods defines a set of N successive time resources, and wherein the time and frequency resources comprise time resources occur during a subset of the set of N successive time resources.

11. A method implemented in a wireless transmit/receive unit (WTRU), the method comprising:
   determining time and frequency resources to use for device-to-device communications based on (i) first information indicative of any of an availability of at least some time and frequency resources of a plurality of time and frequency resources and an unavailability of at most some of the plurality of time and frequency resources, (ii) a number of transmission periods within a scheduling period, and (iii) a periodicity of the transmission periods within the scheduling period;
   transmitting second information during a plurality of the transmission periods, wherein the second information indicates the time and frequency resources and a duration of the scheduling period; and
   transmitting data via device-to-device communications during the plurality of the transmission periods using the time and frequency resources.

12. The method of claim 11, further comprising receiving at least one transmissions during at least one transmission period, and wherein the at least one transmission comprises third information indicating at least a portion of the first information.

13. The method of claim 11, further comprising receiving one or more transmissions of at least another WTRU and determining at least a portion of the first information based on energy value measurements of the one or more transmissions satisfying respective thresholds.

14. The method of claim 11, further comprising receiving at least one transmission during at least one transmission period; and determining at least a portion of the first information based on energy value measurements of the one or more transmissions satisfying respective thresholds.

15. The method of claim 11, further comprising receiving at least one scheduling assignment transmission during at least one transmission period, wherein the at least one scheduling assignment transmission comprises at least a portion of the first information.

16. The method of claim 15, wherein the at least one scheduling assignment transmission comprises information indicating any of a priority value, one or more indexes corresponding to the time and frequency resources, a source identifier, a destination identifier, and one or more data transmission parameters.

17. The method of claim 11, wherein the plurality of time and frequency resources are based on a set of higher-layer defined time and frequency resources.

18. The method of claim 11, wherein the second information comprises any of a priority value, one or more indexes corresponding to the time and frequency resources, a source identifier, a destination identifier, and one or more data transmission parameters.

19. The method of claim 11, further comprising determining the duration of the scheduling period based on an amount of the data and an amount of the time and frequency resources.

20. The method of claim 11, wherein each of the transmission periods defines a set of N successive time resources, and wherein the time and frequency resources comprise time resources occur during a subset of the set of N successive time resources.

* * * * *